US007111574B2

(12) United States Patent
Slatter

(10) Patent No.: US 7,111,574 B2
(45) Date of Patent: Sep. 26, 2006

(54) TELESCOPING OUTRIGGER BOOM WITH TUBE LOCKING MECHANISMS

(75) Inventor: Stephen O. Slatter, Sunrise, FL (US)

(73) Assignee: Taco Metals, Inc., Miami, FL (US)

( * ) Notice: Subject to any disclaimer, the term of this patent is extended or adjusted under 35 U.S.C. 154(b) by 24 days.

(21) Appl. No.: 10/939,758

(22) Filed: Sep. 13, 2004

(65) Prior Publication Data

US 2005/0056198 A1    Mar. 17, 2005

Related U.S. Application Data

(60) Provisional application No. 60/502,603, filed on Sep. 12, 2003.

(51) Int. Cl.
   *B63B 35/14*    (2006.01)
(52) U.S. Cl. ........................ 114/255; 43/27.4
(58) Field of Classification Search ................ 114/255; 405/109.1; 403/109.1–109.5, 378, 104; 248/188.5; 43/27.4
   See application file for complete search history.

(56) References Cited

U.S. PATENT DOCUMENTS 2,719,688 A * 10/1955 Seifert ..................... 248/188.5

5,921,196 A * 7/1999 Slatter ........................ 114/255
6,536,723 B1 * 3/2003 Nakatani .................. 248/163.1
2001/0032574 A1 * 10/2001 Newton et al. ............ 114/61.1

FOREIGN PATENT DOCUMENTS

DE           3604497      * 8/1987

* cited by examiner

*Primary Examiner*—Ed Swinehart
(74) *Attorney, Agent, or Firm*—Robert M. Schwartz; Alfred Dassler

(57) ABSTRACT

An outrigger assembly for a fishing vessel to extend fishing lines away from the vessel, including a telescopic boom having a plurality of aligned 'D' tubes of consecutively smaller diameters that can be individually locked in place when extended and having the smaller tubes telescopically mounted inside larger tubes for storage, first embodiment provides a manually operable locking mechanism using an external shift bullet to lock the tubes in place, and second embodiment combines the locking means of the first embodiment with a cam lever operated eyelet locking system, the eyelets provide support for a fishing rigging, both embodiments protect the locking mechanism from elements found in the environment.

14 Claims, 54 Drawing Sheets

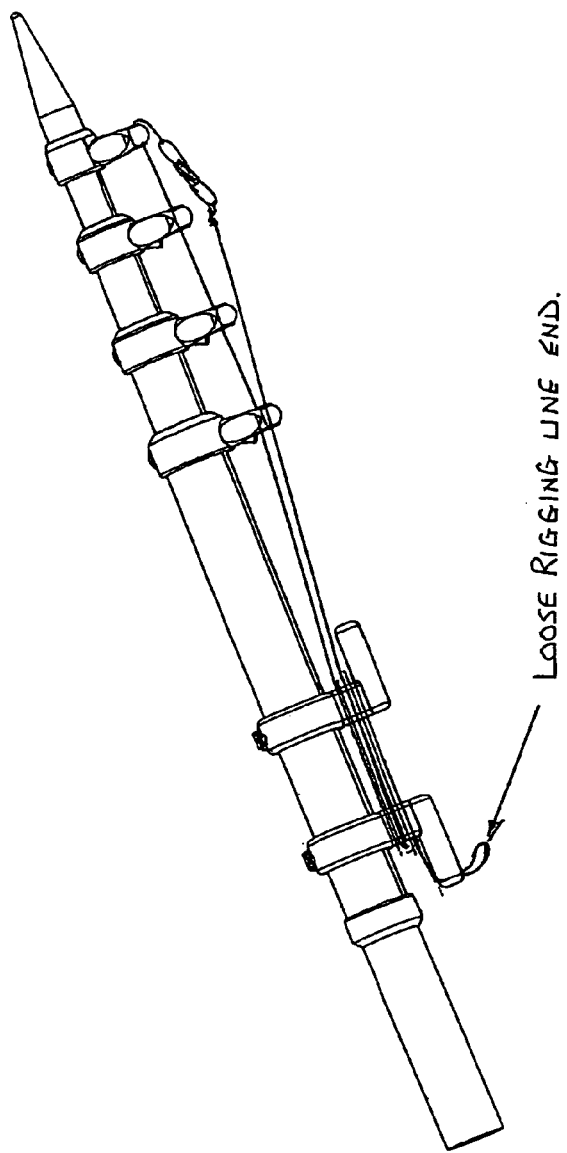
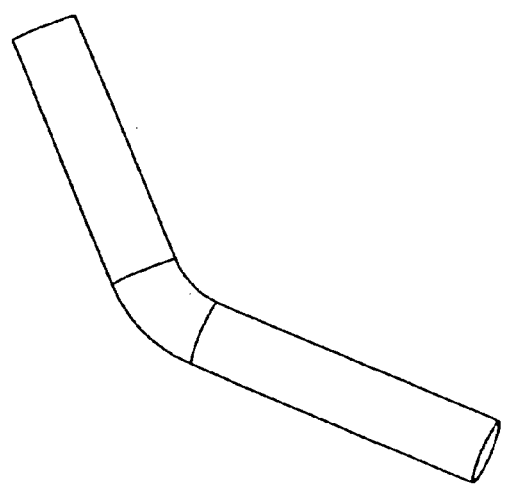
FIG. 1b

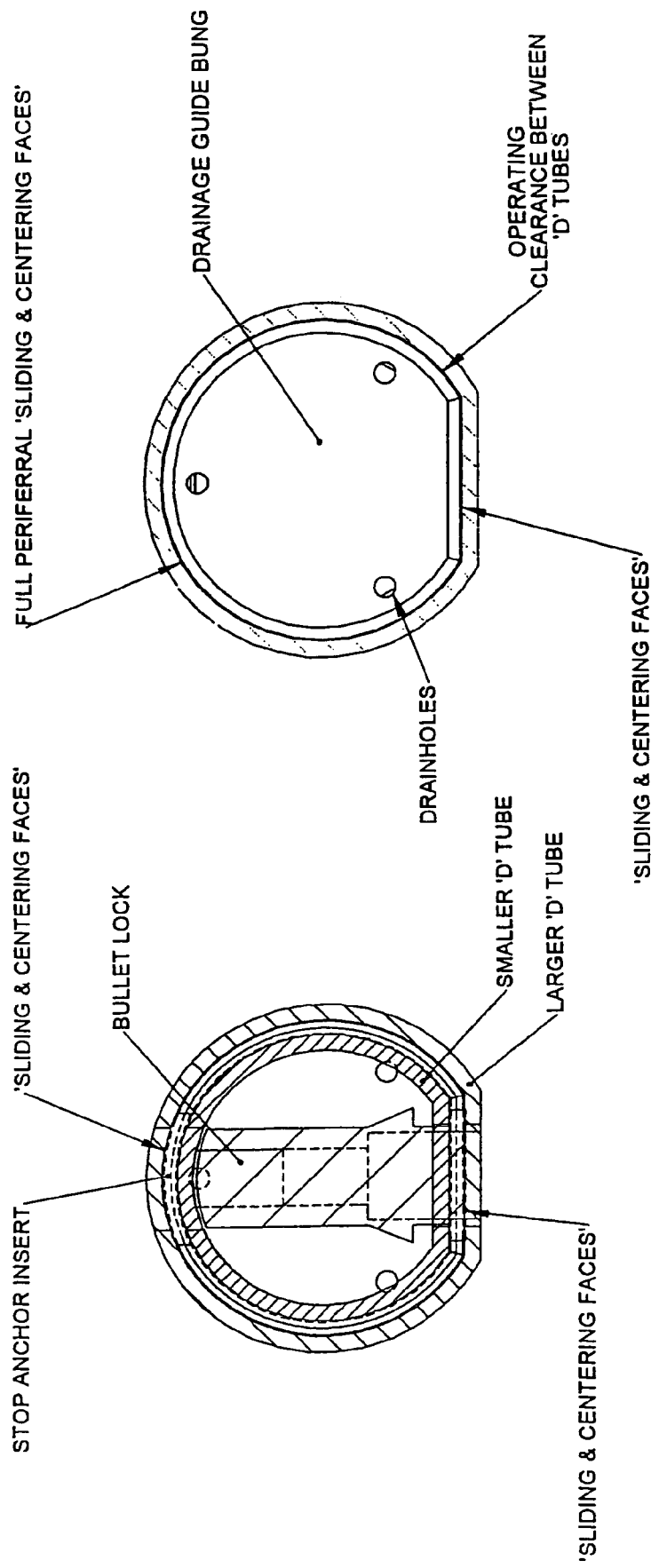

OUTRIGGER SECURED TO MOUNT ARM

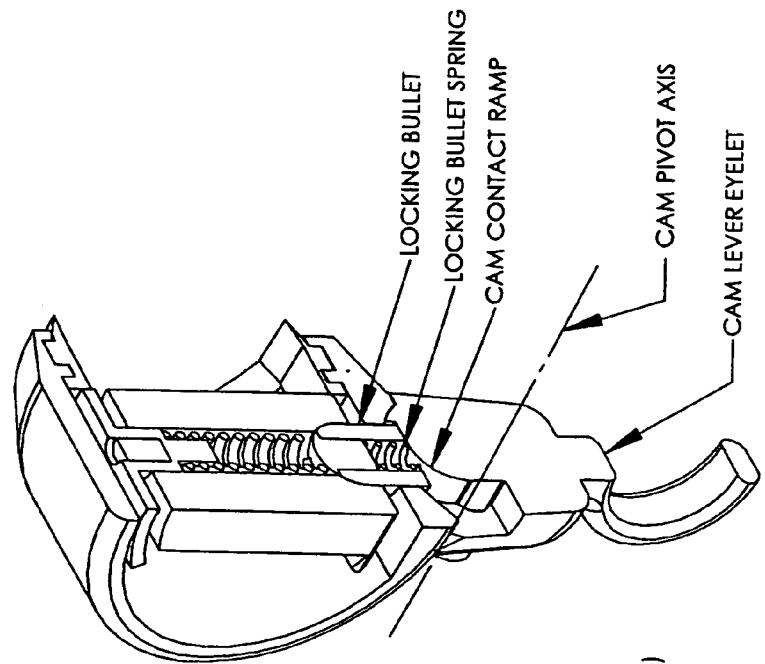
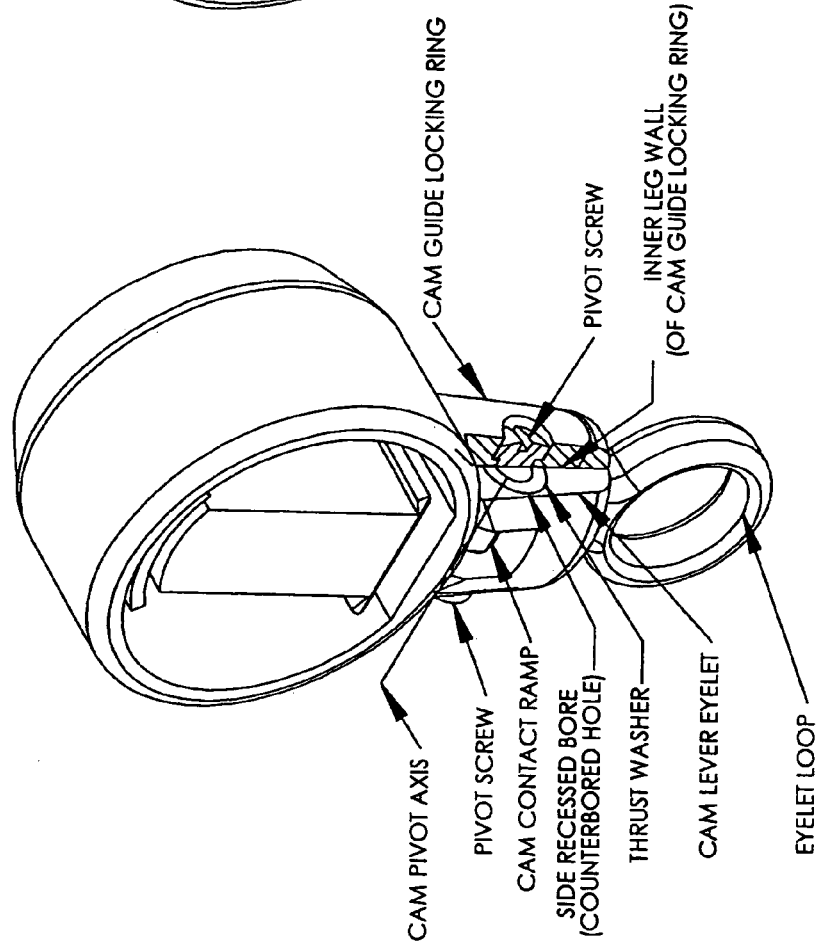
FIG. 37b
FIG. 37a

TELESCOPING OUTRIGGER BOOM WITH TUBE LOCKING MECHANISMS

CROSS-REFERENCE TO RELATED APPLICATIONS

This application claims the benefit of U.S. Provisional Application Ser. No. 60/502,603, filed on Sep. 12, 2003, entitled TELESCOPING OUTRIGGER BOOM.

BACKGROUND OF THE INVENTION

1. Field of the Invention

This invention relates to outriggers that are used on fishing boats typically for fishing line separation while fishing, and specifically to an improved outrigger boom that has a variable length formed in sections that telescope and lock together.

2. Description of Related Art

The use of outriggers on fishing vessels for line separation is well known. Typically, an outrigger is pivotally anchored near the stern of the boat on each side and includes an elongated boom that can be positioned angularly relative to the hull of the vessel. A movable rigging line containing a clip to releasably hold a fishing line is attached to the elongated boom to allow moving the fishing line out along the boom of the outrigger for separation purposes. Although these outriggers work fine, storing them becomes a problem because of their length, which requires them to be positioned parallel to the hull of the boat, taking up space and often getting in the way.

The introduction and use of telescopically positionable outrigger booms is known in the prior art. U.S. Pat. No. 5,921,196 issued to applicant shows a sport fishing outrigger apparatus that has a plurality of elongated tubular sections of progressively smaller cross sections telescopically joined to form an outrigger boom that can be adjusted between a retracted position and a fully extended position or lengths in-between. A plurality of manual spring biased tube locks, each including a locking button biased radially outward through a hole within the elongated tubular sections, with each elongated tubular section having a second hole positioned within an opposite end of each elongated tubular section is provided. The telescoping outrigger tube sections are typically locked in place by an internal spring loaded mechanism using a hair spring clip that pushes a bullet through drilled holes in the adjacent tubes.

One of the drawbacks of the internal hair spring and internal spring load design is that at least one of the punched holes in the telescoping tube sections is subjected to stress resulting in hole enlargement (wallowing-out) over time due to the repeated metal to metal pin contact during normal service. Components in the internal operating locking systems, such as the bullet, can also scratch the tubing and promote corrosion due to the internal pin rubbing against the metal tubing during operation. This is exasperated by exposure to salt water resulting in shortened component life, especially if regular maintenance is neglected.

Other prior art, patent pending by Roger Wilcox (US 2004/0016385), uses an internally supported spring pressured bullet type locking system similar to the granted U.S. Pat. No. 5,921,196 that locks the inner and outer telescoping tube sections together.

While the Wilcox design uses an internal rib inside the telescoping tubes to keep the locking holes inside the tube in alignment, it does not alleviate the potential problem of the locking holes becoming wallowed out due to undesirable movement between the extended tubes.

Furthermore, the design does not use a plastic composition bullet tip, allowing the inner spring activated metallic Bullet Lock to contact the inner metallic wall of the larger outer tube resulting in excessive wear, corrosion, and possible component failure.

Another shortcoming of the Wilcox design is that it does not include a rigging eyelet feature that is permanently indexed to the telescoping tube sections. The eyelet is instead secured by a screw that can loosen, allowing the eyelet to rotate under load and cause rigging line entanglement.

The present invention presents a telescoping outrigger system that resolves problems associated with the prior art including:
  the tendency of holes punched in tubular sections used for engagement of the locking mechanism to wallow out;
  the loss of material and resulting corrosion on the surface of tubular sections in direct contact with the metal tip of the bullet lock;
  the intrusion of water and other contaminants between the tubular sections, resulting in premature component aging;
  the undesirable movement of the telescoping sections of the outrigger boom during use in the extended position;
  the difficulty of aligning, and maintaining alignment of the eyelets used for the rigging;
  the difficulty in aligning and engaging the bullet lock with the telescoping section; and
  the possibility of the telescoping sections disengaging from each other during use, possibly becoming lost.

Solutions to these problems and additional refinements are presented herein.

SUMMARY OF THE INVENTION

An outrigger that is attached to a fishing vessel to allow the attachment of fishing lines to the outrigger for separating the fishing lines, comprising a telescopic boom made up of individual tubular sections of consecutively smaller diameters. A mounting arm for mounting the telescopic boom to the vessel and a rigging line attached to the outrigger boom through a plurality of eyes that are used to attach the fishing line are provided.

Each of the telescopic tubes forming the boom for the outrigger arm are individually lockable using a guide locking ring that includes an external sliding pin and integral toggle slide that moves a shift bullet from the outside of the tubing sections to enable locking and unlocking action of each telescoping tube.

The outrigger boom functions in two different modes. The first mode is the extended mode which is used for fishing with the boom extended and each of the individual tubes locked in place so that the boom cannot collapse. In the second mode of operation, each of the tubular sections can be manually released through each locking device so that the boom collapses into a stored position of minimal length.

The invention resides in the individual tube locking mechanisms that can be manually manipulated during the extension or retraction of the boom.

Two embodiments of the invention are described herein. The first embodiment encompasses a manually operable tube locking mechanism. A second embodiment combines the tube locking mechanism of the first embodiment with a cam lever operated eyelet system.

The device also includes a rigging caddy that allows the rigging line to be conveniently stowed when the boom is in the retracted position. Each section of tube includes a guide locking ring (or a cam guide locking ring in the case of the second embodiment) that connects adjacent tubes of different diameters together and also includes a rigid circular eye (a pivoting cam lever eyelet in the second embodiment) that receives rigging line used for releasably attaching the fishing lines to the outrigger. In the first embodiment, the locking mechanism includes a bullet lock spring and a toggle mechanism for manipulating the lock so that the tubes can be locked together. In the second embodiment, the locking mechanism is a bullet lock similar to the first embodiment, that is activated by a cam lever. Each lever can optionally include an eyelet for guiding the rigging along the boom.

Each of the telescoping tubes forming the boom for the outrigger arm are individually lockable using a Cam Guide locking Ring that includes an external Locking Bullet, a cam lever eyelet, and a Locking bullet spring which in turn act on Sliding Stop Lock components inside the inner tube section to enable locking and unlocking action of each telescoping tube to firmly lock the boom in the extended position and to unlock the tubes for retracting the boom.

It is an object of this invention to provide an improved telescopic outrigger boom that includes individually manually lockable tube sections to allow the boom to be collapsed or locked in an extended position.

It is another object of this invention to provide an improved locking mechanism for each of the tubular sections that allows manual external manipulation of the locking mechanism.

It is another object of this invention to align all the eyelets and tube sections in a common plane for alignment in the extended and retracted positions.

In accordance with these and other objects that will become apparent hereinafter, the invention will be described with particular reference to the accompanying drawings.

BRIEF DESCRIPTION OF THE DRAWINGS

FIG. 1b shows a side elevational view partially exploded with a portion of the boom in the stored position.

FIG. 10a shows a top end view in cross section of the tubes used in the present invention with the bullet lock superimposed.

FIG. 10b shows a bottom end view in cross section of a pair of operating tubes used in the present invention.

FIG. 37a shows a perspective view partially cutaway of the Cam Guide Locking Ring, cam Lever Eyelet and Thrust washer in accordance with the present invention.

FIG. 37b shows a perspective cutaway view of the Cam Guide locking mechanism of the present invention.

DETAILED DESCRIPTION

Figure 1:
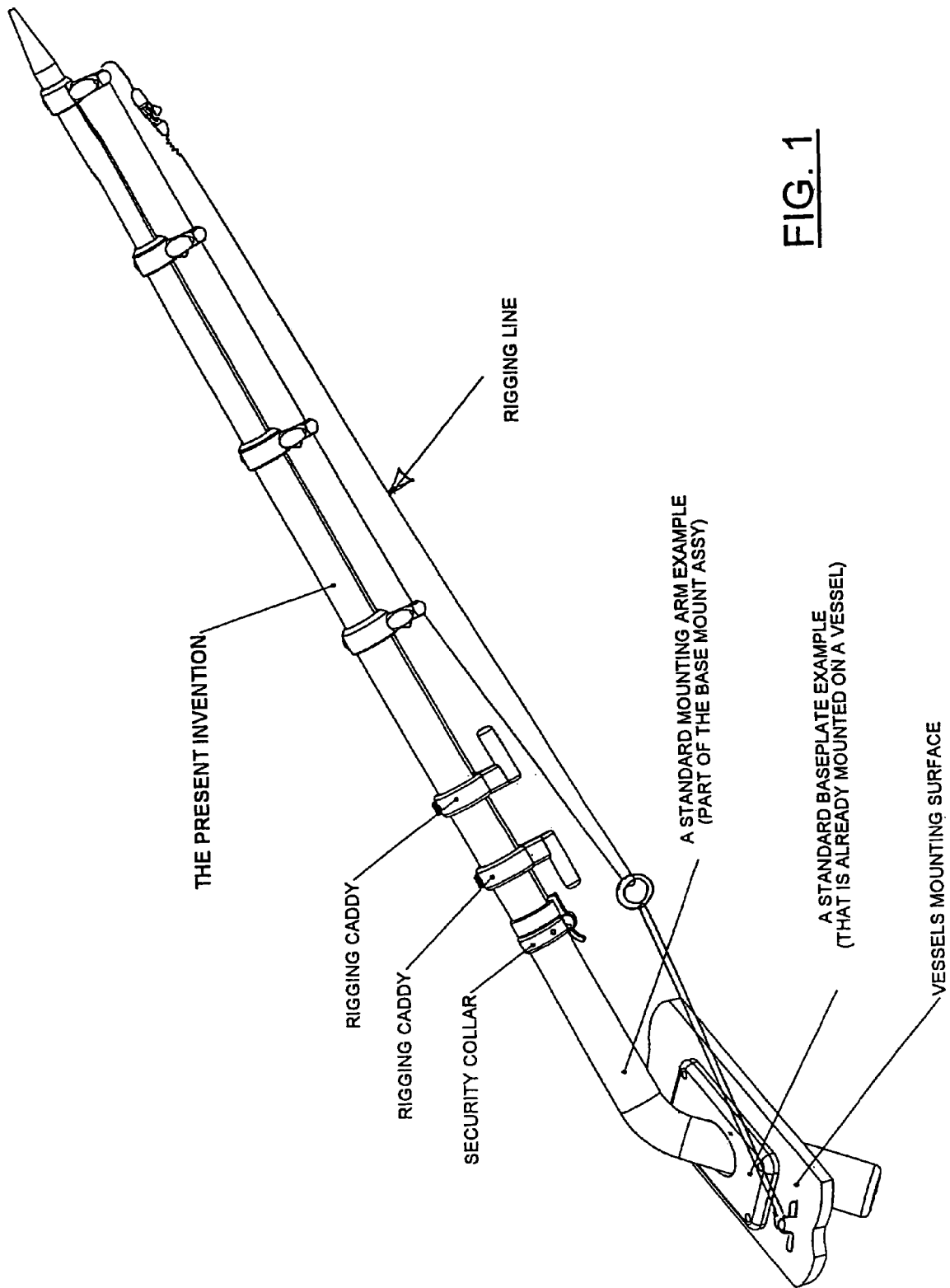
FIG. 1 shows a perspective view of an extended telescopic boom in accordance with the present invention.
Figure 1A:
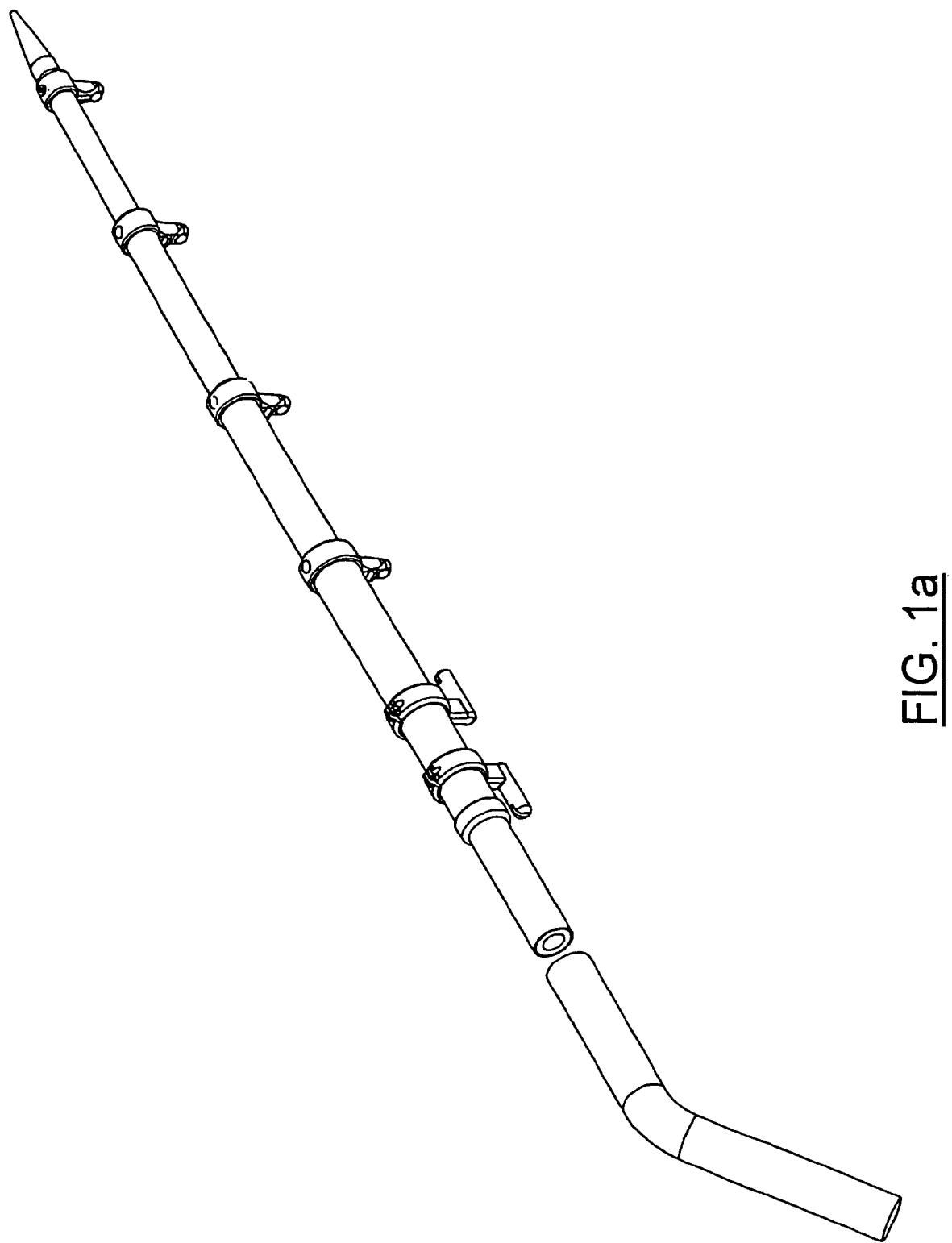
FIG. 1a shows a perspective view partially exploded of the present invention.
Figure 2:
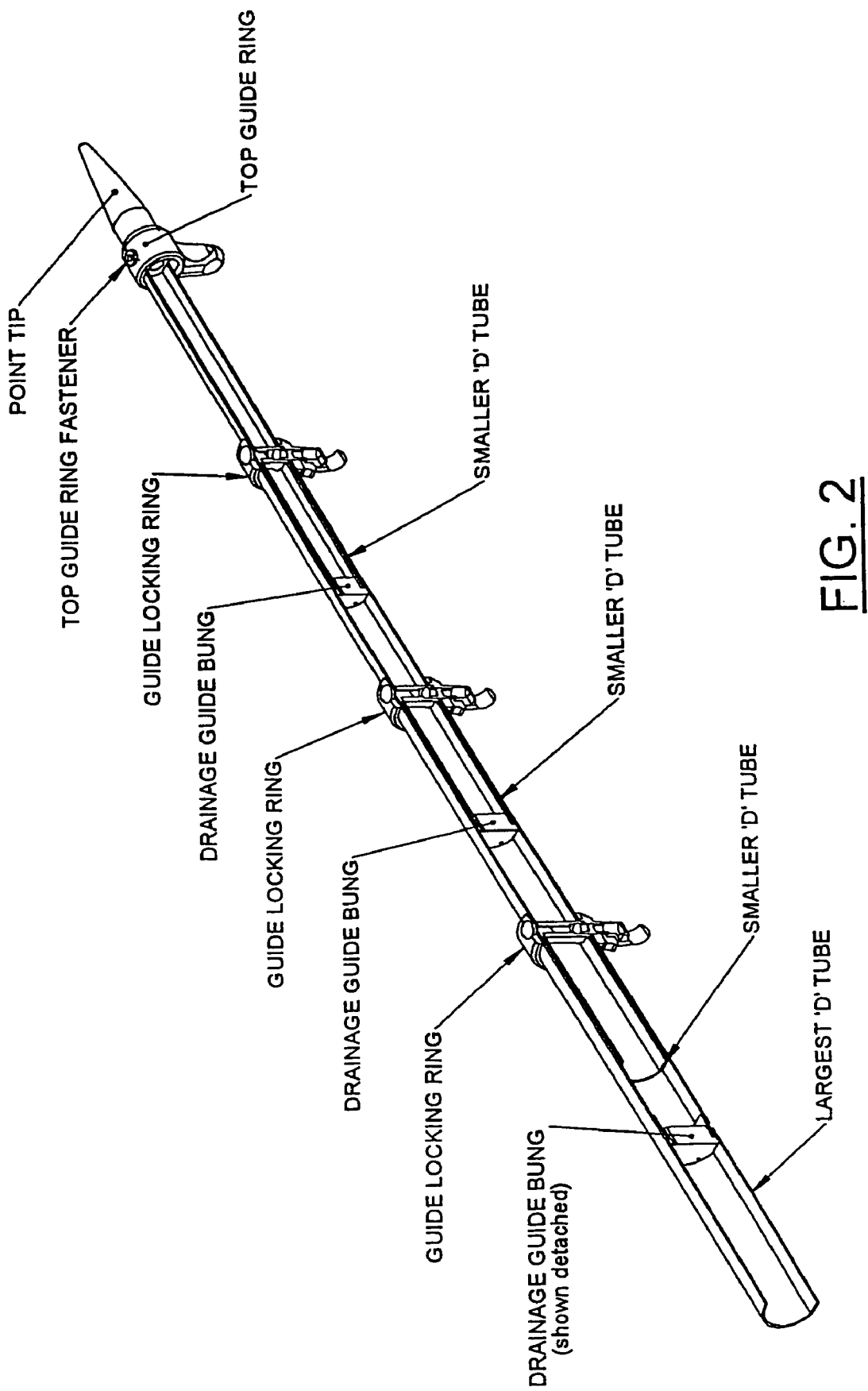
FIG. 2 shows a perspective view partially in cross section of a portion of the invention.

The present invention details an externally mounted locking mechanism for locking individual tubes of a telescoping outrigger system in place. Additionally, it solves problems encountered in the prior art.

Two embodiments of the invention are described. The first embodiment encompasses a manually operable externally mounted tube locking mechanism. A second embodiment combines the tube locking mechanism of the first embodiment with a cam lever operated eyelet system.

One problem described in the background section concerned the wallowing out of the punched holes in the tubular sections of a telescoping boom bullet-type locking system due to repeated metal to metal contact during use. The present invention minimizes this effect by using inner and outer tube sections with an external bullet style lock, a cam lever (in the second embodiment), and an optional cam guide locking ring (in the second embodiment) that helps reduce the inner and outer telescoping tube's internal movement. The Cam Guide locking ring in the second embodiment supports the tubes and resists the shearing loads imposed on the bullet locking device of the telescopic outrigger when in the extended and locked position. Other internal components in both embodiments also help reduce internal play between the sliding tubes by pushing the inner tube section against the outer tube section. Reducing play between the tubes reduces abrasion and extends the useful life of the outrigger components.

The second issue involving damage to the telescoping tubes resulting from contact of the bullet with the tube during operation is also addressed. Unlike the Wilcox design, the present invention shift bullet tip, as well as other internal locking components are designed using plastic or some other material that reduces the abrasion on the outer wall of the inner telescoping tube during operation.

The present invention also eliminates the eyelet movement problem that plagues the described prior art by incorporating a permanently attached eyelet onto the cam lever of the locking mechanism in the second embodiment.

The present invention also includes a multiple purpose guide Seal Stop that prevents rain and salt water from entering the inner compartments from the top end of each tube and includes a low friction, load bearing surface around the periphery of each moving tube section to support the extended tube when imposed loads are exerted. It also functions to help prevent tubing metal to metal galling during tube extension and retraction. The Guide Seal Stop also acts to prevent the inner tube from being extracted out of the end of the outer tube. This stop control feature helps align the external Locking bullet with other locking components within the inner tubes.

The Cam Guide locking ring also incorporates a flattened interior profile surface within a round profile, similar to a 'D' shape, that mates with the matching tube profile. The series of tubes thereby align such that the Cam Lever Eyelets are positioned so that the resulting rigging remains aligned. To this inventors knowledge, no other Prior art combines tube indexing, locking, and tubing Guide ring eyelet alignment in such a way as to permit a permanent, indexing of tubing for the alignment of the Rigging line.

The Cam Guide Locking ring also provides a method to help the user detect when the opening in the telescopic tube is properly positioned between the Cam lever eyelet and the locking bullet. This action is accomplished by use of a spring action detent on the Locking button that allows the user to feel when the extended inner tube is positioned for complete operational engagement of the Cam lever eyelet onto the locking bullet.

FIGS. 1 though 15 describe the first embodiment of the present invention, while FIGS. 16 through 37b describe the second embodiment that adds a Cam lever and eyelets mounted thereto.

FIG. 1

An illustration of the present invention in the fully extended position, and is shown inserted into a standard mounting arm of a standard base plate that is fastened to a vessels suitable mounting surface. Rigging line for sport fishing is also shown. The illustration shows a rigging caddy such fastened and adjusted ready to stow loose or excess rigging line when the present invention is in a partially retracted or fully retracted position.

Also illustrated is the present invention's security collar that securely retains the telescoping outrigger to the mounting arm and mounting base plate.

FIG. 1a

The present invention of the telescoping outrigger boom is shown fully extended but detached from a mounting arm that has not yet been fitted with the present invention's security collar.

FIG. 1b

Shown a detached but fully retracted telescoping outrigger boom and shown is the excess rigging line, neatly and securely stowed/wound around the rigging caddy and the loose end secured in a clip.

FIG. 2

Shown is a scaled down and partially cross sectioned illustration of the present invention showing the profiled telescoping tube sections in a fully locked position and the guide locking rings sized to suit the particular tube sections.

Also shown are the drainage guide bungs that have a profile size matching the profile of the particular telescoping tube wherein it slides.

The illustrations show that the "D" tubing profiles reduces consecutively smaller in size as more sections are added. Typically 3, 4 and 5 different size tubes constitute 11, 15 and 18 foot overall length respectively when fully extending the telescoping outriggers.

Typically retracted length is approximately 6 feet for an 18 foot five section model.

At the illustration's far right end is shown the point tip, top guide ring and fastener that secures and indexes the top guide ring and point tip to the smallest profile tube section so as to align the top guide ring to the other guide locking rings attached to the lower sections.

FIG. 3

Shown is a partially cross-sectioned tube of the present invention, with a small section illustrating the "D" section tube. A guide locking ring having a corresponding flat profile internal face that aligns with the "D" tubes flat is attached. It functions to index the guide locking ring in a single plane, positioned ready to receive the external shift bullet and associated locking components.

FIG. 4a

Shown is a scaled down (for tube section length) cross sectioned illustration that shows a smaller "D" tube profile within a larger "D" tube profile, positioned in its fully extended position and locked by the guide locking ring and its associated parts.

Figure 5A:
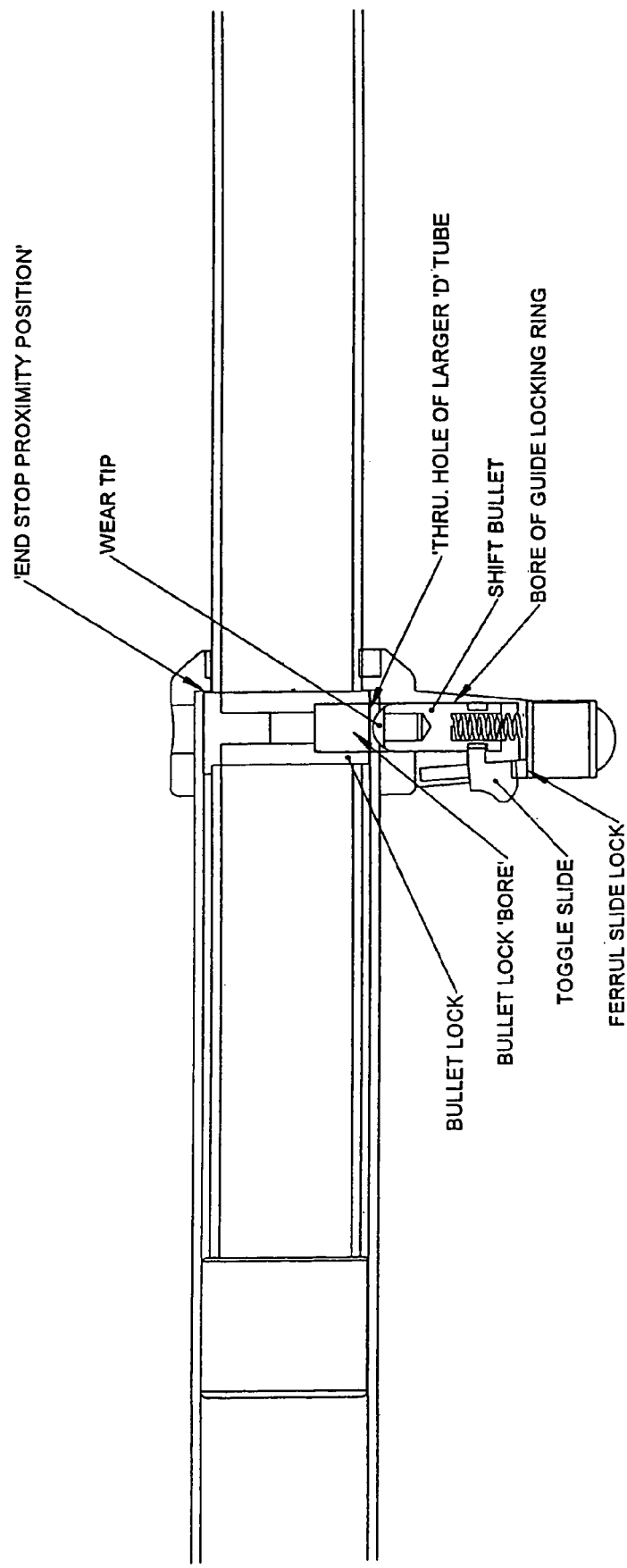
FIG. 5a shows a side elevational view in cross section partially cutaway of the present invention.
Figure 5B:
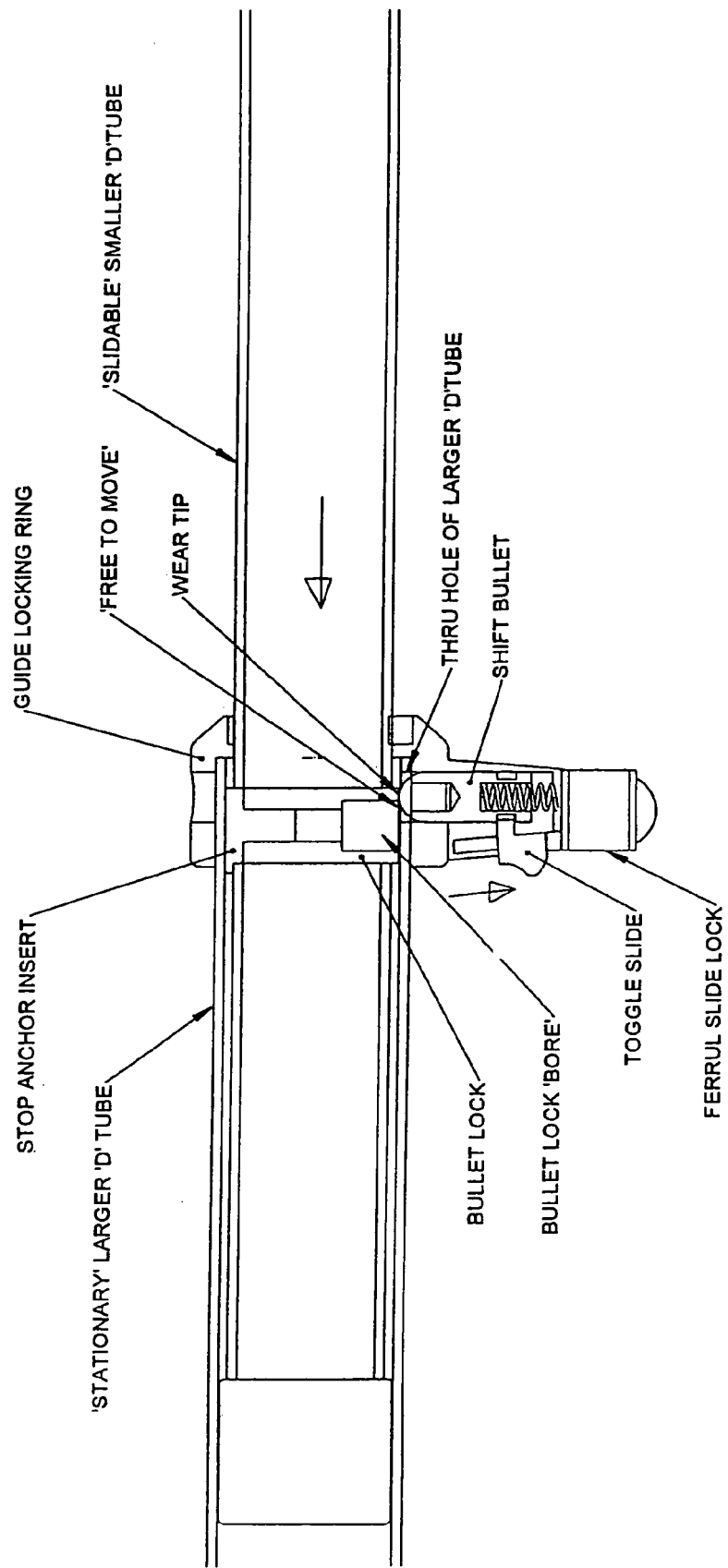
FIG. 5b shows a side elevational view in cross section partially cutaway of the locking mechanism of the present invention.
Figure 6:
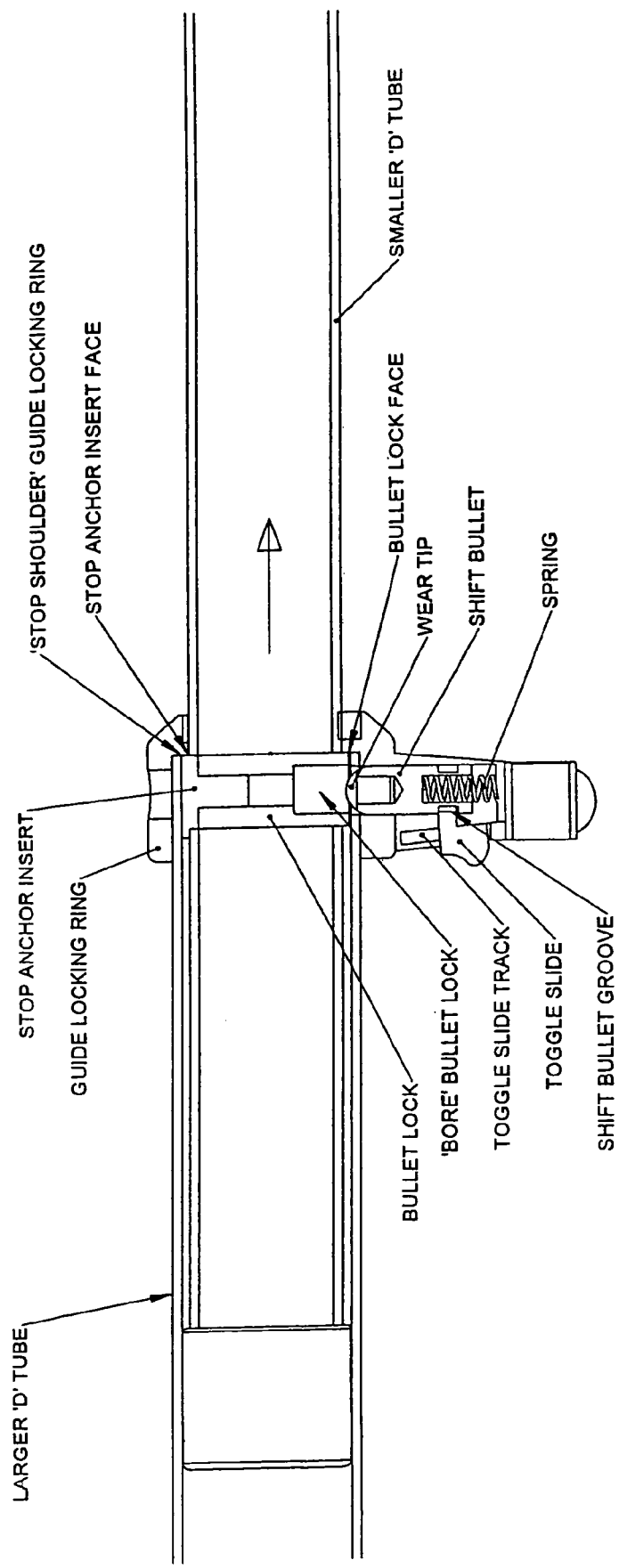
FIG. 6 shows a side elevational view in cross section partially cutaway of an individual locking mechanism utilized in the present invention.

This particular smaller "D" tube cannot slide further within the larger "D" tube. The design feature that prevents this from occurring is later illustrated in FIG. 5a and FIG. 6.

The through hole shown in this example is positioned on the flat face at one end of each "D" tube to permit the external locking device within the guide locking ring to pass through the outer wall of the "D" tube.

FIG. 4b

A close up and more detailed cross sectional view of the guide locking ring, larger "D" tube, sliding/telescoping smaller "D" tube and associated locking and travel stop components are shown.

The smaller "D" tube is nearly at its fully extended position and is shown with a wear tip permanently inserted into one end of a shift bullet that is positioned within a bore of the guide locking ring. A spring exerts a force on the shift bullet in order to push the wear tip up towards the outer face of the smaller "D" tube, noted in the figure as the 'rubbing point', ready to engage/pass through into the bullet lock that will be aligned with the shift bullet when in the fully extended position.

The wear tip is made preferably of a low friction plastic material to prevent scratching the outside flat face of the smaller "D" tube.

During extension of the smaller "D" tube by the operator, as the bullet lock front stop face touches the wear tip, a spring detent action will be felt just before the shift bullet is forced into a central bore of the bullet lock as a bumping action of the wear tip over the bullet lock occurs.

The illustration also shows a stop anchor insert on one end of the bullet lock to aid in securing the bullet lock to the smaller "D" tube and acts as a travel stop for controlling tube extension, keeping the different sized "D" tubes from having metal to metal contact. This permits a smooth sliding telescoping action.

FIG. 5a

Figure 4A:
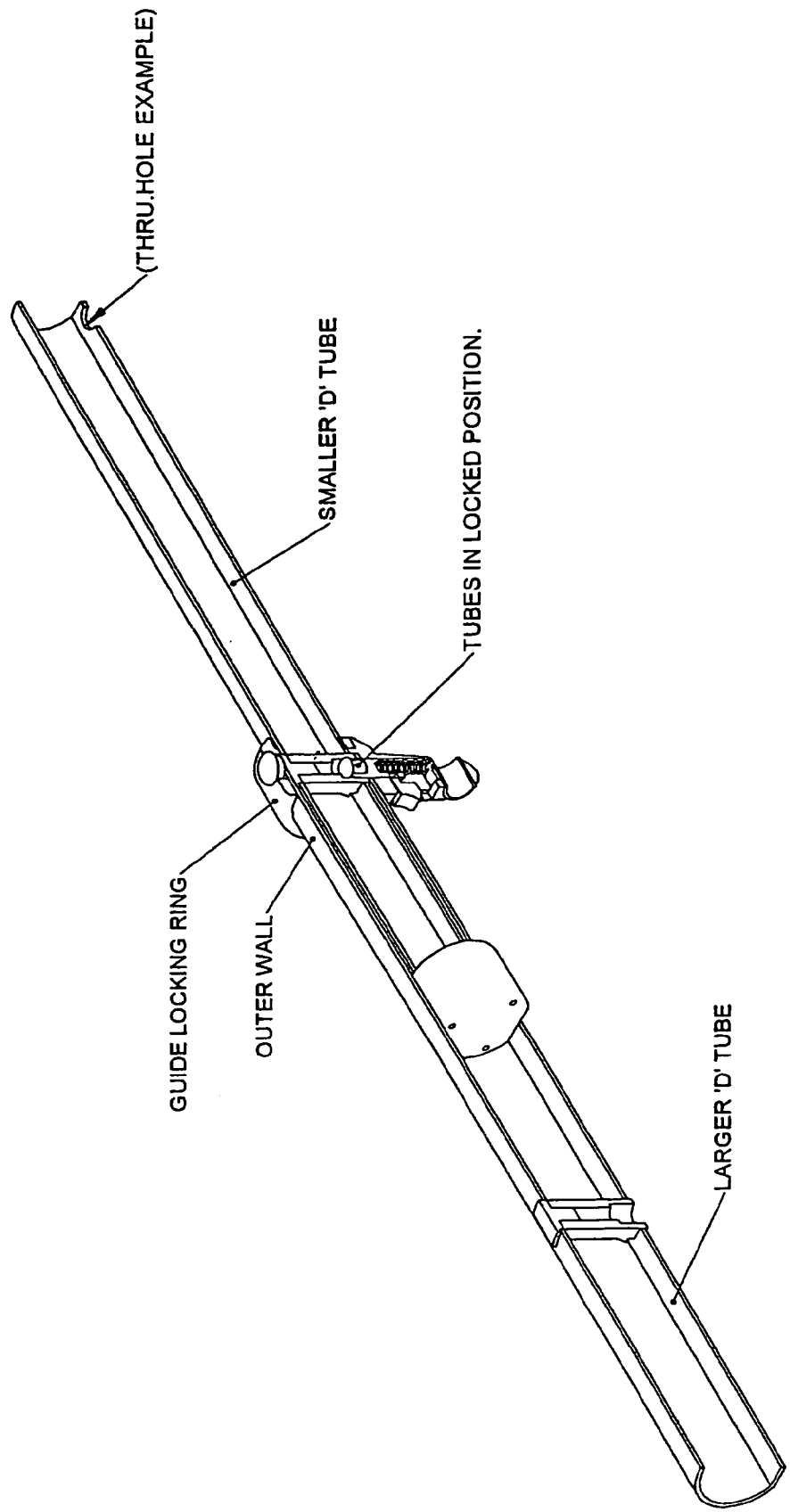
FIG. 4a shows a perspective view in cross section of a portion of the boom that includes one of the locking mechanisms.
Figure 4B:
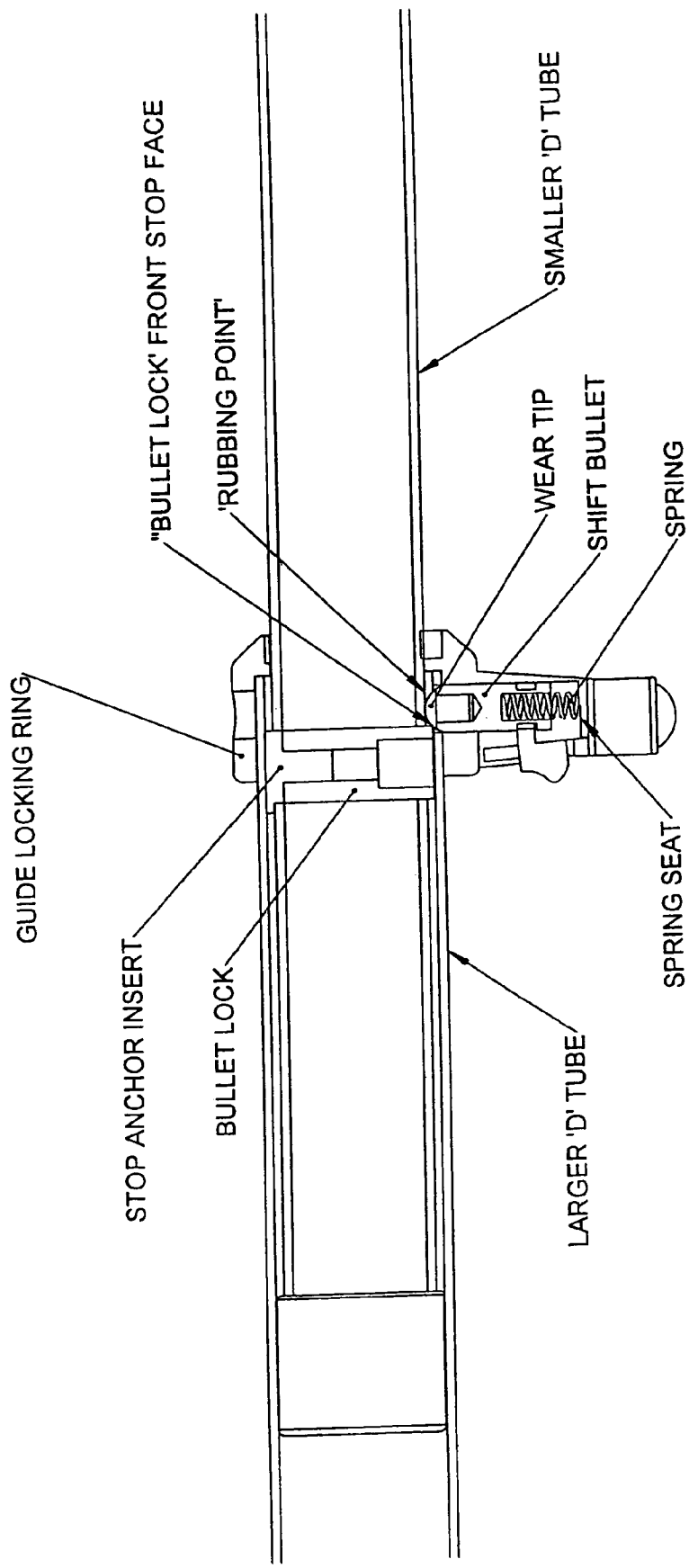
FIG. 4b shows a side elevational view cutaway of a portion of the invention in cross section.

A similar cross sectional view as shown in FIG. 4b indicates the smaller "D" tube section having reached its fully extended position in relation to the larger "D" tube section. It cannot slide out of the end of the larger "D" tube because the stop anchor insert, shown in FIG. 4b, cannot travel further due to its right end face contacting the guide locking ring's smaller internal diameter shoulder at what is called the 'end stop proximity position'.

The bullet lock also has a front end face that contacts the end stop proximity position face of the guide locking ring. As shown, the shift bullet is spring loaded and can pass through into the bullet lock bore so as to lock the inner smaller "D" tube to the outer larger "D" tube. No assistance is required by the operator as the spring automatically pushes the shift bullet into the bullet lock's-bullet lock bore.

The bore of the guide locking ring and bullet lock provides the strength to resist shear encountered by the shift bullet during operation in the field. The tube sections outside surface provides support for the guide locking ring. The toggle slide aligns with, and is held in place by, a corresponding groove that prevents movement of the shift bullet outside the intended travel distance.

FIG. 5b

Illustrates the shift bullet unlocking mechanism. When the shift bullet is engaged in the bullet lock, the operator slides the toggle slide downward causing the shift bullet to move downward against the spring in a direction away from the outside flat of the "D" tube. The shift bullet slides within the bullet lock bore of the bullet lock and only after it clears the 'free to move' point can the smaller "D" tube slide to the left, as shown, towards a fully retracted position.

The ferrule slide lock prevents over travel.

FIG. 6

The figure shows relative positioning of the bullet lock and shift bullet for adjacent telescoping tubes in the fully extended position prior to engagement in a locked position. The toggle slide is engaged with a shift bullet groove that is used to pull the shift bullet out of the bullet lock bore. It follows a toggle slide track and is opposed by a force exerted by a spring that is mounted against the shift bullet. Movement of the bullet lock is limited by the stop anchor insert face and the bullet lock face abutting the guide locking ring.

FIG. 7

This illustration shows the smaller "D" tube section in the fully retracted position in relation to the larger "D" tube section.

The bullet lock and stop anchor insert attached to the larger "D" tube section now acts as stop components for the retracting inner smaller "D" tube section as the operator slides it down inside.

A drainage guide bung which is attached to the bottom most end of the smaller "D" tube section is also a guiding component within the inner wall of larger "D" tube section, a means for venting air and moisture from the upper telescoping tube sections and acts as a bump stop that contacts the bullet lock on full retraction of the smaller "D" tube inside the larger "D" tube.

A consecutively smaller bullet lock (of smaller "D" tube) is shown as each of "D" tube sections of the present invention has one bullet lock installed inside each telescoping section that has a smaller 'D' tube installed above it.

FIG. 8

This sectioned illustration of an exploded view of the guide locking ring and associated components attached to one end of the larger "D" tube section. The bullet lock with stop anchor is also shown in exploded view and illustrates details regarding how the components interact to perform locking, unlocking, stopping, sliding and sealing of the telescoping tube sections.

The bullet lock has lock tabs that securely mate with the bullet lock cut out of the flat face of the smaller "D" tube on one end and a stop anchor insert on the opposite end that mates with the bullet lock and the bullet lock cut out on the rounded face. The mating with the "D" tube profile permits a strong anchor for the locking system.

A top insert seal is shown that is secured into the end opening bore of the guide locking ring. Its internal "D" profile dimensions are just slightly larger than the smaller "D" tube's dimensions which eases sliding of the tube during extension and retraction.

The top insert seal also prevents metal to metal contact of the larger and smaller "D" tubes and supports the loads imposed on the tubes during operation when using the boom assembly during fishing on the water or when the telescopic outrigger is fully extended and is flexing during high speed operation of the vessel. The top insert seal also has an integral sealing lip that helps prevent salt spray, salt water and rain water from entering into the top end of the boom assemblies sections.

A thru hole of guide locking ring and locking hole (in the larger "D" tube) are shown, these holes are there to permit the shift bullet and wear tip parts to freely slide back and forth to enable the locking and unlocking action to occur.

FIG. 9

Another view giving a clearer understanding of how the bullet lock and stop anchor insert are secured to the smaller "D" tube section that slides inside the larger "D" tube. Once assembled these components cannot fall out as they are always contained within the inside bore of the larger "D" tube.

Figure 7:
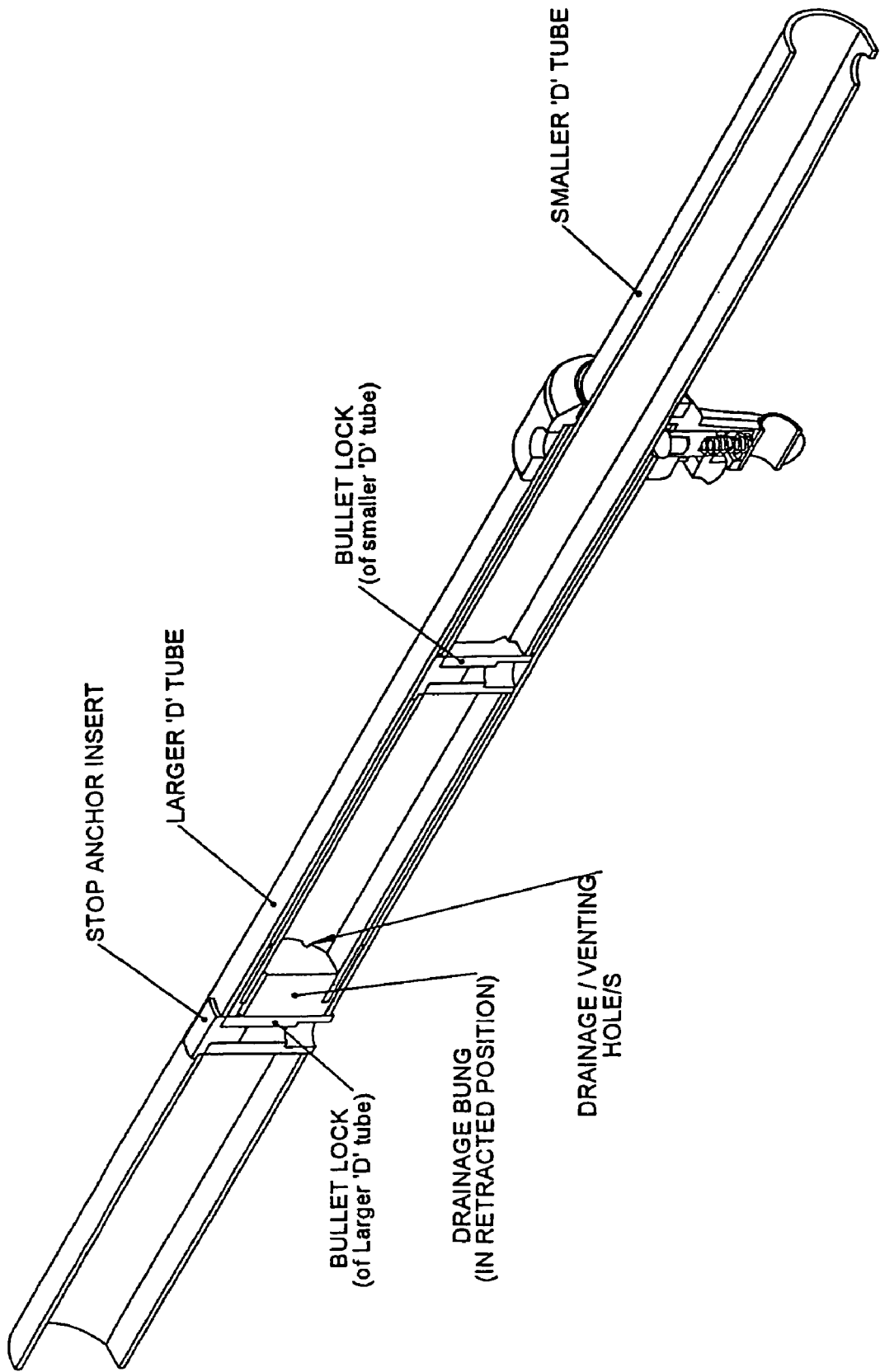
FIG. 7 shows a perspective view partially cutaway in cross section of a portion of the invention including a locking mechanism.
Figure 8:
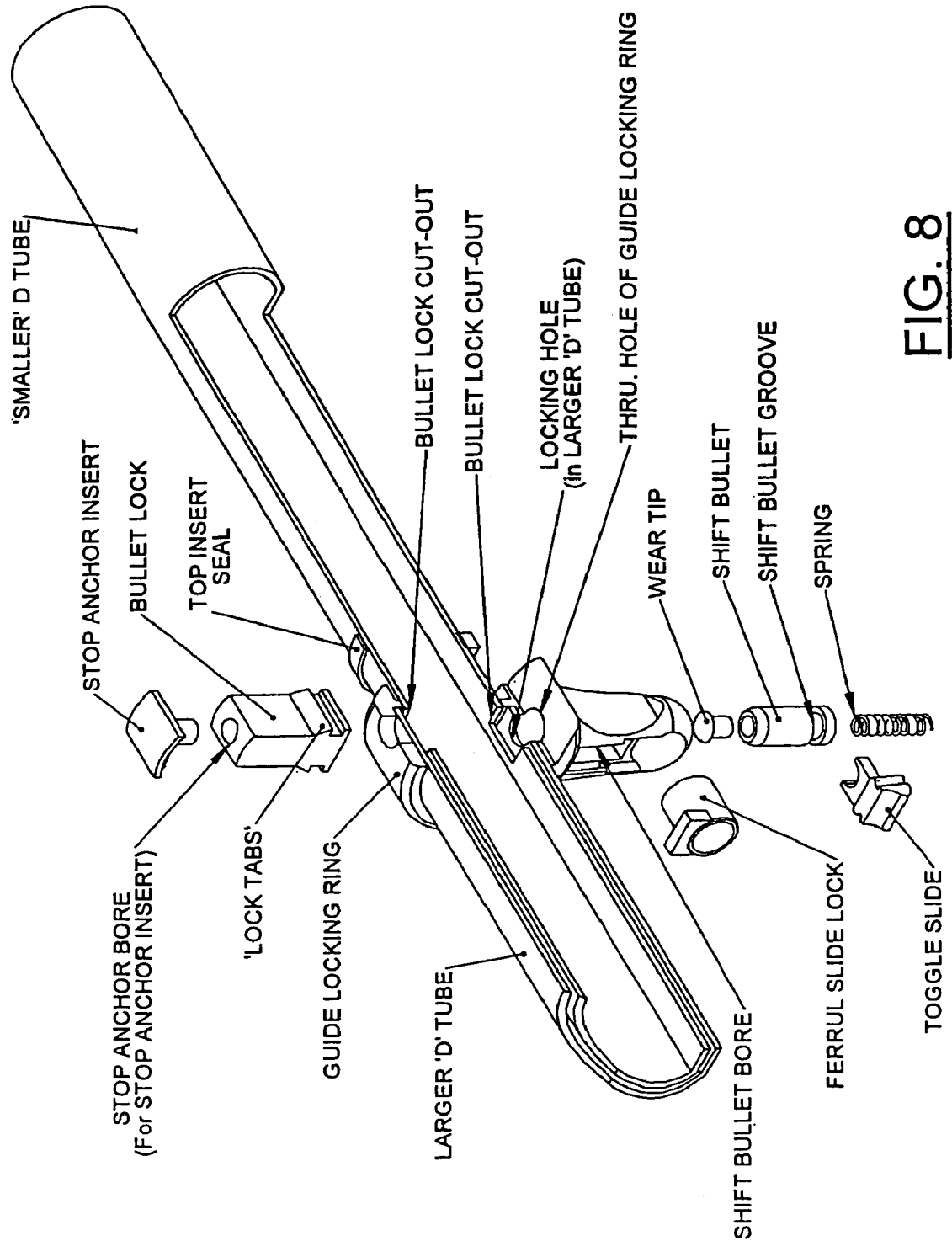
FIG. 8 shows an exploded view partially in cross section and perspective partially cutaway of the locking mechanism in accordance with the present invention.
Figure 9:
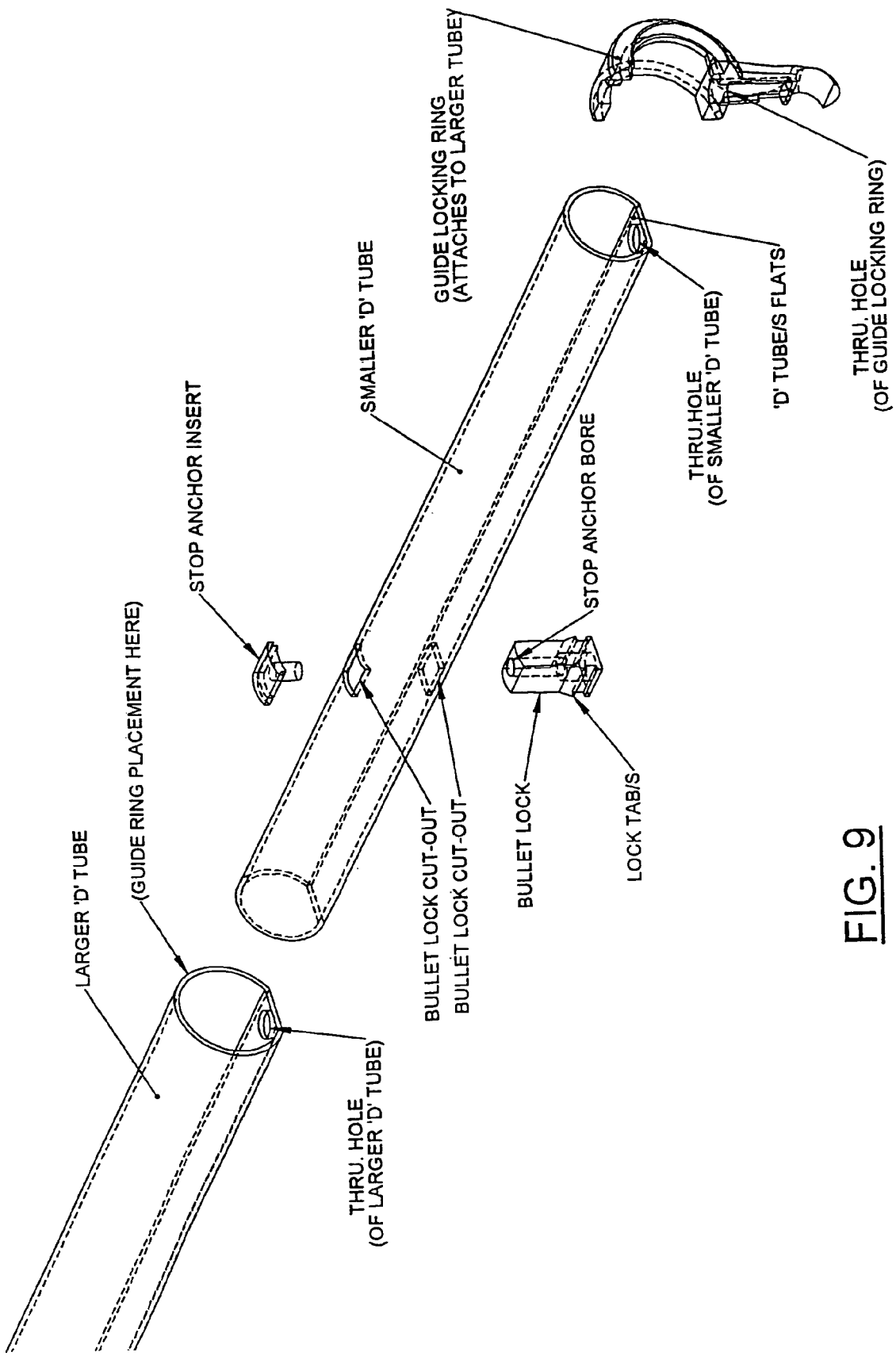
FIG. 9 shows an exploded perspective partial view of a pair of adjacent tubes in the locking mechanism used in the present invention.

This illustration further shows the "D" tube flats used in all of the tube sections that the guide locking ring mates with. The permanent attachment of the guide locking ring ensures alignment of all of the telescoping "D" tube profiles to each other when used in conjunction with the top insert seal (FIG. 8) and drainage bung (FIG. 7).

FIG. 10a

This illustration of a cross sectioned top end view of a larger "D" tube and smaller "D" tube shows that there is clearance between the two "D" tube profiles as the "D" tubes never touch each other when telescoping the smaller "D" tube along the inside of the larger "D" tube.

The stop anchor insert mentioned earlier and the bullet lock serve as sliding and centering components in addition to their other locking and extension functions.

FIG. 10b

Is a cross-section view of the opposite end of the 'D' tubes shown in FIG. 10A. The drainage guide bung, permanently attached to the smaller "D" tube, also has a gap around the outside surface but is positioned as far apart as necessary from the bullet lock component to control tail end whip of the smaller "D" tube when the extended telescopic outrigger is flexed by applied forces during use. The drainage guide bung has several holes for venting air and water drainage and the "D" profile also helps keep the "D" tubes in concentric alignment.

FIG. 11a

Is a side view of a portion of the bottom sleeve and lower most end "D" tube of the present invention placed into a supporting mount arm and is securely latched to a security collar that has been secured onto the top end of a supporting mount arm.

The lever latch uses the sleeve shoulder on the present invention's lower end "D" tube thus preventing the telescopic outrigger from prematurely sliding out of the end of the supporting mount arm.

Until the security collar lever is operated, the present invention is safely retained in the supporting mount arm.

FIG. 11b

Figure 11A:
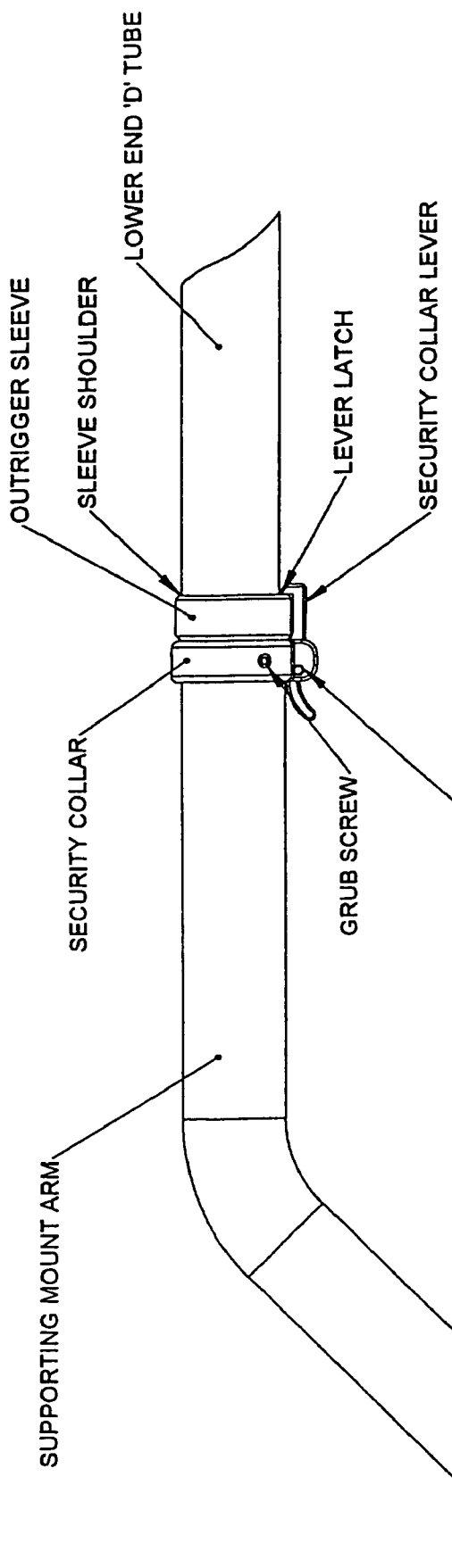
FIG. 11a shows a partially cutaway side elevational view of the attachment of the outrigger boom to a support mounting arm.

Is a similar illustration to FIG. 11a but shows that the thumb release has been pushed and the lever latch has been pivoted away from the sleeve shoulder and enables the operator to remove the telescopic outrigger from the end of the supporting mount arm.

FIG. 12a

An exploded view of the security collar components.

An optional version of this security collar can actually slide along the supporting mount arm with a single adapter that can prevent accidental injuries from any sharp edges of the lever latch by enabling the lever latch to slide down to the tube top end. However, most mounting applications of this device in conjunction with an outrigger boom is done on top of the vessel away from the occupants of the vessel so the said adapter would probably not be required.

FIG. 12b

This cross sectioned view of the security collar's assembled components shows a spring loaded and pivoting lever latch that is thumb or finger activated.

Figure 11B:
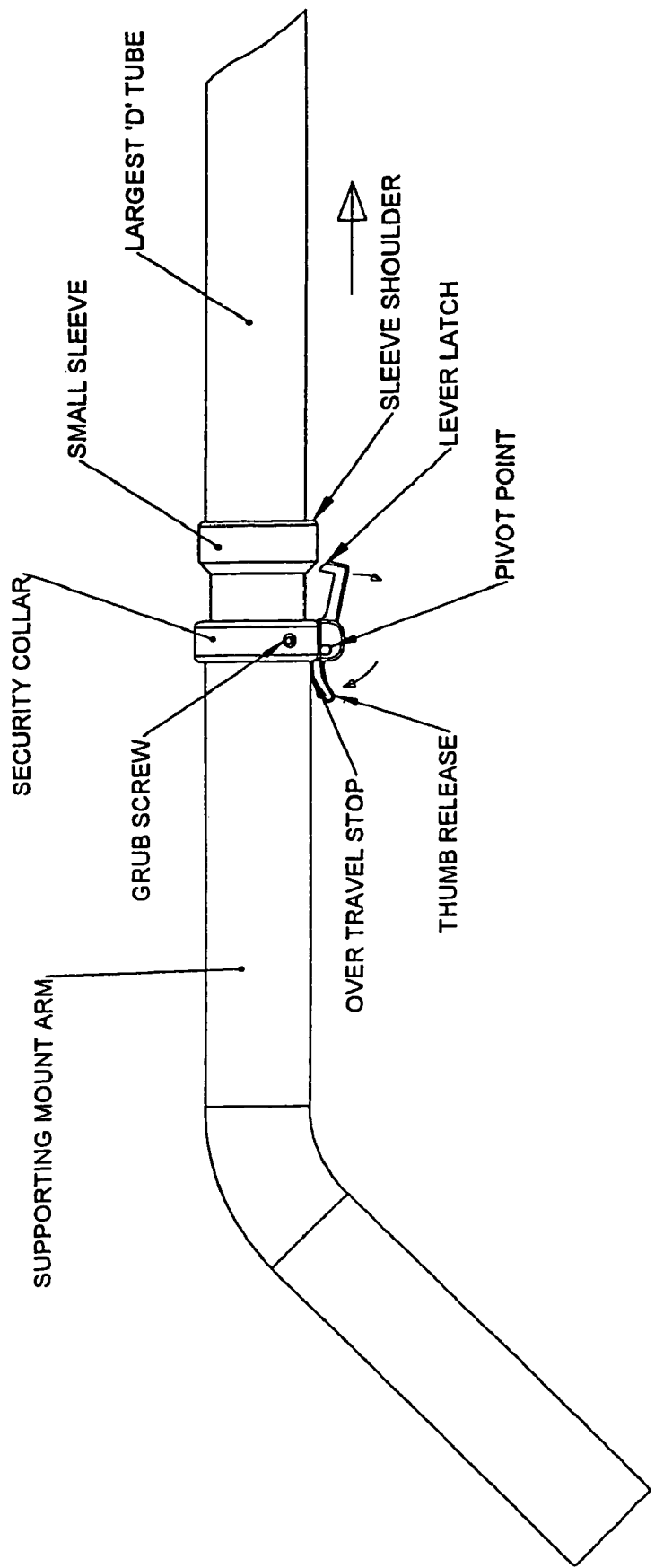
FIG. 11b shows a side elevational view partially cutaway of the attachment of the outrigger boom to a support mounting arm.
Figure 12B:
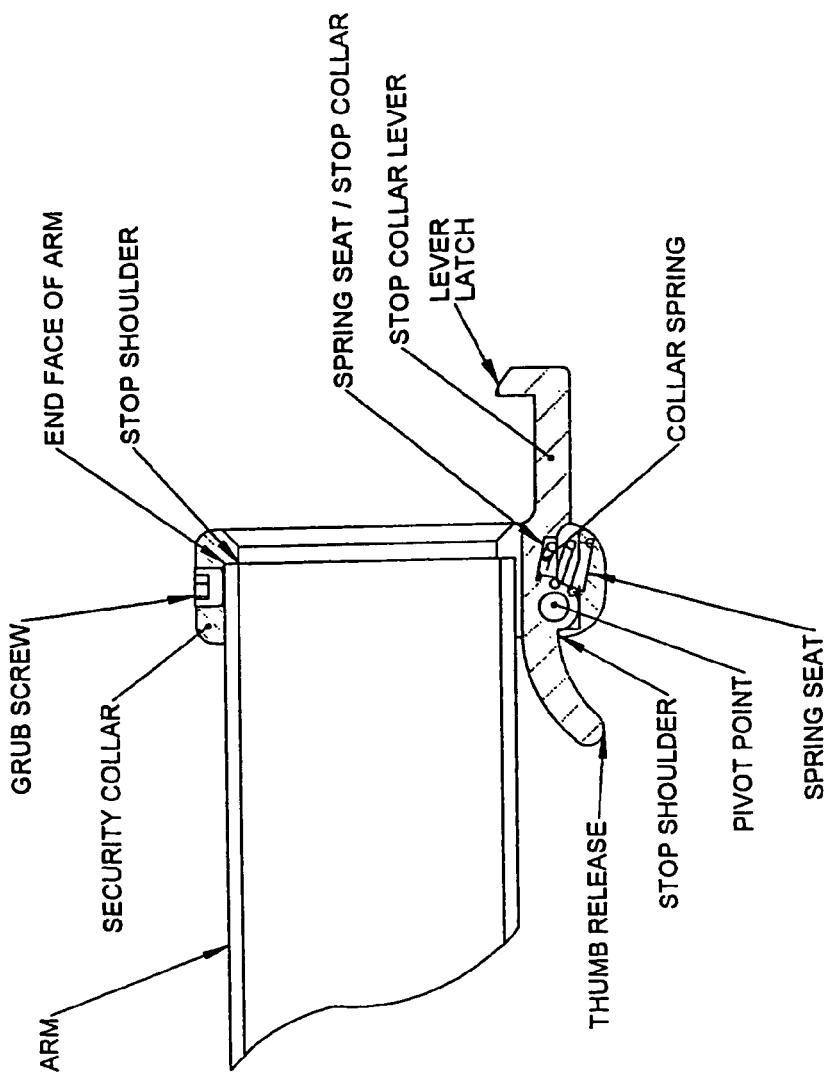
FIG. 12b shows the latching mechanism used with the supporting mount arm to attach the boom thereto in cross section partially cutaway in a side elevational view.
Figure 12A:
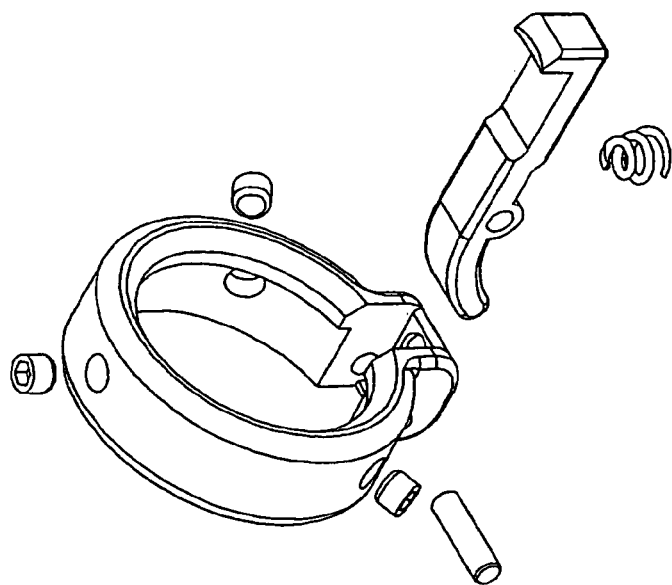
FIG. 12a shows a perspective view exploded of a latching mechanism used to attach the boom to the supporting arm.

The stop shoulder shown next to the pivot point prevents the lever latch from traveling too far, thereby allowing the lever latch to automatically slide into position on the small sleeve (FIG. 11b) lower end of the telescopic outrigger without depressing the thumb release. This is desired as usually only one hand is free to insert the boom into the mounting arm, while the operator's hand holds onto the vessel for safety reasons.

Figure 13B:
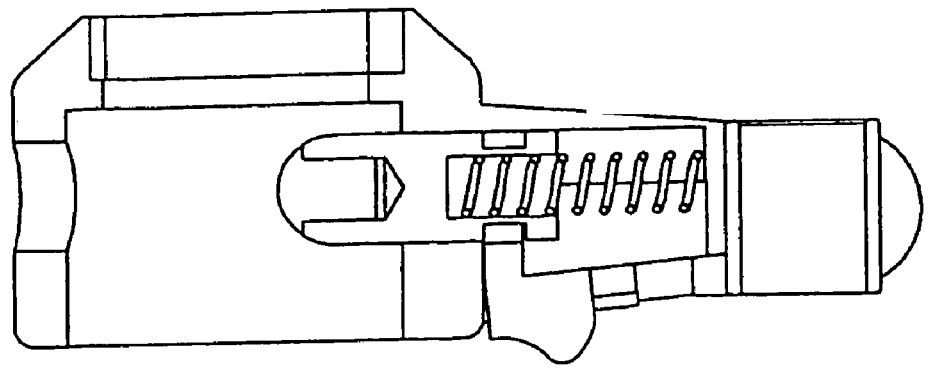
FIG. 13b shows a side elevational view in cross section of the guide locking mechanism in accordance with the present invention.
Figure 13A:
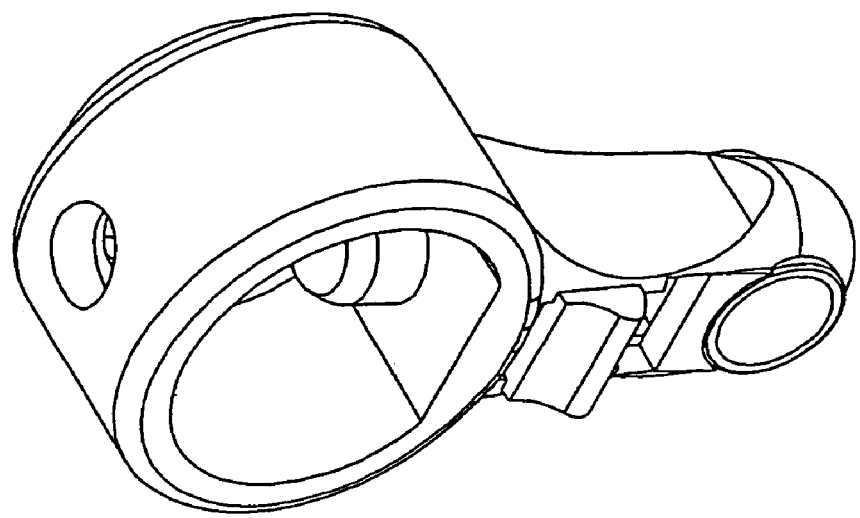
FIG. 13a shows a perspective view of a portion of the guide locking mechanism in accordance with the present invention for a single locking device.
Figure 14:
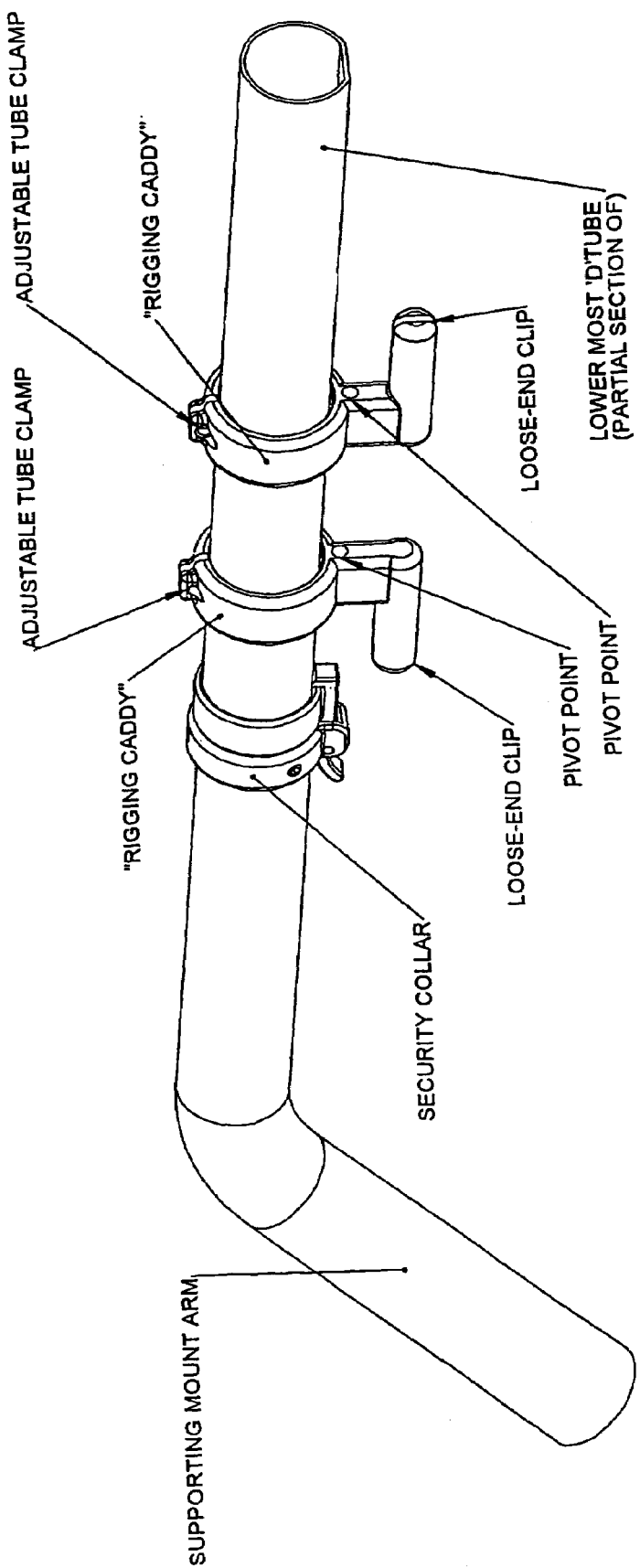
FIG. 14 shows a perspective view partially cutaway of the support mount arm, the security collar and the rigging caddy used to store the loose rigging line used with the present invention.
Figure 15:
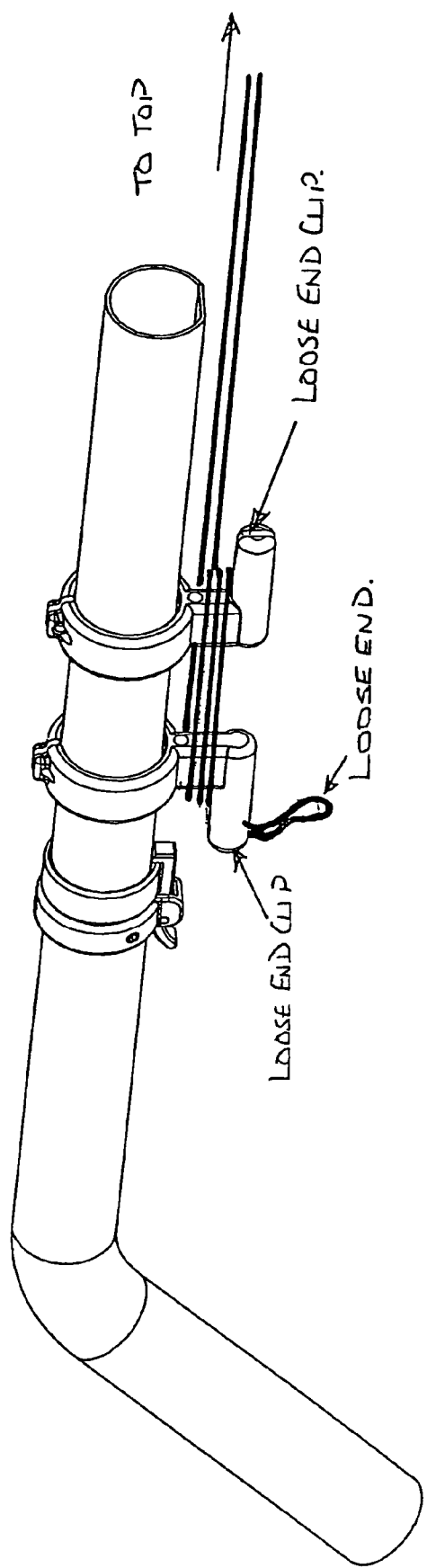
FIG. 15 shows a perspective view partially cutaway of the rigging caddy with a line stored thereon in accordance with the present invention.
Figure 16:
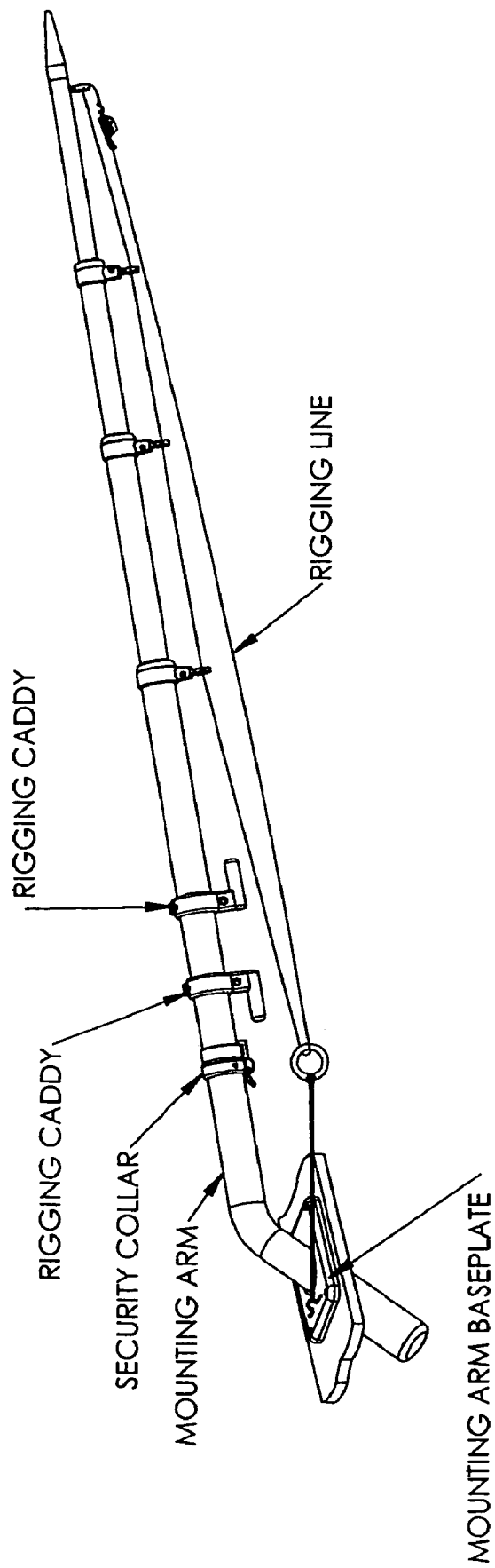
FIG. 16 shows a perspective view of an extended telescopic boom in accordance with the present invention.
Figure 17:
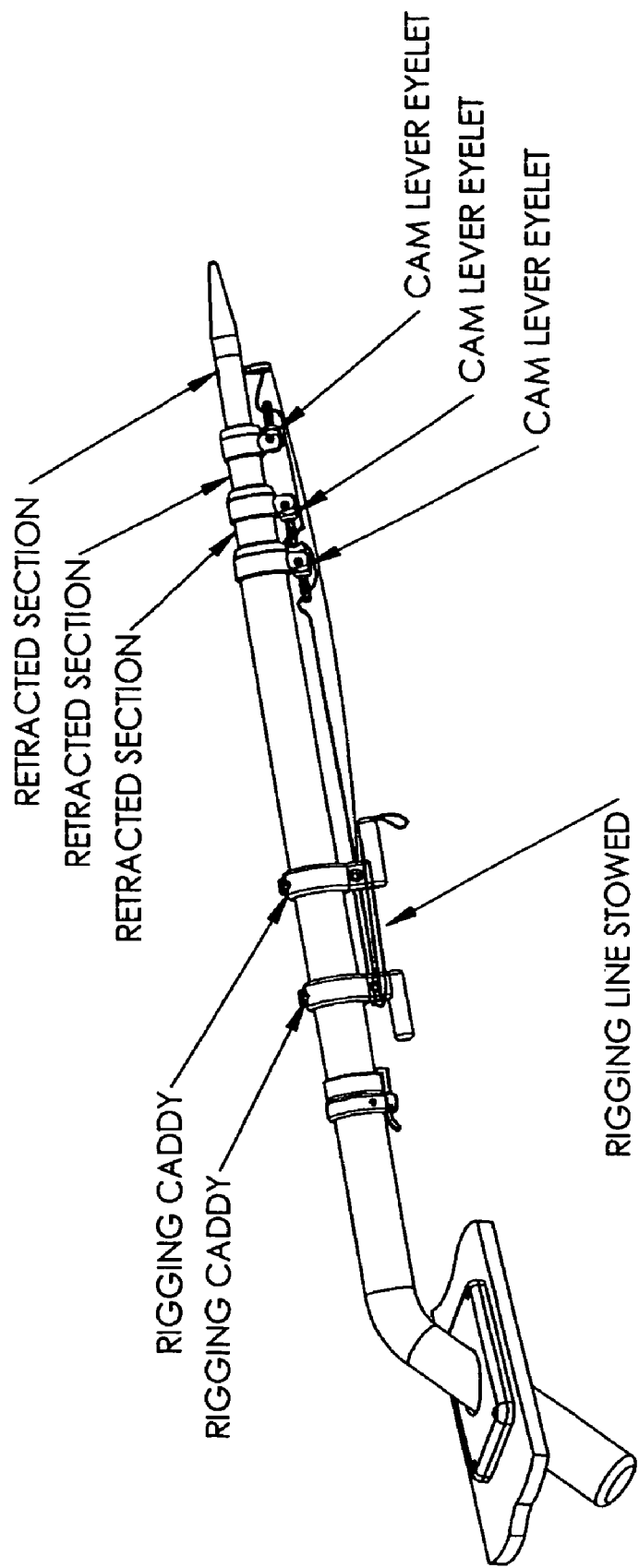
FIG. 17 shows a perspective view of a fully retracted telescopic boom with the rigging line stowed upon the Rigging Caddy.
Figure 18:
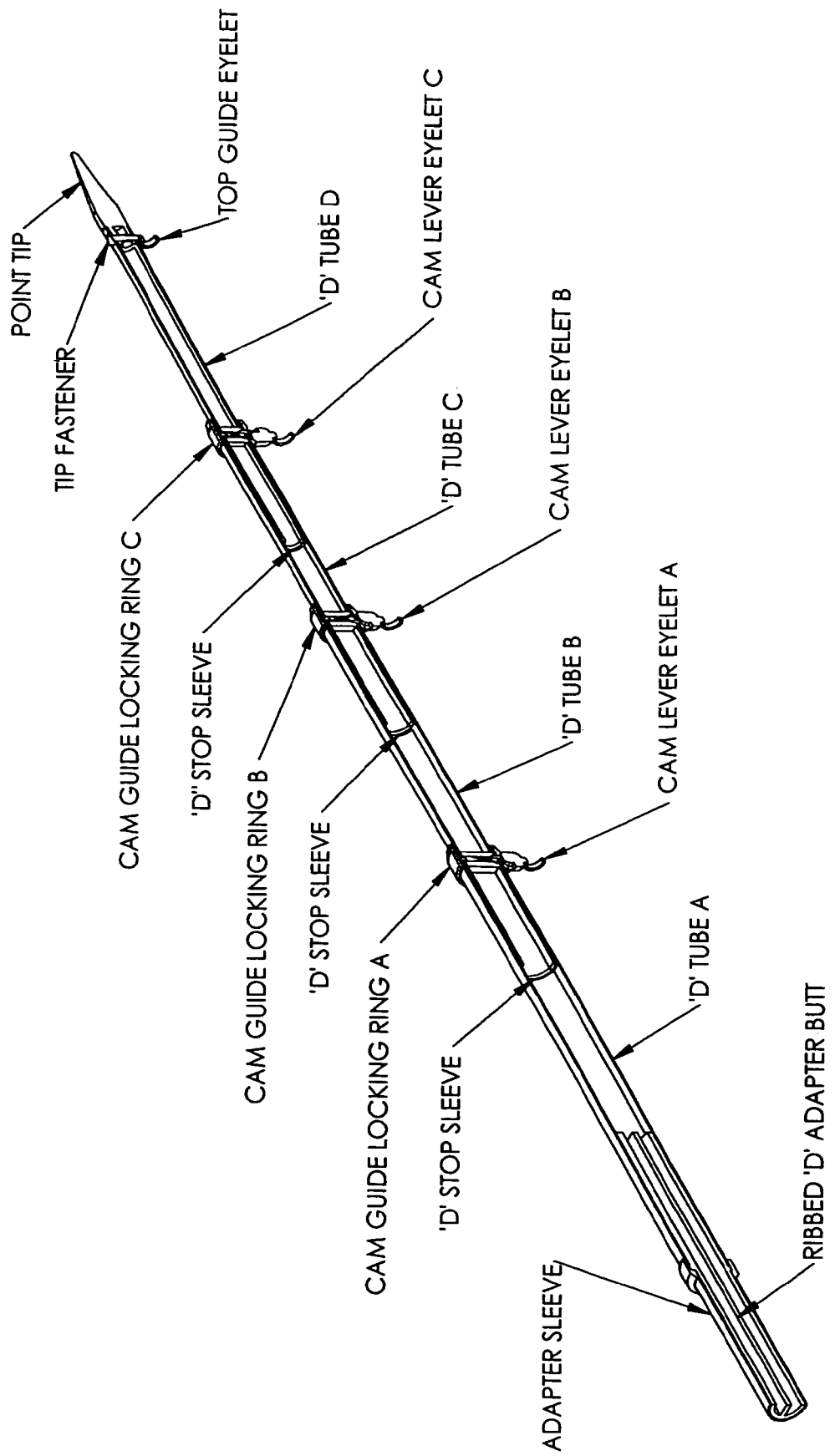
FIG. 18 shows a perspective view in cross section of the invention.
Figure 19:
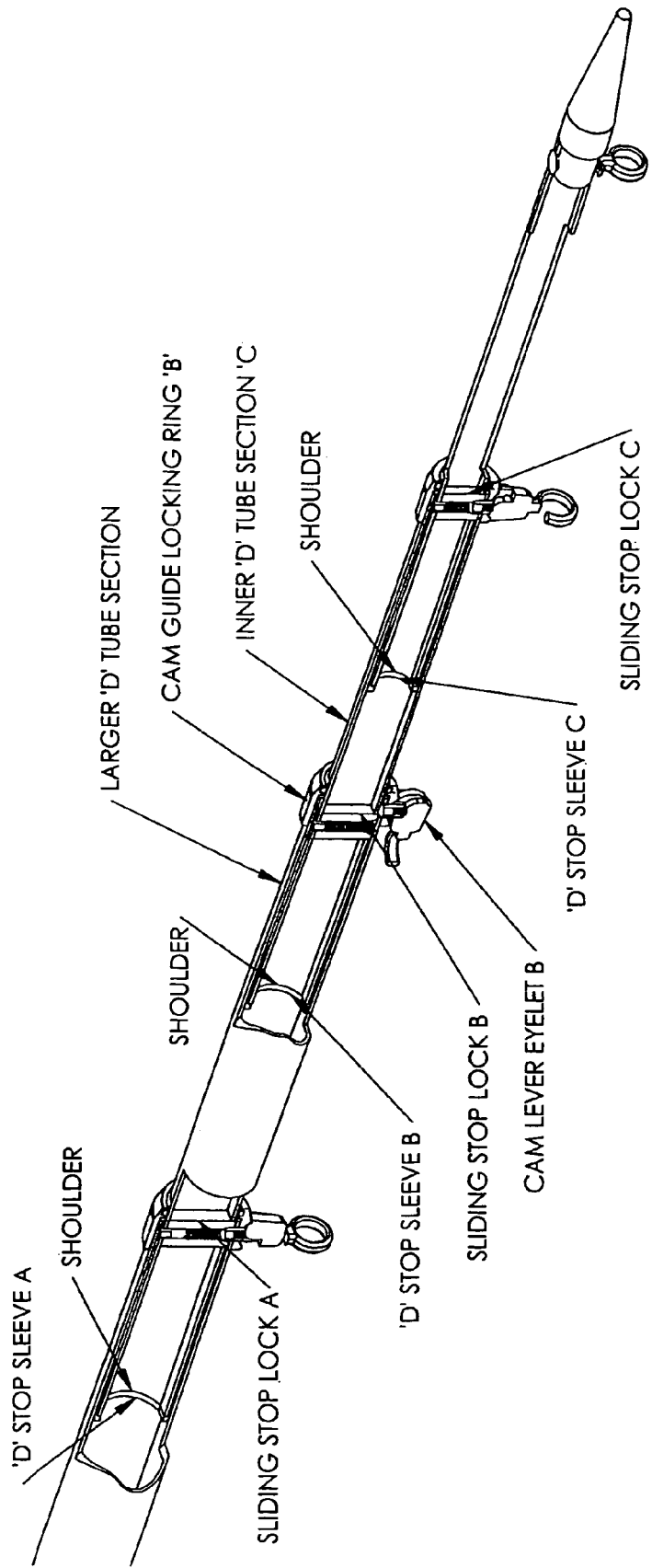
FIG. 19 shows a perspective view partially in cross section of a portion of the invention showing an unlocked section and two locked sections.
Figure 20A:
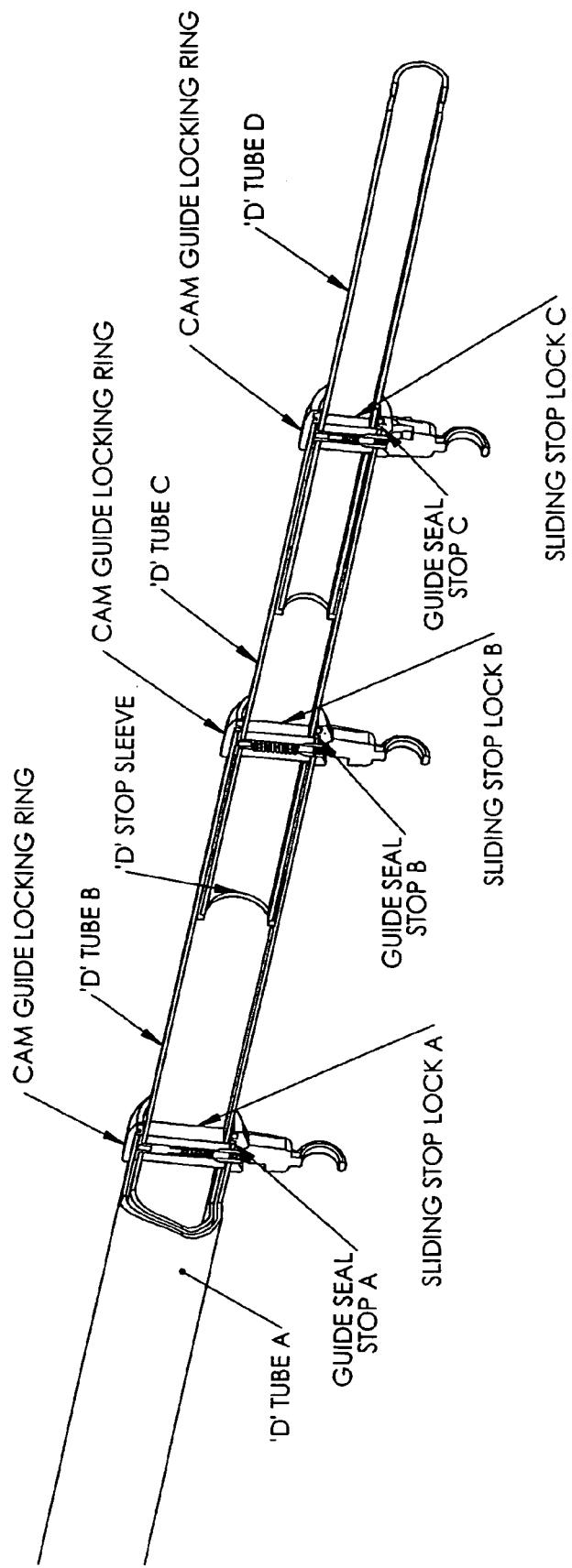
FIG. 20a shows a perspective view partially in cross section of a portion of the invention where all stages are extended and all telescoping tubes are locked together.
Figure 20B:
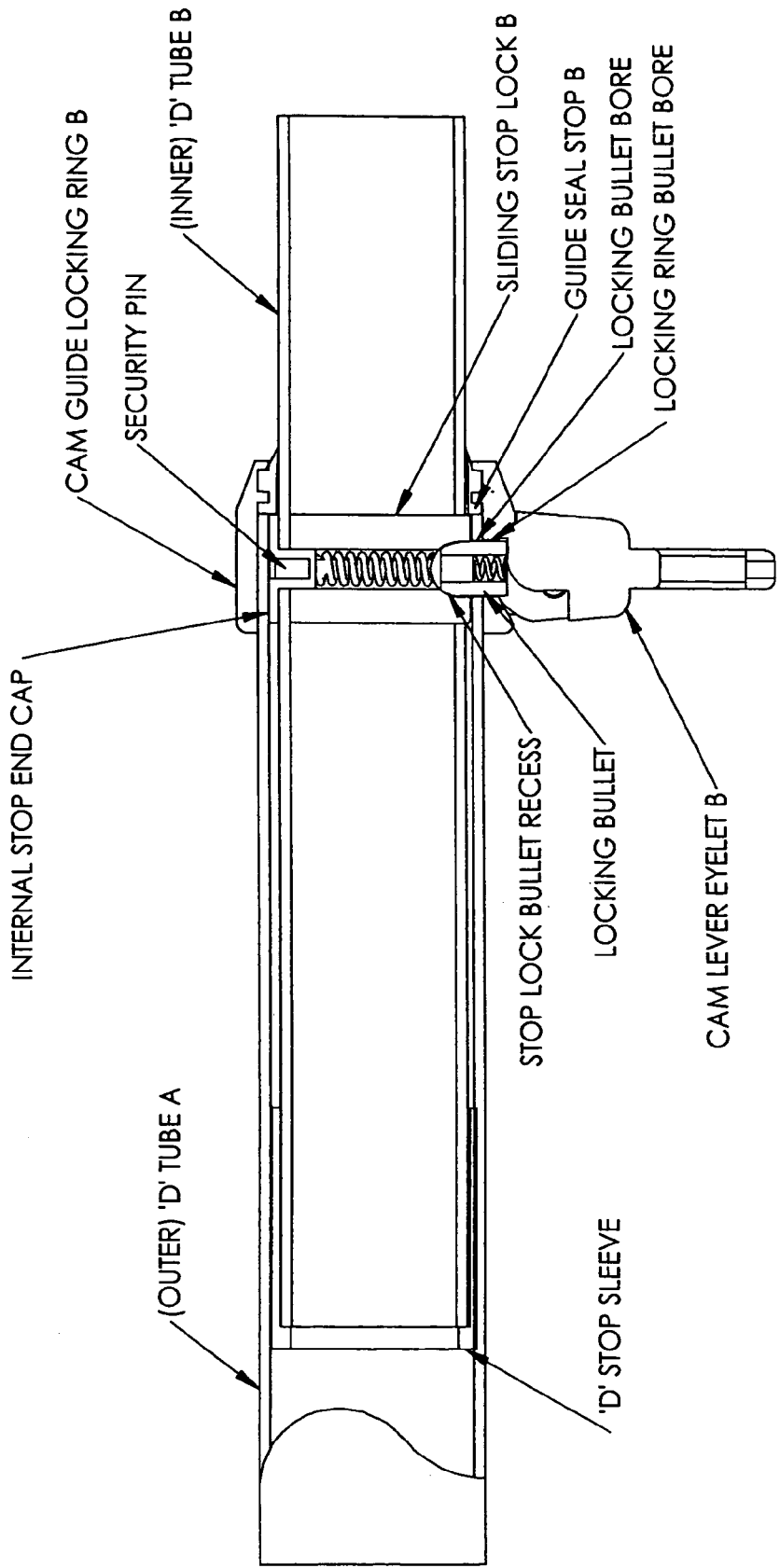
FIG. 20b shows a side elevation view cutaway of a portion of the invention in cross section.
Figure 20C:
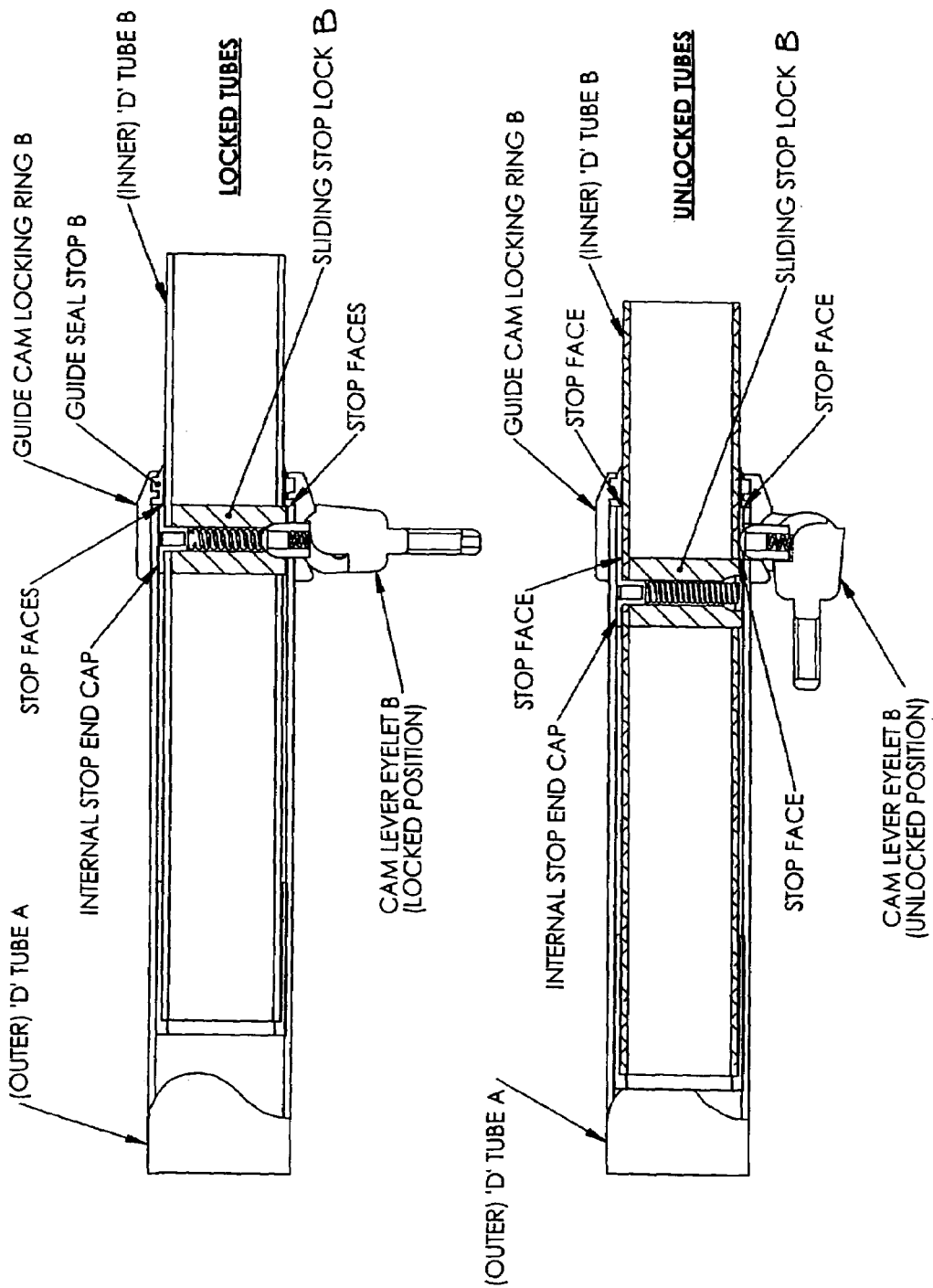
FIG. 20c shows two side elevation view cutaways of a portion of the invention in cross section including a locking mechanism.
Figure 21:
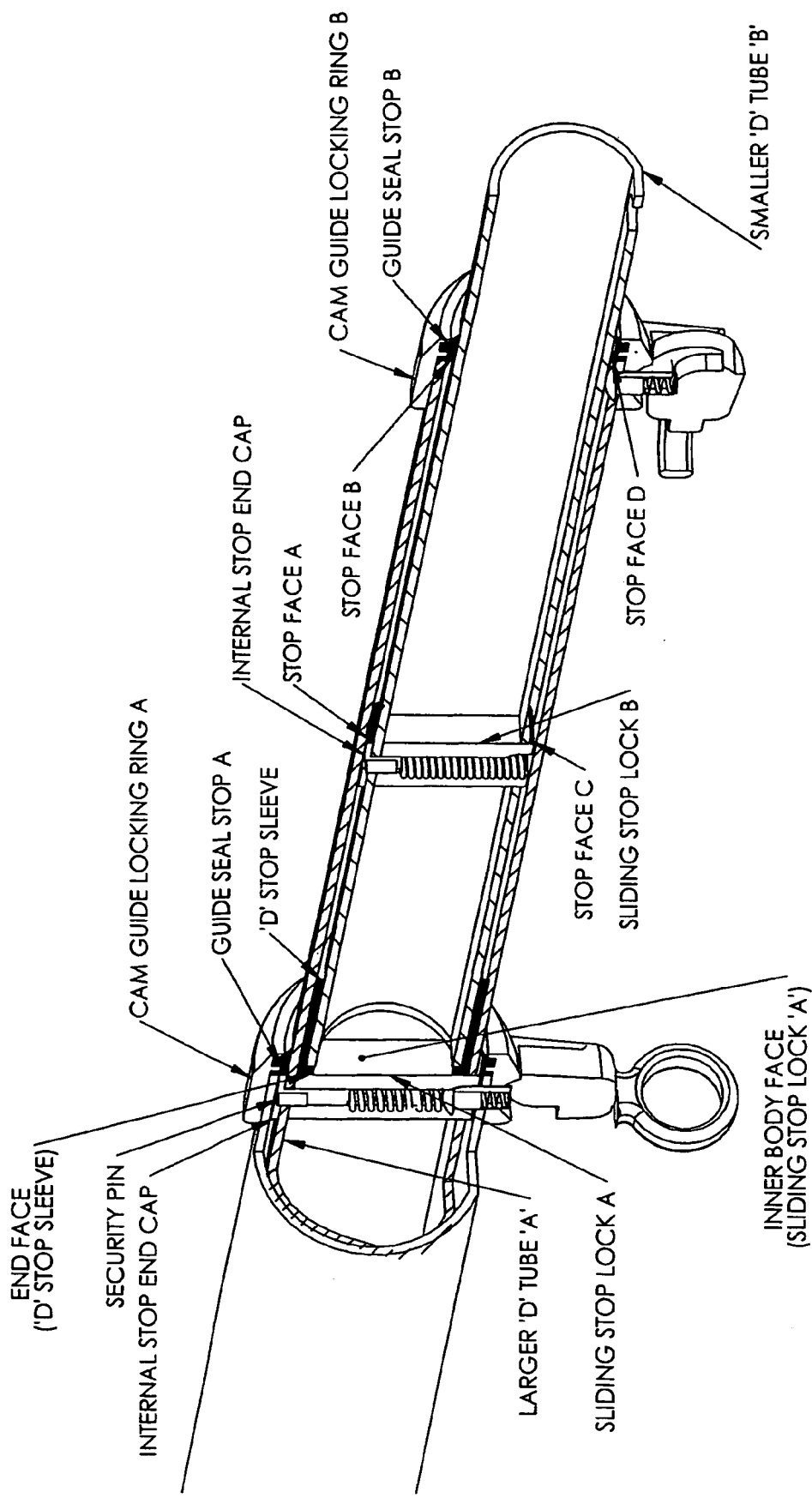
FIG. 21 shows a perspective view partially cutaway in cross section of a portion of the invention including a locking mechanism and a stopping function.

FIGS. 13a and 13b

Other views of the guide locking ring. Both illustrations show the device positioned in the locked or fully extended smaller "D" tube position noted by the position of the shift bullet.

FIG. 14

A close up view of the rigging caddy with adjustable tube clamps designed to fit larger "D" tube profile or round profile tube sections as used by other inventions.

Shown is a pivot point at the base of the adjustable tube clamp that allows easy installation without dismantling any outrigger boom sections to install it.

The loose end clip device allows the loose unwrapped ends of the excess rigging line to be trapped in the clip, so that the rigging cannot prematurely unwind from the rigging caddy.

FIG. 15

The illustration shows a close up view of the bottom portion of the present invention with the excess rigging line neatly stowed and its loose end secured.

FIG. 16

An illustration of the present invention in the fully extended position, it is shown inserted into a standard mounting arm of a standard base plate that is fastened to a vessels suitable mounting surface and shows the rigging line for sport fishing. The illustration shows a rigging caddy such fastened, adjusted and indexed to the outrigger boom ready to stow loose or excess rigging line when the present invention is in a partially retracted or fully retracted position.

Also illustrated is the present invention's security collar that securely retains the telescoping outrigger to the mounting arm and mounting base plate.

FIG. 17

Shows an attached but fully retracted telescoping outrigger boom and shown is the excess rigging line, neatly and securely stowed/wound around the rigging caddy and the loose end secured in a clip.

FIG. 18

Shown is a scaled down and cross sectioned illustration of the present invention displaying the profiled telescoping tube sections in a fully locked position with the Cam Guide Locking rings sized to suit the particular tube profile size.

Also shown are the 'D' stop sleeves that have a profile that matches the profile of the particular telescoping tube that it slides within.

The illustration shows that the 'D' tubing becomes progressively smaller in diameter as more sections are added. Typically 3, 4 and 5 different tubes of 11, 15 and 18 foot overall length, respectively, when fully extended.

Typically retracted length is approximately 6 feet for an 18 foot five section model.

Figure 3:
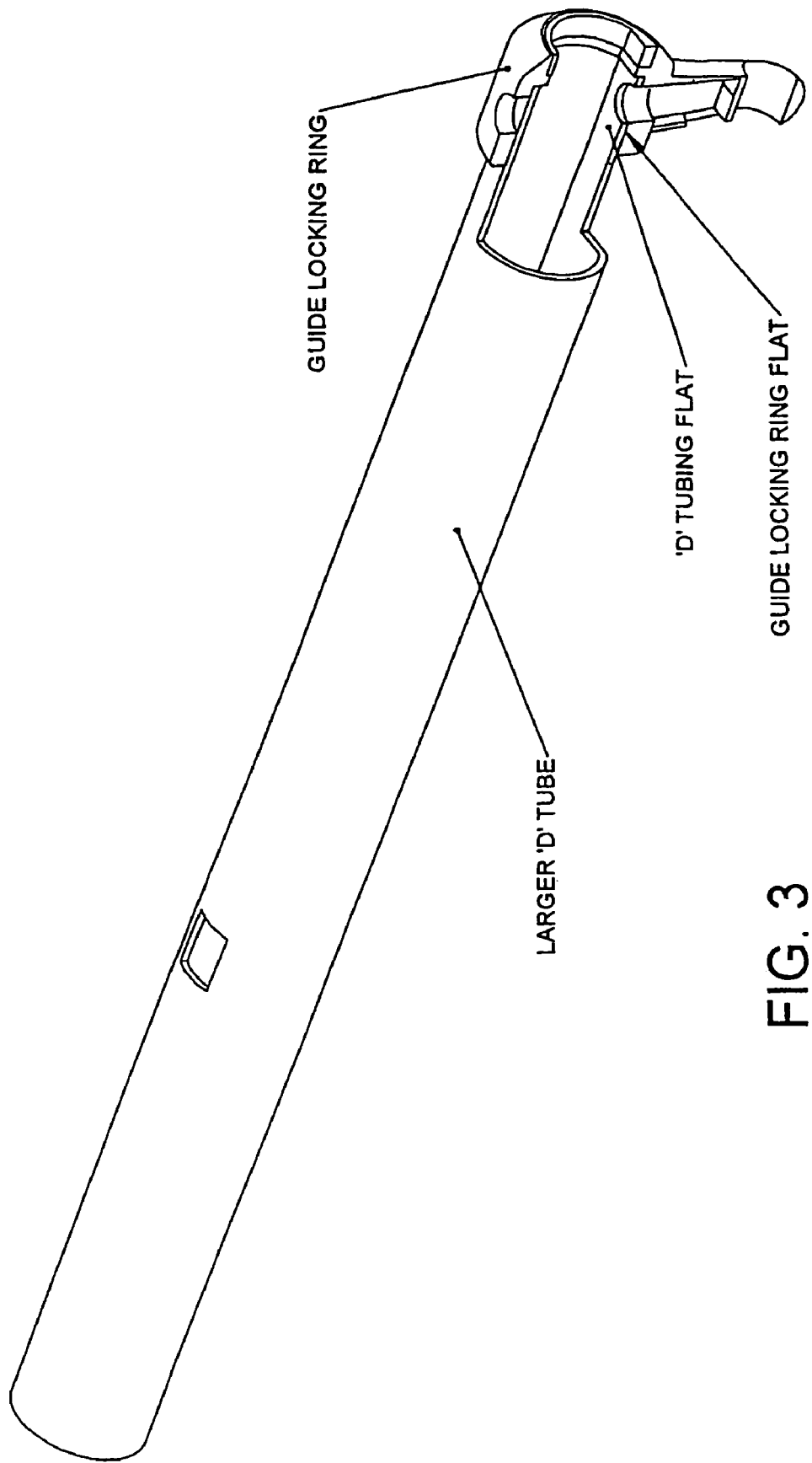
FIG. 3 shows a schematic diagram of one tube and a portion of the locking ring partially cutaway in cross section.

At the far right end of FIG. 3 the Point tip, top Guide eyelet and tip fastener that secures and indexes the two components to the smallest profiled tube section is shown. The top guide eyelet is aligned with the other Cam Lever Eyelets attached to the Cam guide Locking rings that are securely positioned to one end of each 'D' tube sections.

FIG. 19

Shown is a scaled down and partially cross sectioned illustration of the present invention showing 3 separate sliding stop lock components that work in conjunction with the cam guide locking rings and associated locking components.

Also shown is a cam lever eyelet 'B' pivotally attached to the center most Cam guide locking ring 'B', which is in the unlocked position, allowing the inner 'D' tube 'C' section to retract downwards into the larger adjacent 'D' tube section.

Also shown are 'D' Stop sleeves attached to the end of their respective 'D' tube section. These act as internal guides and drainage points for the telescoping outrigger boom, and all have an operating clearance gap around the outside surface to allow a sliding motion within the outer and larger 'D' tube sections.

The 'D' stop sleeves are profiled the same as the 'D' tube sections to prevent the inner tubes from turning within the outer 'D' tube sections. The 'D' stop sleeves are positioned as far apart as necessary from the sliding stop locks to control tail end whip of the smaller 'D' tube when exerted forces result in flexing of the extended telescopic outrigger.

The 'D' stop sleeves also have a through end shoulder and bore. The bore allows drainage of any water that may enter inside the boom tubes. The shoulder inside the 'D' stop sleeves is to prevent the 'D' stop sleeve from sliding along the 'D' tube section it is fitted on towards the sliding stop lock components.

FIG. 20a

Shown is a partially cross sectioned illustration of the present invention showing the profiled telescoping tube sections in a fully locked position.

Also shown are the Sliding stop locks and Guide seal stops that prevent the inner smaller cross section 'D' tube sections from also extending past one end of the larger Outer 'D' tube sections. The Sliding lock stop halts when it contacts the guide seal stop. The Guide seal stop is permanently attached within an integral inner slot of the Cam Guide locking rings that are permanently indexed and attached to each end of the larger 'D' tube section of the telescoping outrigger boom.

FIG. 20b

Shown is a close up and sectioned side illustration of one locked short section of the present invention. The smaller inner 'D' tube is fully extended inside the larger outer 'D' tube and are both locked together by the Cam Guide locking ring's associated locking mechanism's components.

Shown is a Locking bullet that has been engaged with a Stop Lock bullet recess within a sliding lock stop by a Cam lever eyelet that pivotally has forced the Locking bullet into a locked position. The cam guide locking ring which is permanently secured to one end of the larger outer 'D' tube retains the guide seal stop that is in close proximity or touching the sliding stop lock in a fully extended position.

The Cam guide locking ring has a locking ring bullet bore that is aligned with a locking bullet bore through the outer flat face wall of the Larger outer 'D' tube, permitting the Locking bullet to pass through and engage with the sliding lock stop.

Also shown is an Internal stop end cap that is permanently attached to the Sliding lock stop through the outer wall of the inner 'D' tube section. It is also permanently attached by a Security pin driven into the two assembled components.

The internal stop end cap also acts as an end stop for the inner tube within the outer tube as it makes contact with the Guide seal stop in the fully extended position of the telescoping inner section.

Shown is the outer periphery of the internal stop end cap pressed up against the inner wall of the larger 'D' tube to eliminate as much clearance as possible between the inner telescoping tube section and the larger outer 'D' tube section.

The internal stop end cap also guides the inner tube inside the larger 'D' tube whilst extending and retracting the telescoping tube sections, such that on disengagement of the locking bullet from inside the stop lock bullet recess an operating clearance is permissible allowing a 'free' sliding telescoping action of the inner tube within the outer tube.

FIG. 20c

Shown are two partially cross section views of one locking section of the present invention. One shows the inner & outer tubes locked together in the fully extended position, the other shows the inner and outer tubes unlocked and the inner tube slightly retracted and away from the locking position.

The uppermost illustration shows the stop faces of both the internal stop end cap and guide seal stop that are touching or in close proximity to each other. This is the desired position for the Locking bullet to engage with the sliding lock stop.

Also shown in the uppermost illustration is that the lower face of the sliding stop lock is also in contact or in close proximity with the guide seal stop when in the fully extended position.

The lower illustration shows that the cam lever eyelet is positioned so as to disengage (unlocked position) the locking bullet from within the sliding stop lock which allows the smaller Inner 'D' tube to slide in either direction within the larger outer 'D' tube.

Also shown in the lowermost illustration is that the stop faces of both the internal stop end cap, sliding stop lock and the guide seal stop has widened in relation to the distance the inner 'D' tube has slid down within the outer 'D' tube as the guide seal stop is permanently retained within the cam guide locking ring and therefore cannot change position.

Both illustrations show an integral groove/slot within the cam guide locking ring that prevents the guide seal stop from moving in either direction and one lip of the guide seal stop is permanently positioned facing one end of the larger outer 'D' tube.

FIG. 21

This partially sectioned illustration shows the smaller 'D' tube section 'B' in the fully retracted position in relation to the larger 'D' tube section 'A'.

The sliding stop lock, internal stop end cap and security pin attached to the larger 'D' tube section 'A' now also act as stop components for retracting the inner smaller 'D' tube section 'B' as the operator slides it down inside.

A 'D' stop sleeve which is attached to the bottom most end of the smaller 'D' tube section 'B' is also a guiding, drainage and venting component within the inner wall of the larger 'D' tube section 'A'. It acts as a means for venting air and moisture from the upper telescoping tube sections and acts as a bump stop that contacts the inner body face of the sliding stop lock 'A' on full retraction of the smaller 'D' tube inside the larger 'D' tube.

A smaller sliding stop lock (of smaller 'D' tube) is also shown. It is noted that each of the 'D" tube sections of the present invention has a sliding stop lock installed inside the lower most end of each telescoping section with the exception of the largest tube section of the boom assembly. This lowermost tube section uses a 'D' butt instead of a sliding stop lock for the 'D' stop sleeve of the smaller inner tube section to bump against in the fully retracted position.

FIG. 22a

Shows an exploded illustration of one section of the present invention, with just a short piece of a 'D' tube section shown with a cam guide locking ring and guide seal stop at the top most end of the tube section.

The Cam guide locking ring and Guide Seal stop have corresponding flat profiles that align with the 'D" tubes flat profile.

When these components are completely assembled the end face of the Guide seal stop is positioned against the end face of the 'D' tube, as the guide seal stop is installed inside the cam guide locking ring using a retaining slot and retaining groove before the cam guide locking ring is permanently attached to the top end of the 'D' tube.

The flat profiles of the Cam guide locking ring and Guide seal stop will align and index these components together for the precision alignment required by this telescoping outrigger boom.

FIG. 22b

Shown is an assembled but scaled down section of the present invention with the Cam guide locking ring and guide seal permanently attached the upper most end of a 'D' tube section.

Figure 22A:
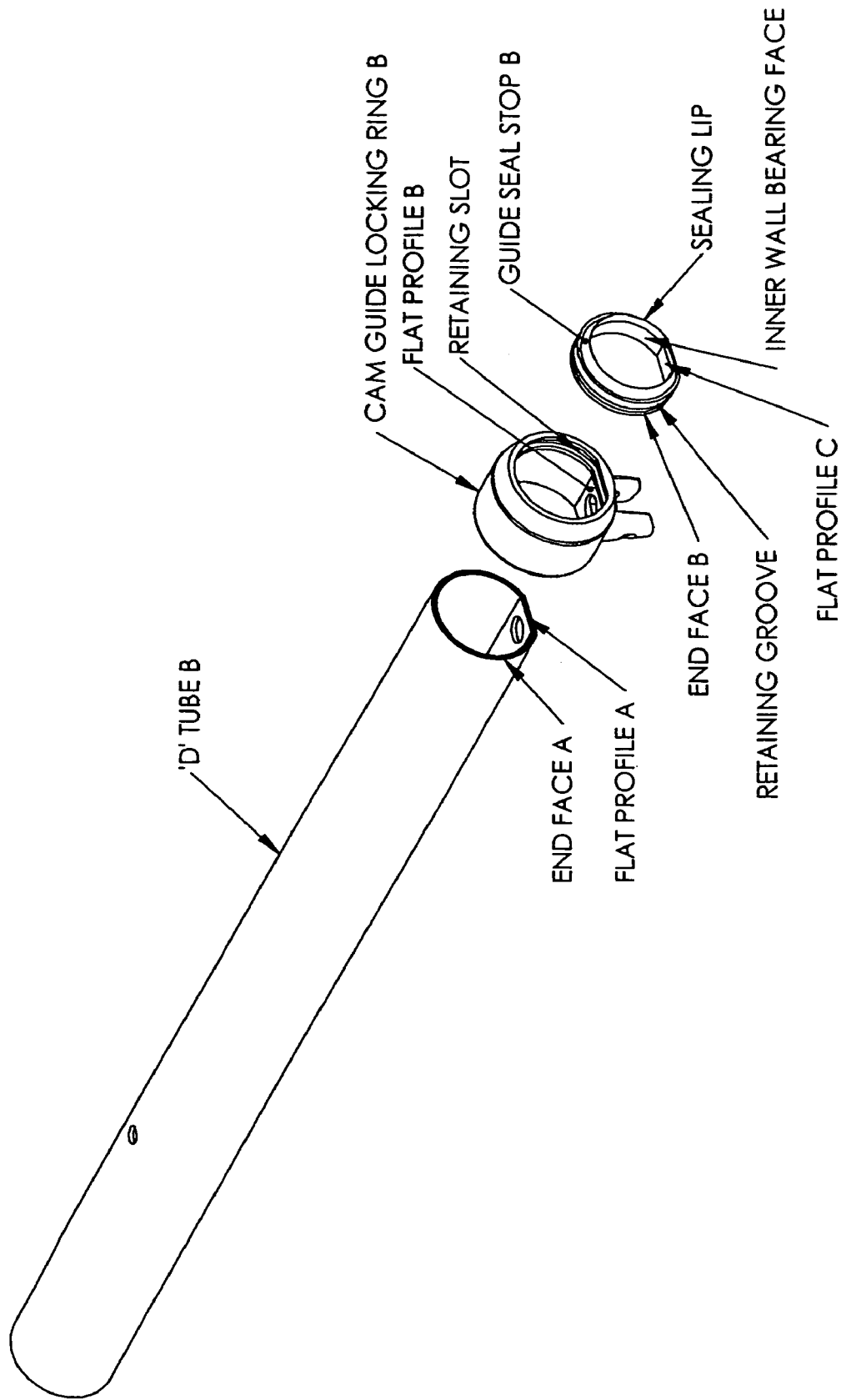
FIG. 22a shows an exploded perspective view of an outer tube, Cam guide Locking Ring and Guide seal stop of the present invention.
Figure 22B:
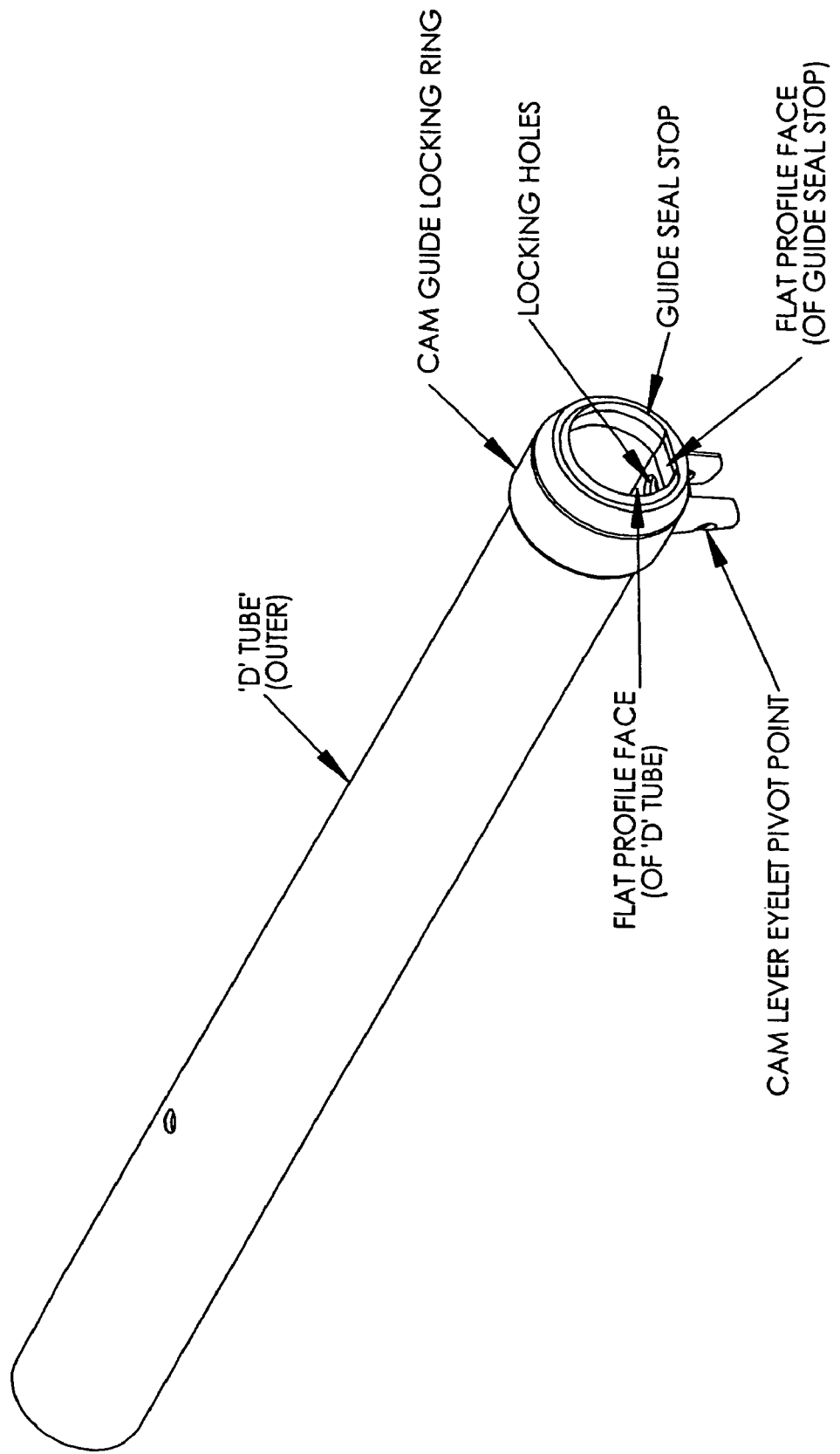
FIG. 22b shows an assembled perspective view of an outer tube, Cam Guide Locking Ring, Cam Lever eyelet pivot point and Guide Seal Stop of the present invention.
Figure 23A:
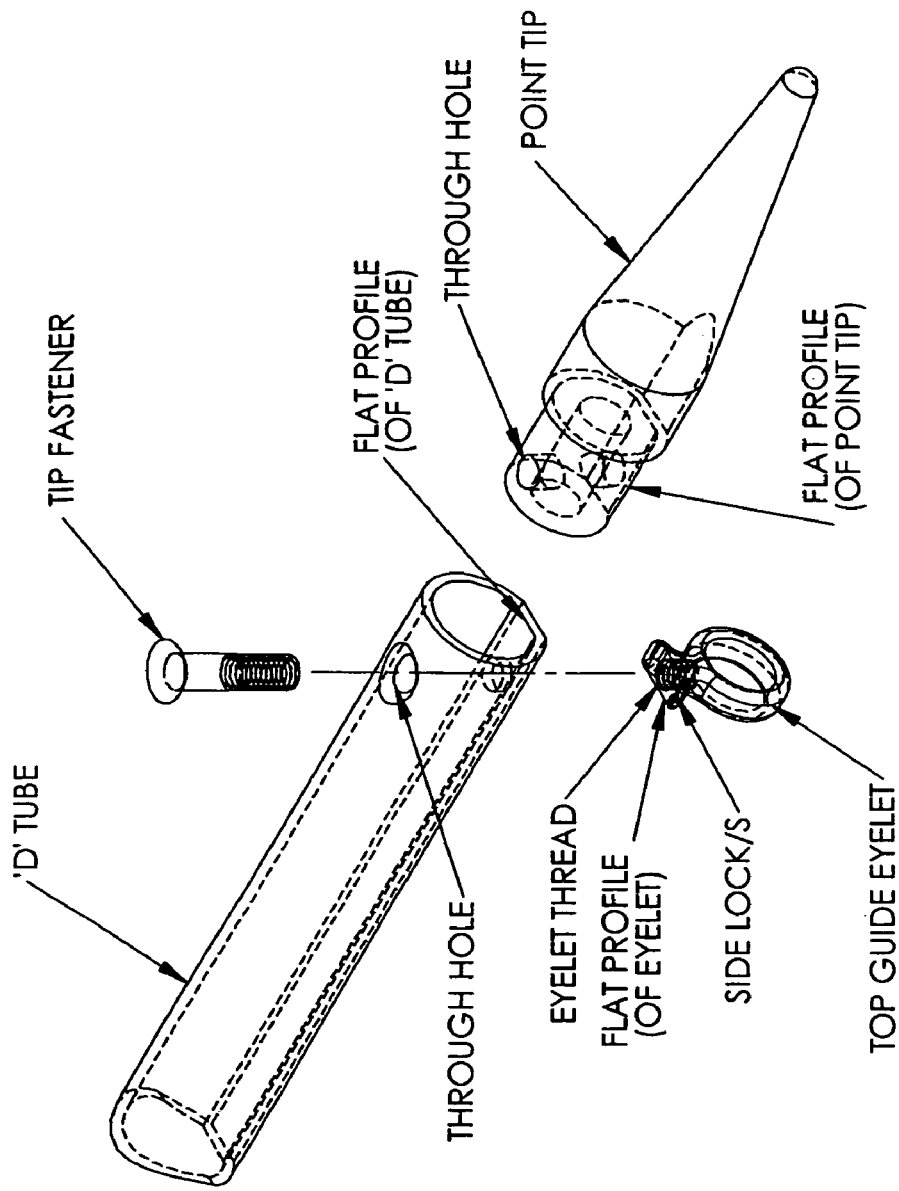
FIG. 23a shows an exploded perspective partial view of a tube section, Top Guide Eyelet and Point tip securing and alignment of the present invention.
Figure 23B:
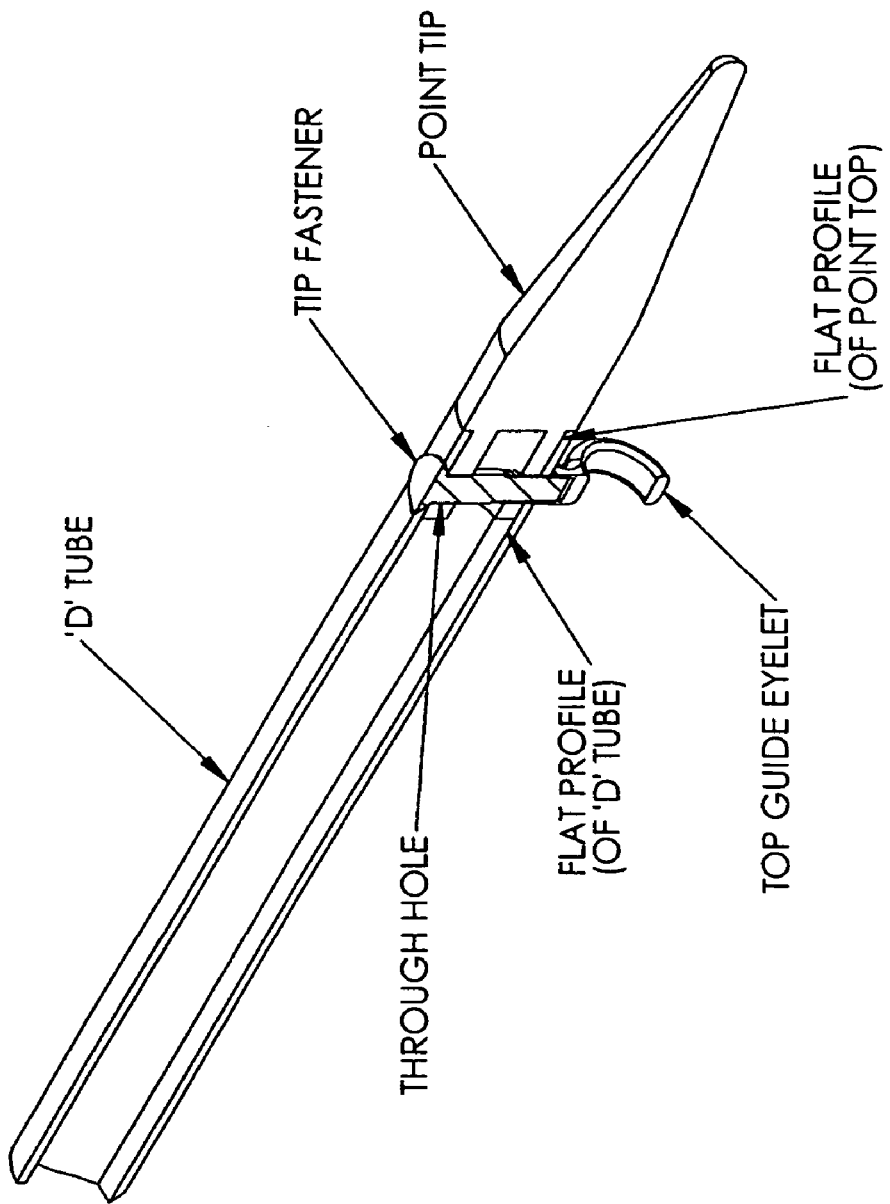
FIG. 23b shows a perspective assembled view partially cutaway of the securing and alignment method of the Top Guide Eyelet, Point tip and tube section of the invention.
Figure 23C:
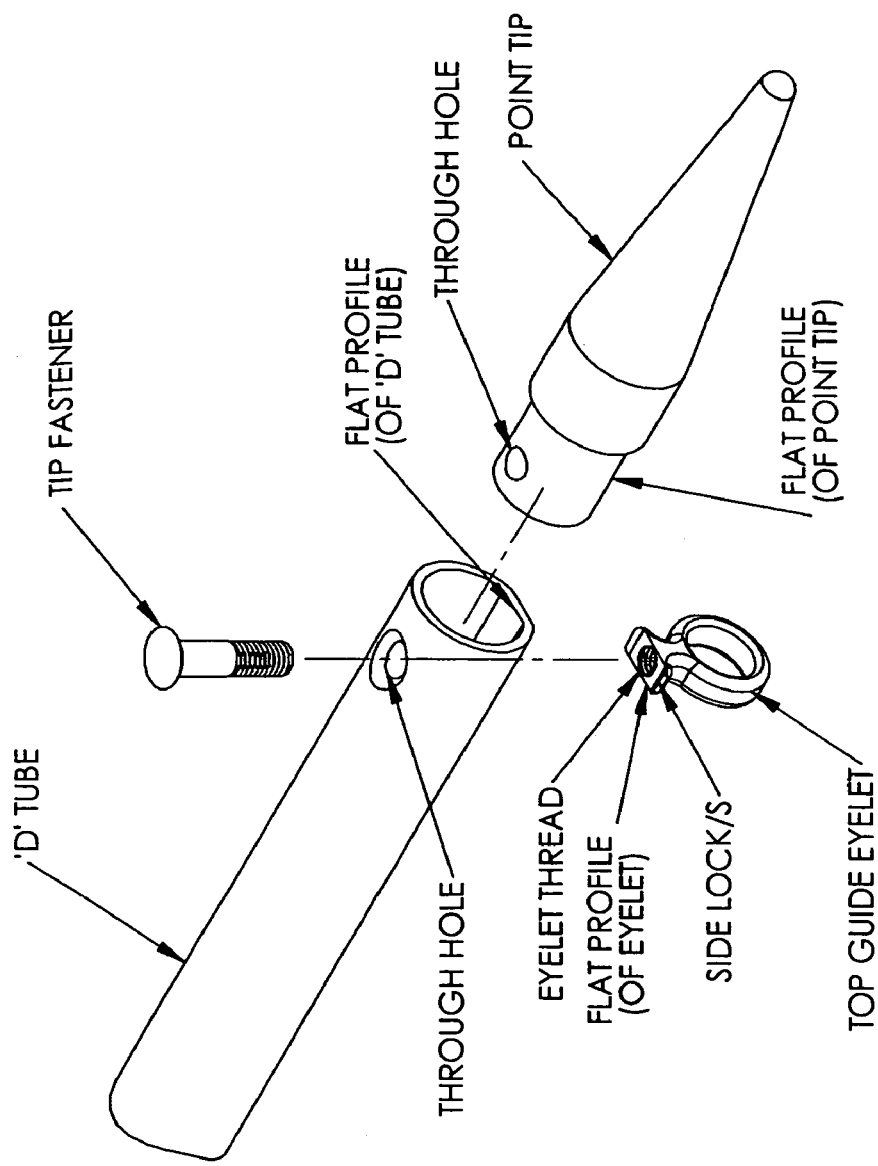
FIG. 23c shows an exploded perspective partial view of the alignment and locking method of the Point tip and Top Guide Eyelet to the topmost tube of the present invention.
Figure 23D:
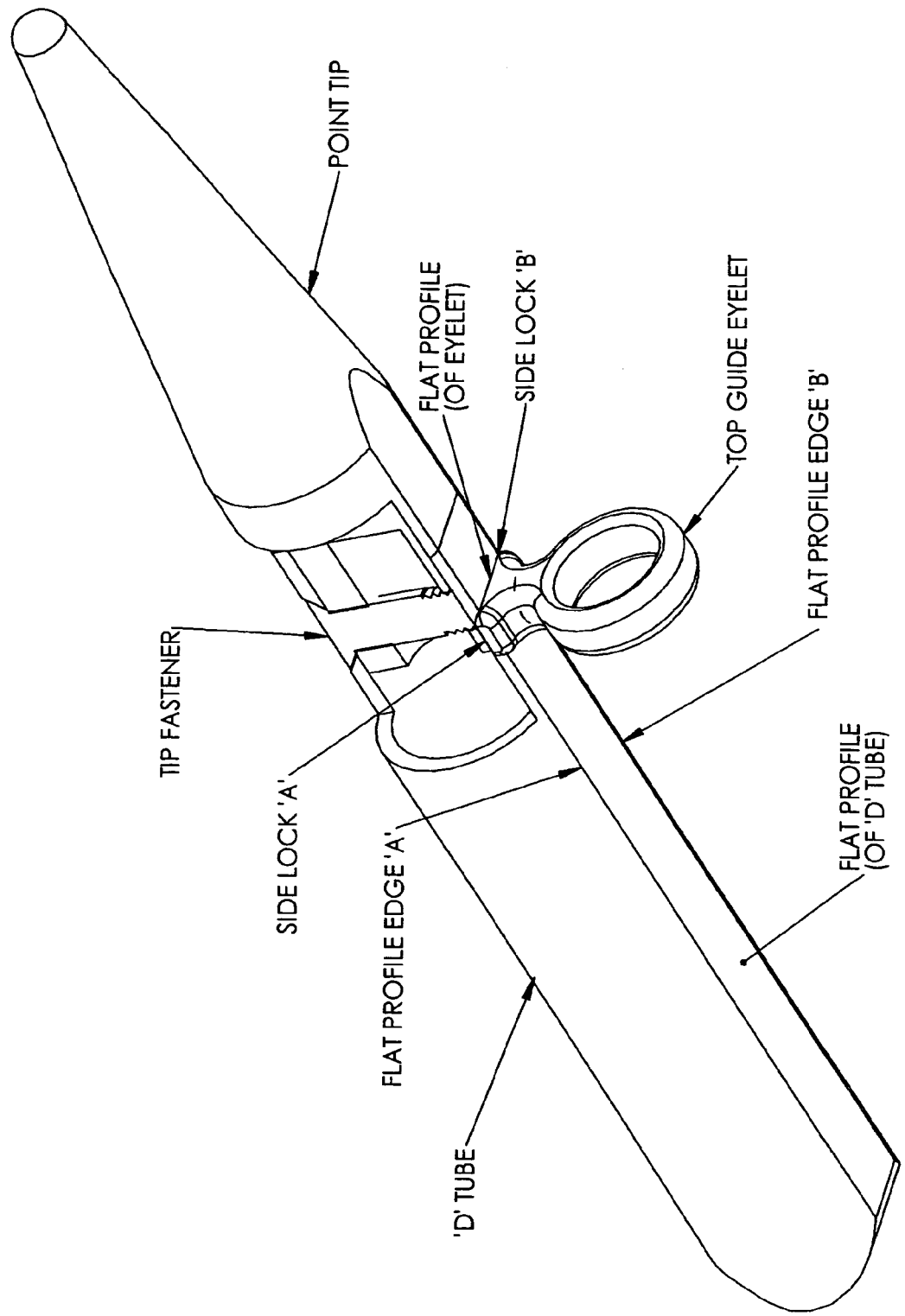
FIG. 23d shows a assembled and partially cutaway perspective view of the securing of the Top Guide Eyelet to the Point tip and Flat profile section of the tube of the present invention.

Also shown in the illustration is that the locking holes in both the Cam guide locking ring and 'D' tube section are aligned as these two components are indexed to each other by the Flat profile faces mentioned in the description of FIG. 22a.

Also shown in the illustration is that the flat profile face of the guide seal stop is also indexed to the cam guide locking ring and 'D' tube (outer) section.

FIG. 23a

Shown is partial tube exploded illustration of a partial inner and smallest tube section of the present invention.

Shown is a point tip with a flat profile that corresponds to a flat profile of the smallest and inner 'D' tube section of the telescoping outrigger boom, a top guide eyelet with corresponding flat profile and a tip fastener for aligning/indexing and securing all the endmost tube section components together.

The point tip is inserted into the inside profiled bore of the 'D' tube section. A top guide eyelet is then attached on the outside periphery of the 'D' tube section. The tip fastener then retains both Point tip and Top guide eyelet to the 'D' tube section by passing through holes that go straight through both walls of the 'D' tube section, the point tip and into the threaded Top guide eyelet. This aligns and tightens the flat profiles to the 'D' tube section's Outer flat profile and these components become permanently aligned and secured.

The Top guide eyelet which carries the rigging line at the top end of the present invention therefore becomes aligned to the same plane as the other Cam lever eyelets in the lower telescoping 'D' tube sections.

FIG. 23b

Shown is a scaled down and cross sectioned partial 'D' tube section illustration of the present invention with the point tip, 'D' tube, Top guide eyelet and tip fastener all aligned and permanently secured to each other.

The rigging line that is supported by the Top guide eyelet of the smallest and end most section of the telescoping outrigger boom will be in alignment with all the other Cam lever eyelets attached to the lower Cam Guide locking rings and 'D' tube sections.

FIG. 23c

Shown is a partial section illustration of the point tip end of the present invention that shows side locks on each side of the flat profile of the Top guide eyelet. When the top guide eyelet is fully assembled as described in FIG. 23b, they will overlap/lock with the peripheral flat profile of the 'D' tube to exactly align the Top Guide eyelet to the 'D" tube section.

FIG. 23d

Shown is a scaled up and partially cross sectioned illustration of the present invention showing the flat profile of the Top Guide eyelet firmly in contact and aligned with the 'D' tube section.

Shown are side lock's A and B which wrap slightly around the two flat profile edges A and B of the 'D' tube. This wrapping of the Top guide eyelet around the flat profiled periphery of the 'D' tube always retains/locks the Top Guide eyelet in the same plane.

The Tip fastener also shown, passes through holes in the walls of the 'D' tube, point tip and into a threaded bore of the Top Guide eyelet.

FIG. 24a

Is a close up and more detailed cross section view of the Cam guide locking ring, Larger (outer) 'D' tube, sliding/telescoping smaller (Inner) 'D' tube, cam lever eyelet and associated locking, stopping and Sliding Stop lock components of the present invention.

The smaller 'D' tube is almost at its fully extended position. A bullet tip is fixed into the one end of a Locking bullet that is within a bore of the cam guide locking ring and has a force exerted on the locking bullet by a spring for the purpose of pushing the Bullet tip towards the outer face of the smaller (Inner) 'D' tube, noted as the 'rubbing point', and ready to engage/pass through the stop lock recess of the sliding stop lock when the smaller (Inner) tube section is in the fully extended position aligned with the locking bullet.

The wear tip is preferably made of a low friction material, such as plastic, to prevent scratching of the outside face of the smaller (inner) 'D' tube section.

Also shown is a cam lever eyelet that is pivotally attached at a cam lever pivot point to the cam guide locking ring. The cam lever eyelet is shown in an unlocked position.

A cam profile of the cam lever eyelet in contact with a Locking bullet spring that is within the bore of the locking bullet that pushes against the Bullet tip is shown. A gap between the locking bullet and Cam profile allow for a detent action of the locking bullet away from the outside flat face of the smaller (inner) 'D' tube.

As the smaller (inner) 'D' tube section is telescoped to the right hand direction in the figure, within the Larger (outer) 'D" tube, the Stop face C of the Sliding stop lock is shown to contact the Bullet tip that has a spring pressure forcing the Bullet Tip onto the outside flat face of the smaller (inner) 'D' tube. Upon reaching the bullet tip during extension, the operator of the present invention will feel a slight ramping/detent spring resistance as the stop face C of the sliding stop lock contacts the locking bullet spring pressure that is pushing the bullet tip and locking bullet into the sliding stop lock.

Also shown is a directional arrow indicating that the smaller (inner) 'D' tube is free to slide fully to the left to a retracting position and to the right end of the illustration towards the fully extended position within the larger (outer) 'D' tube because the Cam lever eyelet is in the unlocked position as shown.

FIG. 24b

Shown is a detailed cross section view of the present invention showing that the operator has telescoped the smaller (inner) 'D' tube section within the larger (outer) 'D' tube to overcome the spring pressure of the Locking bullet spring that is pushing on the Bullet tip, attached onto one end of the locking bullet.

Shown is a front sliding stop lock face of the sliding stop lock that is permanently attached to the smaller (inner) 'D' tube and is preferably made of a plastic material. The Bullet tip slides along the lower face of the sliding stop lock under spring pressure and causes a slight resistance that can be felt by the operator as he slides the smaller (inner) 'D' tube section further to the right to position the 'D' tube continually closer to reach the fully extended position.

The lowermost end of the Locking bullet spring is shown almost in contact with the contact point of the cam lever eyelet, but the Locking bullet will not touch the Contact point when the Inner 'D' tube is in this position.

Also shown is an Internal stop end cap that is also attached to the opposite side of the sliding stop lock which help guide, stop and secure the 'D' tube inner walls during extension and retraction. Even though the bullet tip is pushing the Internal stop end cap against the inner wall of the larger (outer) 'D' tube, a sliding action is still permitted of the smaller (inner) 'D' tube section even though it is slightly harder for the operator to slide the inner 'D' tube.

Shown is a stop face gap within the Inner wall of the Larger (outer) 'D' tube and smaller (inner)'D' tube which reduces in width as the (inner) 'D' tube is progressively telescoped toward the fully extended position. This stop face gap of the front (right hand of the illustration) end face of both the secured Internal stop end cap and Sliding stop lock will continue to reduce as the operator continues to slide the inner 'D' tube within the outer 'D' tube.

FIG. 24c

Figure 24A:
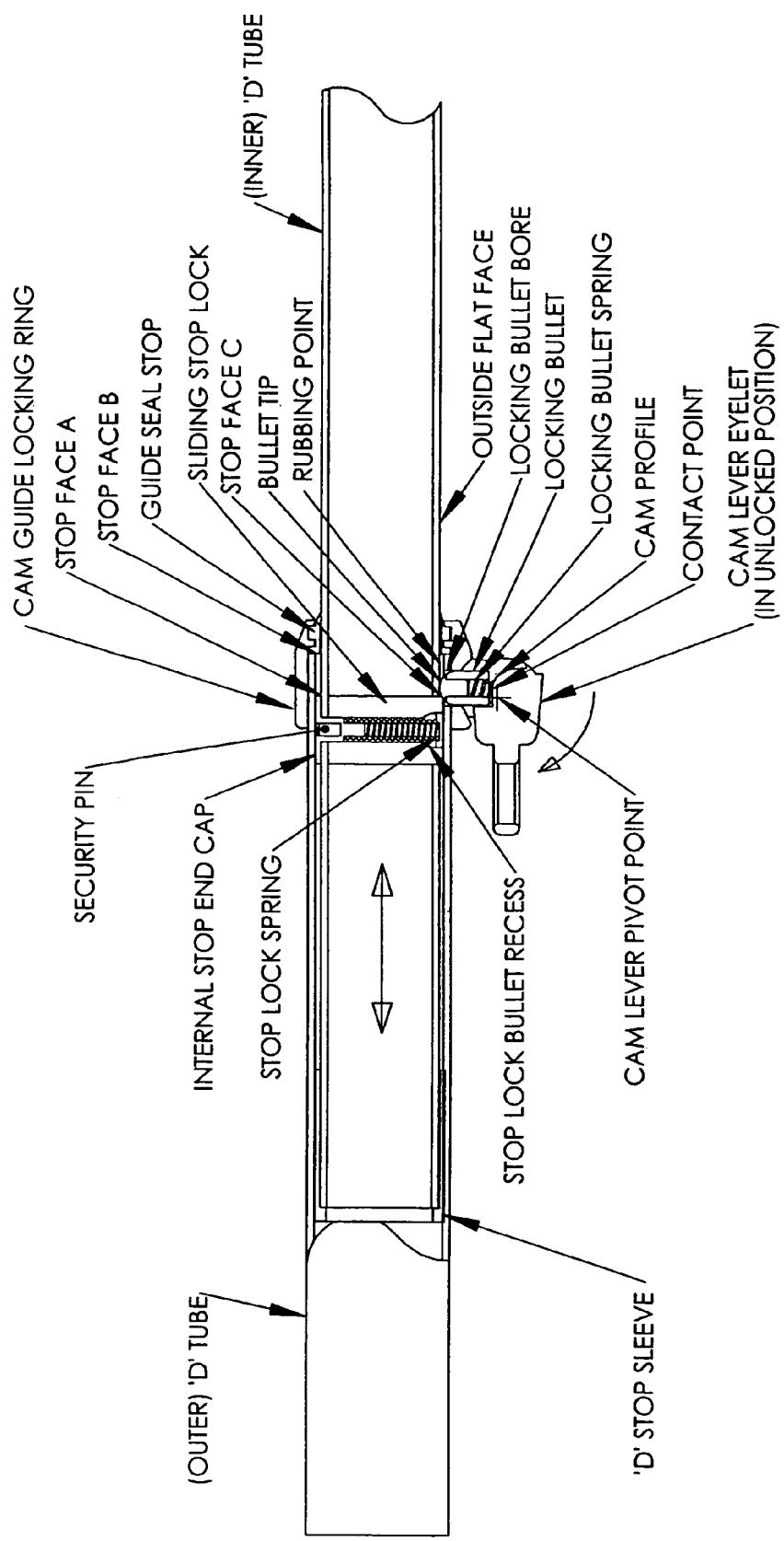
FIG. 24a shows a side elevation view in cross section partially cutaway of the present invention
Figure 24B:
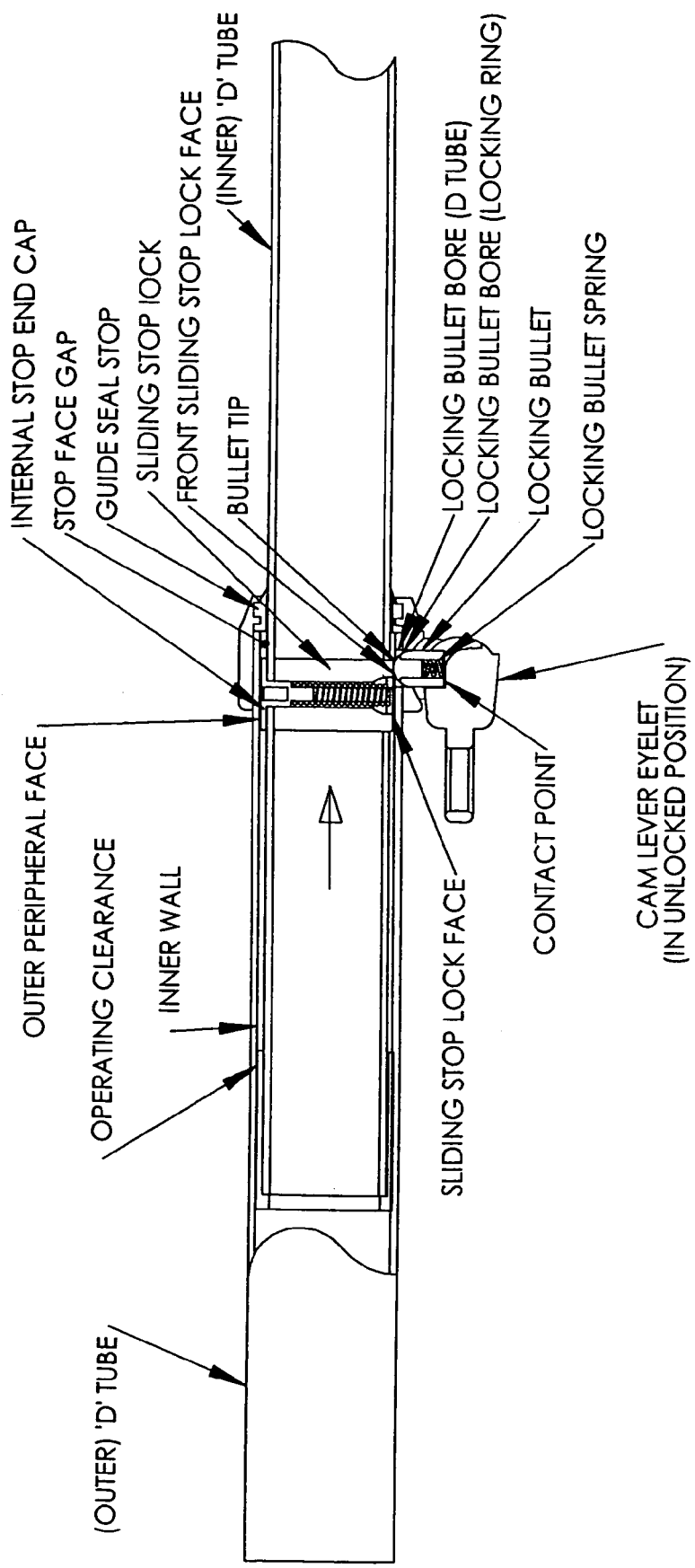
FIG. 24b shows a side elevation view in cross section partially cutaway of the present invention.

A similar cross section view as shown in FIGS. 24a and 24b shows that the smaller (inner) 'D' Tube section is positioned more to the right hand side than in FIG. 24b and that the Bullet tip is almost in complete concentric alignment with the stop lock recess bore of the sliding stop lock. It is just touching the stop lock spring that is retained within a bore of the sliding stop lock and the stop lock spring is shown to be attached to a lower end Stalk of the internal stop end cap.

The Bullet tip attached to one end of the Locking Bullet has now slightly entered into the stop lock recess bore as the Locking bullet spring is starting to push the Locking bullet and attached Bullet tip away from the contact point of the Cam lever eyelet. It is in this Inner 'D' tube extended position that a detent action is felt by the operator between the Sliding stop lock, bullet tip and associated components.

The purpose of the Stop lock spring shown in the illustration is to stop the Bullet tip from entering too far down into the Stop Lock recess bore whilst the Cam lever eyelet is still in the unlocked position. This balancing spring action between the Stop lock spring and Locking bullet spring is to allow the operator to fully extend and retract the smaller (inner) 'D' tube section without locking the components together at this time. Should the operator choose to slide the inner 'D' tube to the left within the larger (outer) 'D' tube section, the detent action of the Bullet tip on the sliding stop face would be felt.

Also shown in the illustration of the present invention is a Locking bullet bore of 'D' tube that goes through the wall of the larger (outer) 'D' tube section and a locking bullet bore (of cam guide locking ring) that the Locking bullet is guided within. It is these bores that resist a shearing action between the Inner and outer 'D' tubes once the particular telescoping tube section is in the fully extended position and when the Cam lever eyelet is in the locked position with the locking bullet fully locked.

FIG. 24d

Figure 24C:
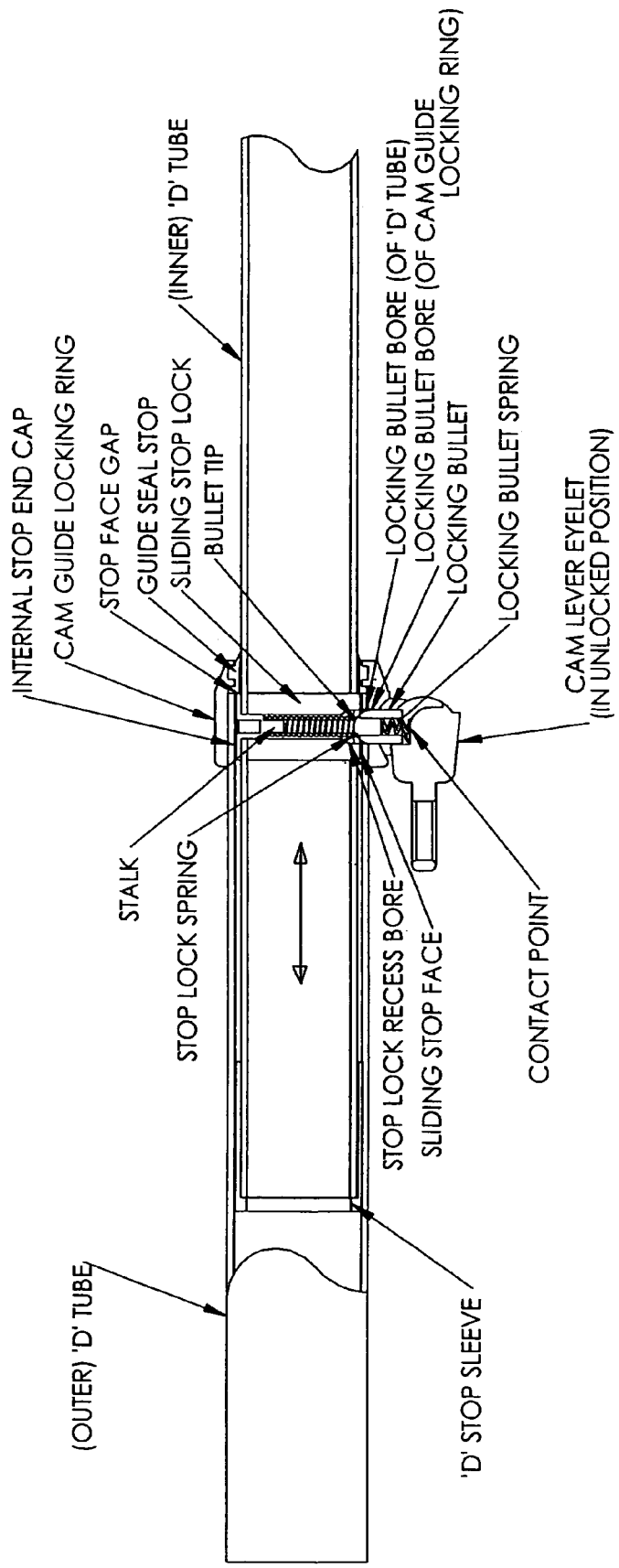
FIG. 24c shows a side elevation view in cross section partially cutaway of the present invention.

Another similar cross section view as shown in FIGS. 24a, 24b and 24c shows that the smaller (inner) 'D' tube section of the present invention is positioned in the fully extended position within the larger (outer) 'D' tube section, but the cam lever eyelet is still positioned in the unlocked position.

The bullet tip attached to the one end of the locking bullet are shown to be both concentric to the stop lock recess bore of the sliding stop lock, but the stop lock spring which can be either slightly stronger or slightly weaker in rate than the locking bullet prevents the bullet tip from going too far down into the stop lock recess bore when the cam lever eyelet is still in the unlocked position.

The operator is still able to fully or partially retract the smaller (inner) 'D' tube section within the larger (outer) 'D' tube section if necessary, but the operator cannot extend the Inner 'D' tube section any further to the right hand side because the stop face gap shown in FIG. 24b has reduced to minimal gap.

The Guide seal stop shown, that is retained onto one end of the larger (outer) 'D' tube section by the Cam guide locking ring, acts as a bump stop in the fully extended position of the telescoping smaller (inner) 'D' tube section. It prevents the attached Internal stop end cap, Sliding stop lock of the smaller (inner) 'D' tube from coming out of the one end of the larger (outer) 'D' tube section.

Ideally the Guide seal stop would be dimensioned so as to align the stop lock recess bore in concentricity to the locking bullet and associated locking bores.

The alignment of the bores is not absolutely necessary providing the Bullet tip and locking bullet can fully engage when the Cam lever eyelet is in the locked position.

The guide seal stop ideally should be made of a hard material that does not scratch the surface of the smaller (Inner) 'D' tube, such as a hard rubber, as it slides within the larger (outer) 'D' tube section. It should also be strong enough to support the axial loads imposed on the invention when in service, but be soft enough to enable the guide seal stop to seal out water, moisture and salt water spray to minimize damage of the inner components.

FIG. 24e

Shown is a cross section partial view of one pair of telescoping tubes of the present invention where the smaller (inner) 'D' tube section is fully extended within the inside bore of the larger (outer) 'D' tube section and the Cam lever eyelet which is pivotally attached by pivot screws (not shown) to the Cam guide locking ring has been pivoted around a cam lever pivot point to initiate a pushing action with a cam contact ramp action onto the one end of the locking bullet.

Also shown is the locking bullet spring, which is now compressed within the internal bore of the locking bullet because the cam contact ramp is now in full contact with the end face of the locking bullet positioned to start pushing the Locking bullet into the stop lock bore of the sliding lock stop against the stop lock spring.

An inner wall of the sliding stop lock is shown that contains the stop lock spring so as to keep the stop lock spring straight and contained during the unlocking and locking actions of the cam lever eyelet.

Also shown is an operating clearance between the outside face of the internal stop end cap that is attached to both the smaller (inner) 'D' tube and sliding stop lock and the inner wall of the larger (outer) 'D' tube, such that as the Cam lever eyelet is further pivoted around the cam lever pivot point, the operating clearance gap will begin to decrease as the cam contact ramp pushes the bullet further into the stop lock bore.

Figure 24D:
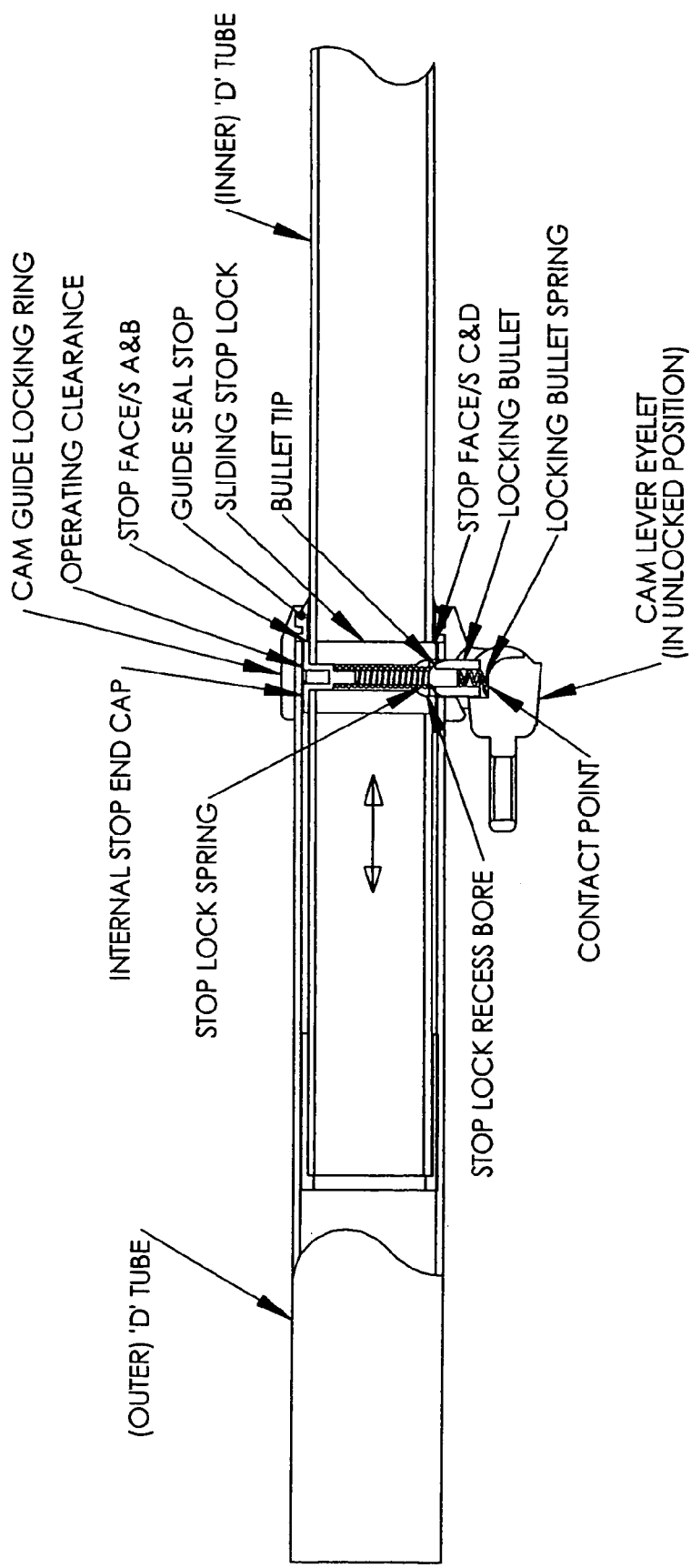
FIG. 24d shows a side elevation view in cross section partially cutaway of the present invention.

Once the cam lever eyelet is positioned as shown in the figure, the operator will not be able to retract the smaller (inner) 'D' tube section because the cam contact ramp will not permit a detent spring action of the locking bullet spring because there is now no clearance between the locking bullet's one end and cam contact ramp unlike what FIG. 24d had shown.

FIG. 24f

Shown is a similar cross section side view to (FIG. 24e) of a partial inner and outer 'D' tube section, but the illustration now shows that the Locking bullet, cam lever eyelet, internal stop end cap, stop lock bore (of the sliding stop lock) and associated other locking components are in the locked position of the present invention which has locked the smaller (inner) 'D' tube section to the larger (outer) 'D' tube section in the fully extended position.

Shown is a cam lever eyelet in a locked position having been fully pivoted around a cam lever pivot point of a cam guide locking ring up to a cam lever eyelet stop of the cam guide locking ring. The cam contact ramp has completely pushed the bottom end of locking bullet towards the opposite side shown as the inner wall of the larger (outer) 'D' tube section. The bullet tip attached to the other one end of the locking bullet is shown fully engaged with the Stop lock bore of the sliding stop lock, this engagement has compressed the stop lock spring and has pushed the sliding lock stop and attached internal stop end cap up against the inner wall of the larger (outer) 'D' tube section. The sliding stop lock and internal stop end cap are attached to the inner sliding 'D' tube section so this pushing action of the locking bullet by the cam lever eyelet also pushes the smaller (inner) 'D' tube telescoping section with the other associated components towards the inner wall of the larger (outer)'D' tube section.

Figure 24E:
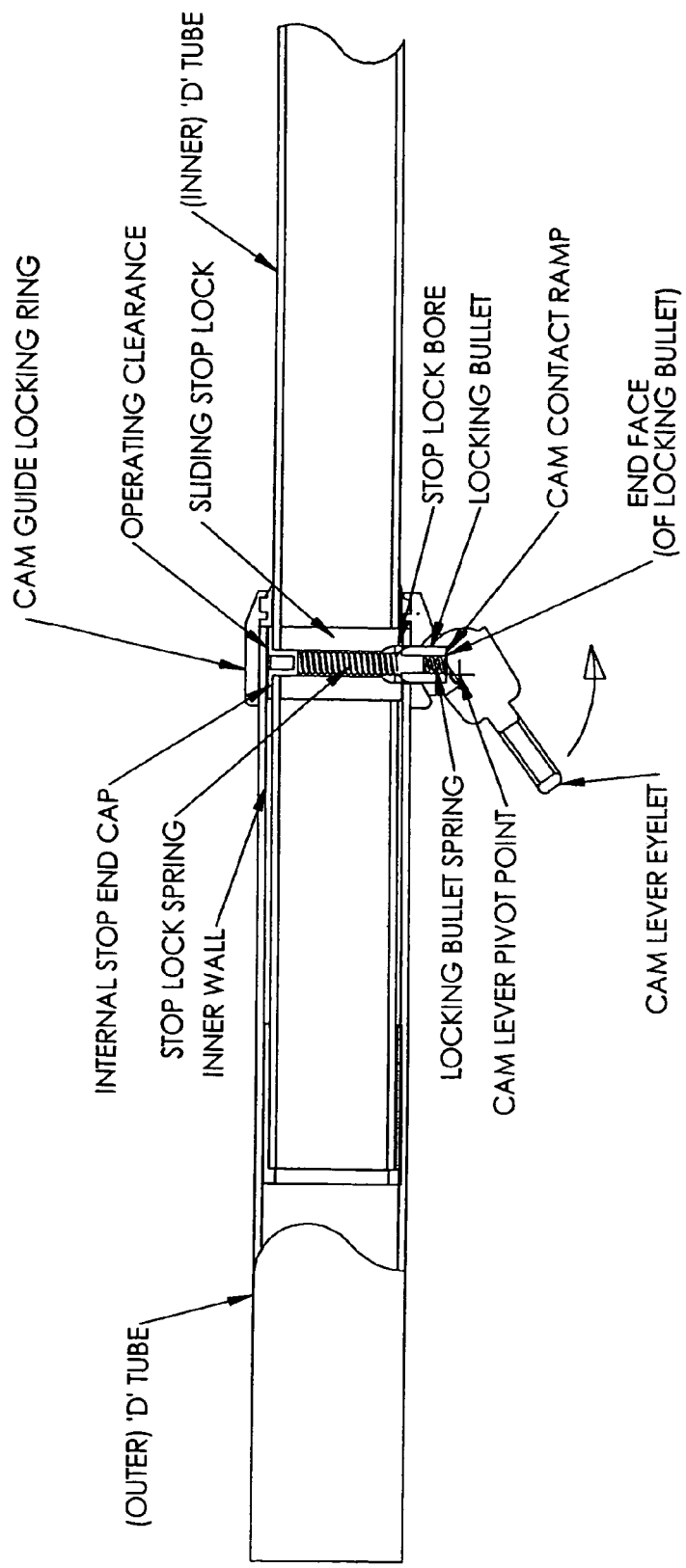
FIG. 24e shows a side elevation view in cross section partially cutaway of the present invention.
Figure 24F:
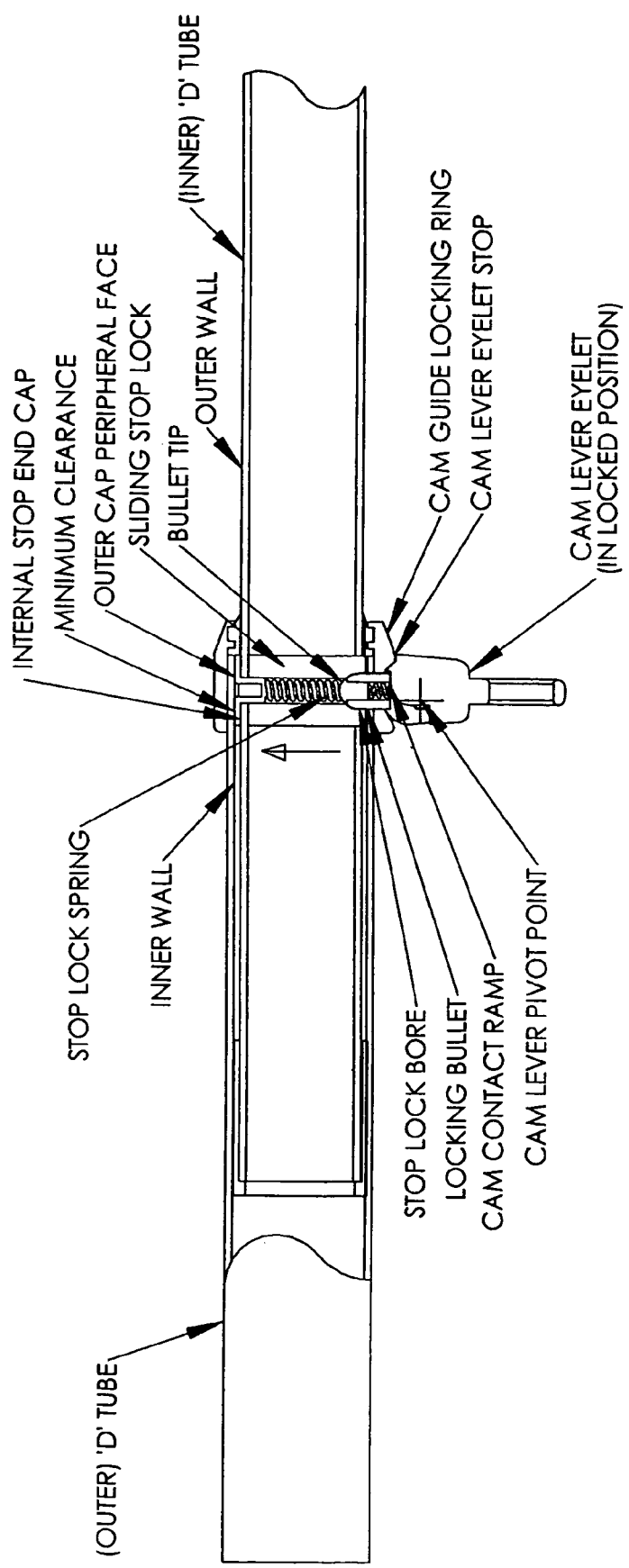
FIG. 24f shows a side elevation view in cross section partially cutaway of the present invention.
Figure 25:
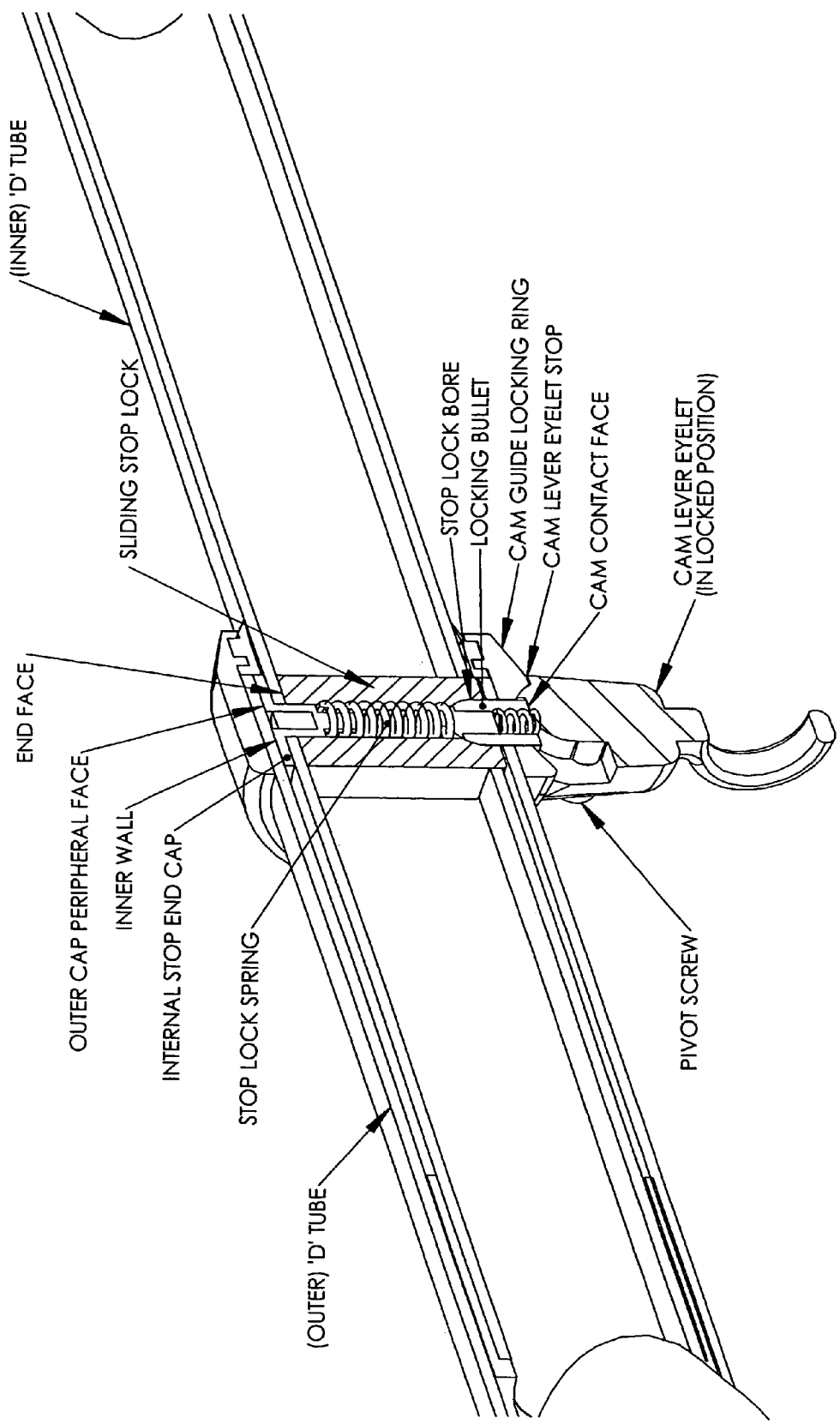
FIG. 25 shows a perspective view in cross section of a portion of the boom that includes one of the locking mechanisms.
Figure 26:
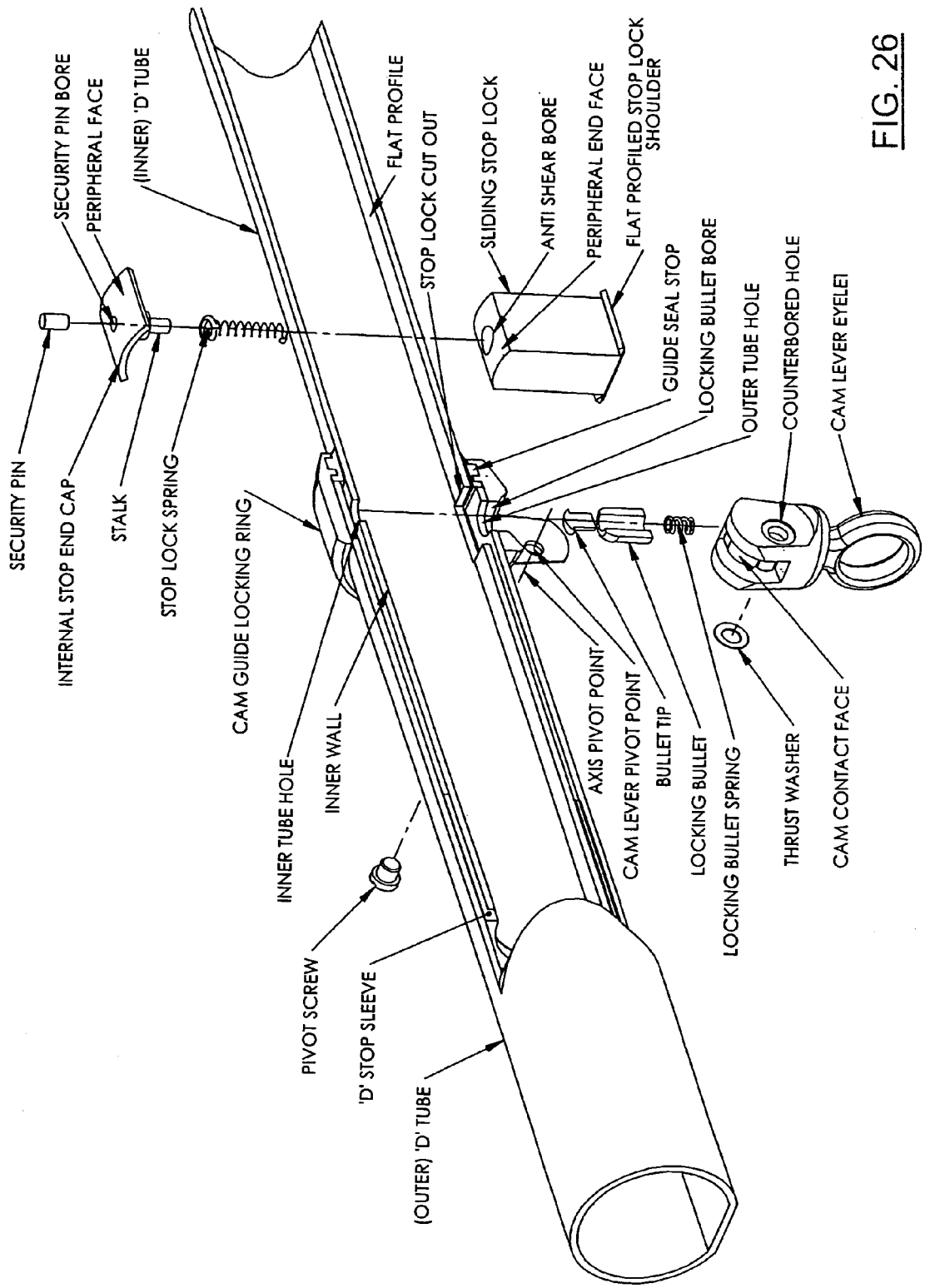
FIG. 26 shows an exploded view partially in cross section and perspective partially cutaway of the locking mechanism in accordance with the present invention.
Figure 27:
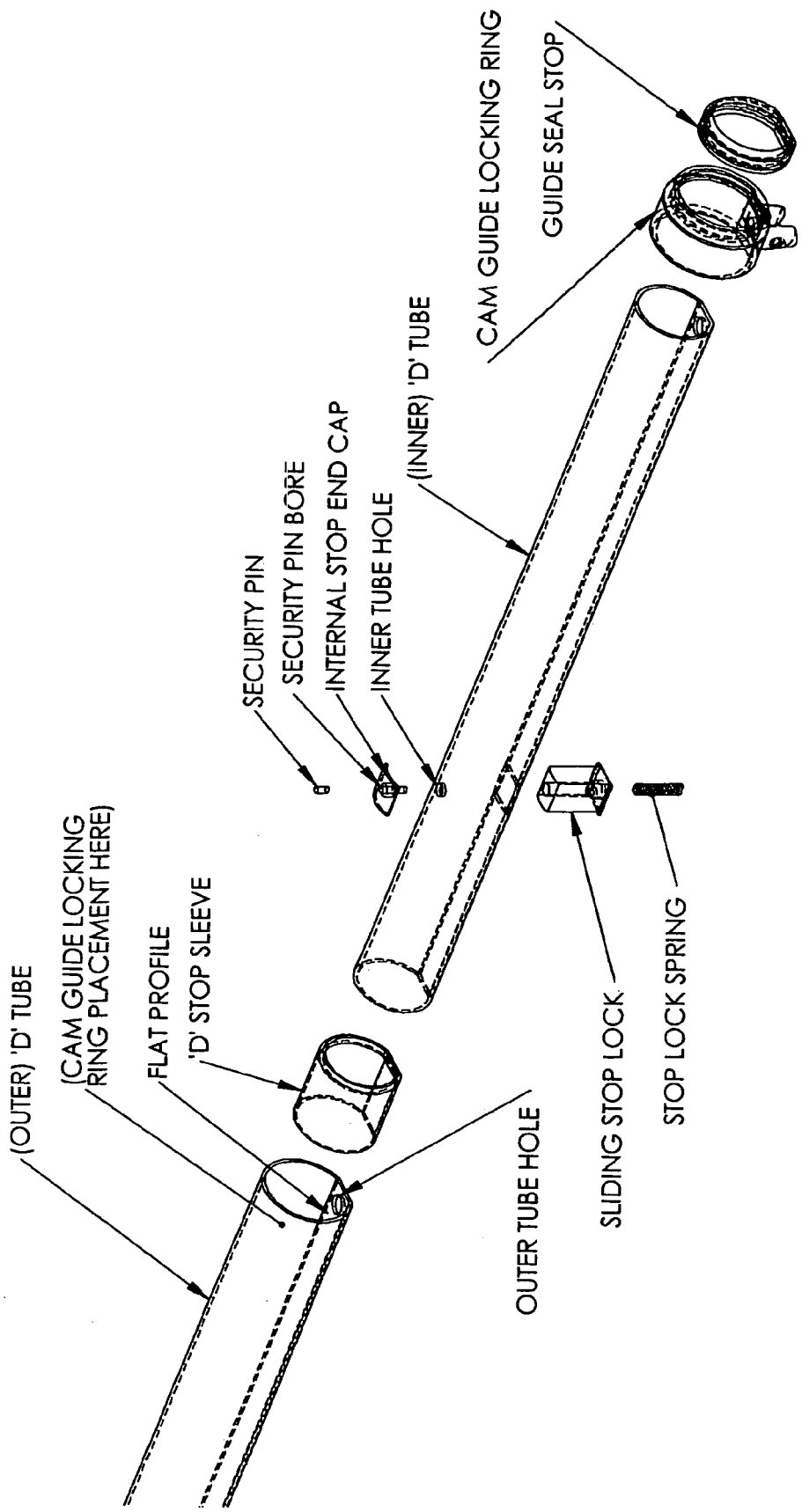
FIG. 27 shows an exploded perspective partial view of a pair of adjacent tubes in the locking mechanism used in the present invention.
Figure 28:
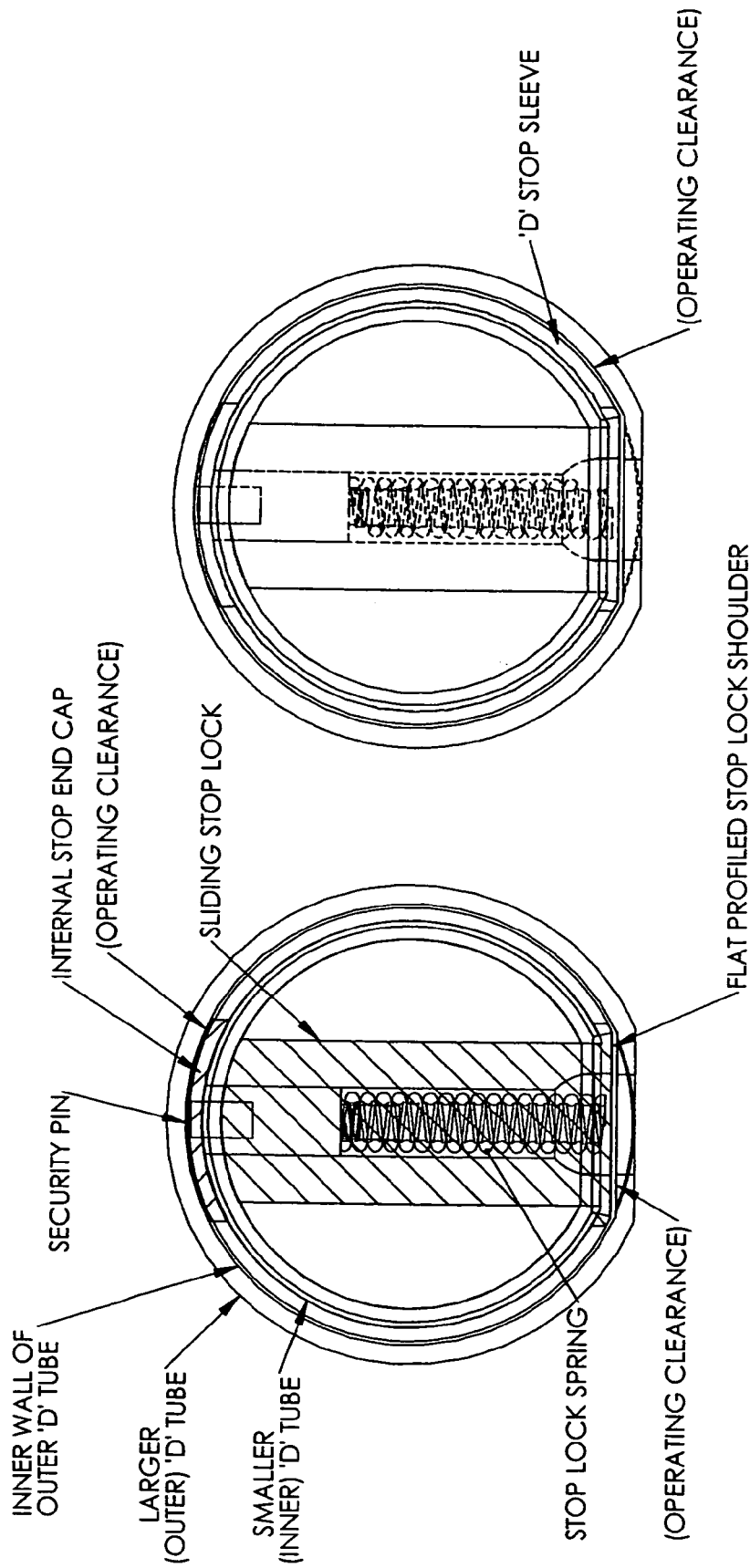
FIG. 28a shows a top end view in cross section of the tubes used in the present invention with the internal Sliding Stop lock, Internal Stop End Cap, Security Pin and Stop Lock spring superimposed.
FIG. 28b shows a bottom end view in cross section of a pair of operating tubes used in the present invention.
Figure 29:
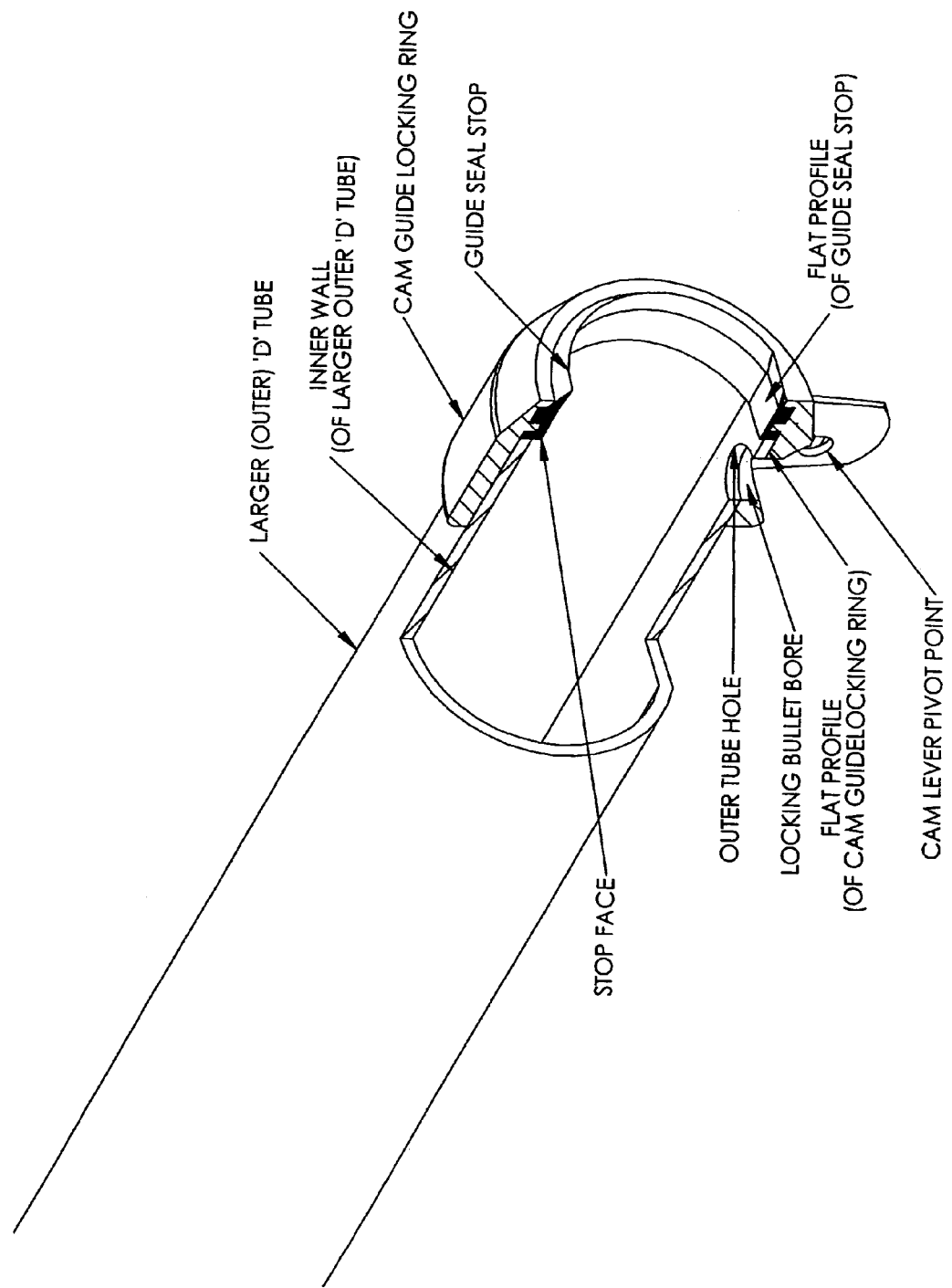
FIG. 29 shows a schematic diagram of one tube and a portion of the Cam Guide Locking Ring and Guide Seal Stop partially cutaway in cross section.
Figure 30:
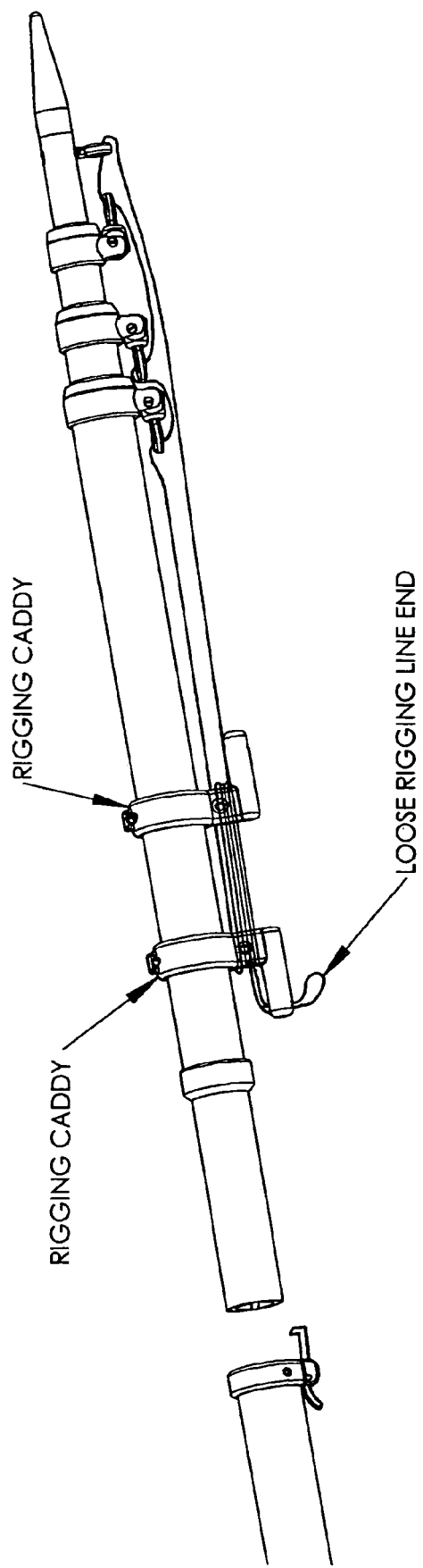
FIG. 30 shows a side elevation view removed from the Mounting Arm and with the boom and Rigging Line in the stored position.
Figure 31:
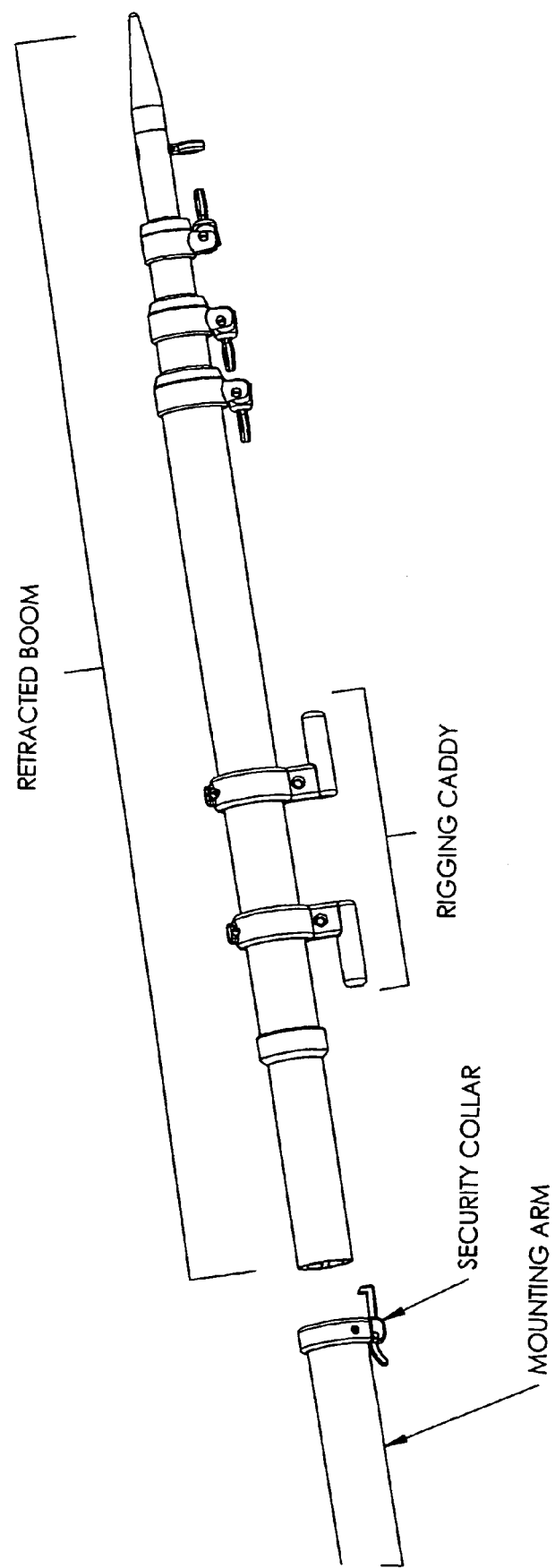
FIG. 31 shows a perspective view partially exploded of the present invention.

Pushing these components across to the inner wall of the larger (outer) 'D" tube section reduces the operating clearance shown in FIGS. 24d and 24e to a minimum clearance and reduces the overall play/movement between the outer cap peripheral face of the Internal stop end cap and the inner wall of the larger (outer) 'D' tube.

The shown reduced operating clearance is desirable in the fully extended and locked position of the present invention to limit the tail end whip of the smaller (inner) 'D' tube section inside the larger (outer) 'D' tube section during use on a vessel.

FIG. 25

Is a close up and cross sectioned view of two partial lengths of a smaller (inner) 'D' tube section a larger (outer) 'D' tube section and a locking mechanism for locking the two tubes together in the fully extended position of the present invention.

Shown in the illustration is that the cam lever eyelet has been positioned in the locked position and that the cam contact face is pushing/applying pressure on to the Locking bullet that is pushing the stop lock bore of the sliding stop lock. The sliding stop lock is attached to the smaller (inner) 'D' tube section and an end periphery face is shown pushing the inside wall of the smaller (inner) 'D' tube section up in the direction away from the cam lever eyelet which in turn pushes the outer cap periphery face of the internal stop end cap against the inner wall of the larger (outer) 'D' tube section.

Also shown in the figure is a pivot screw that is one of two (one on each outer side) that secures the cam lever eyelet to the cam guide locking ring and permits the cam lever eyelet to pivotally rotate about an axis from the unlocked position to the locked position as part of the locking mechanism of the present invention. These pivot screws in conjunction with the cam contact face, prevent the locking bullet from coming back out of the stop lock bore of the sliding stop lock unless the cam lever eyelet is re-positioned to the unlocked position.

Also shown in the figure is the stop lock spring in a compressed position as the Bullet tip has reduced the stop lock spring's length as it fully entered the stop lock bore of the sliding stop lock. The compressed stop lock spring in the compressed position serves as an anti-vibration/rattle device to prevent the cam eyelet from inadvertently unlocking itself during Sport fishing.

FIG. 26

This is a sectioned exploded view of the cam guide locking ring and associated components attached to the one end of the larger (outer) 'D' Tube section. It also shows an exploded view of the sliding stop lock with Internal stop end cap, security pin and stop lock spring. It details how the components interact to perform locking, unlocking, stopping, guiding, rigging line support, easy sliding, minimal play and sealing of the telescoping tube sections.

The Sliding stop lock is shaped/sized to suit a stop lock cut out in the flat profile tube wall of the smaller (inner) 'D' tube. It fits snugly up inside with a peripheral end face that matches the inner face of the inner 'D' tube wall so as to fit well together. The flat profiled stop lock shoulders act as stopping components when Fully extending the inner tube within the outer tube. They have a raised profile after assembly, lying above the outer flat profiled wall of the smaller (inner) 'D' tube so as to also contact the Guide seal stop on full extension of the Inner 'D' tube section. The flat profiled stop lock shoulders also keep the smaller and larger 'D' tube sections in the same alignment during locking, unlocking, extension and retraction of the telescoping tubes.

An internal stop end cap is attached to the sliding stop lock by being press fit into an inner tube hole from the outside wall of the inner 'D' tube. It is also pressed through into an anti-shear bore in the sliding stop lock which is then anchored by a security pin that is driven into the security pin bore to anchor the four associated components together to create a strong anchor for the locking system. The internal stop end cap also has a profile that matches the inside wall profile of the larger (outer) 'D' tube section and is sized slightly smaller so as to have operating clearance between the inner wall and peripheral face of the internal stop end cap to slide the smaller (inner) 'D' tube inside the larger (outer) 'D" tube.

Shown is a stalk on the bottom end of the internal stop end cap. The purpose of the stalk is to restrain the metallic stop lock spring inside the sliding lock stop, preventing it from inadvertently rubbing/scratching the inside wall of the flat profiled face of the larger (outer) 'D' tube section during extension and retraction when the present invention is in service.

Shown is a cam guide locking ring that has a guide seal stop that is permanently attached and indexed to the cam guide locking ring on the inside diameter faces.

The guide seal stop prevents metal to metal contact of the larger and smaller 'D' tubes, and supports the loads imposed on the tubes during operation when the telescopic outrigger is fully extended and is flexing. The guide seal stop also has an integral sealing lip that helps prevent salt spray, salt water and rainwater from entering into the top end of the boom assembly section.

The guide seal stop has an inside profile that is smaller in dimension to the larger (outer) 'D' tube section but larger than the smaller (inner) 'D' tube section. Its Internal profile also is smaller in dimension than both of the maximum peripheral dimensions of the Internal stop end cap and flat profiled stop lock shoulder of the sliding lock stop. This is because the Guide seal stop acts as a fully extended stop point for the smaller (inner) 'D' tube section as it is fully extended within the larger (outer) 'D' tube section.

The Cam guide locking ring is permanently attached to the one end of the larger (outer) 'D' tube section. The cam guide locking ring has one lower axis pivot point to which the cam lever eyelet is attached with pivot screws and thrust washers secured on each side of the cam lever eyelet. The cam lever eyelet can pivotally rotate around the axis pivot point so as to perform the unlocking and locking action of the locking mechanism.

Also shown in the exploded illustration is an outer tube hole through the flat profiled side wall of the larger (outer) 'D' tube section, this outer tube hole is permanently concentric to the locking bullet bore in the cam guide locking ring as these two components always remain aligned after assembly of the cam guide locking ring to the larger (outer) 'D' tube section.

The bullet tip is permanently attached to the top end of the Locking bullet and the locking bullet operates during the locking and unlocking action of the cam lever eyelet within the outer tube hole and locking bullet bore.

The locking bullet and bullet tip are sized slightly smaller in diameter than the locking bullet bore and outer tube hole, respectively, so that the Locking bullet can freely shuttle in and out of the sliding stop lock when the cam lever eyelet is locked and unlocked by the operator.

A locking bullet spring and thrust washer are integrally assembled within the cam guide locking ring and cam lever eyelet, the thrust washer of which is retained in a counter bored hole on each side of the cam lever eyelet by pivot screws. The locking bullet spring is installed into the bottom most end of the locking bullet and on top of the cam contact face of the cam lever eyelet.

The function of the thrust washers placed on either side of the cam lever eyelet at the cam lever pivot point is to apply spring pressure between the sides of the pivoting cam lever eyelet. The cam guide locking ring inside leg faces that the cam guide eyelet pivots within.

Also shown is a 'D' stop sleeve attached to the bottom end of the smaller (inner) 'D' tube section that is slightly smaller in dimensional profile than the larger (outer) 'D' tube section that it slides within.

FIG. 27

Is another view giving a clearer understanding of how the Sliding Stop lock and Internal stop end cap are secured to the smaller (inner) 'D' tube section that slides inside the larger (outer) 'D' tube section. Once assembled these components cannot fall out as they are always contained within the inside bore of the larger (outer) 'D' tube section.

This figure further shows the 'D' tube flat profile used in all of the tube sections that the Cam guide locking ring mates with at the top end of the larger (outer) 'D' tube section. The attachment of the cam guide locking ring ensures alignment of all of the telescoping 'D" tube profiles to each other when used in conjunction with a guide seal stop and a 'D' stop sleeve sized to suit the appropriate 'D' tube sections.

FIG. 28a

This illustrates a cross sectioned end view through a pair of telescoping tubes, sliding stop lock and associated components shows that there is an operating clearance between the larger (outer) 'D" tube section and the smaller (inner) 'D" tube section. The 'D tubes never touch each other when telescoping the smaller (inner) 'D' tube section inside the larger (outer) 'D" tube section.

The sliding stop lock, internal stop end cap and security pin mentioned earlier serve as sliding and centering components in addition to their other locking, anchoring, extension and retraction functions.

Also shown is an operating clearance between the outer periphery face of the internal stop end cap and the inner wall of the larger (outer) 'D' tube section and an operating clearance between the outer periphery face of the flat profiled stop lock shoulder of the Sliding stop lock and the inner wall of the larger (outer) 'D' tube section that allows the smaller (inner) 'D' tube section to slide freely during-extension and retraction of the telescoping sections.

FIG. 28b

Is similar to FIG. 28a but showing the opposite end where the 'D' stop sleeve is attached to the smaller (inner) 'D' tube section and has an operating clearance around the outside surface. The 'D stop sleeve has an end profile shape similar to the larger (outer) 'D" tube section but is dimensionally slightly smaller to permit the inner tube section to slide within the outer tube section.

The 'D" stop sleeve is positioned as far apart as necessary on the one end of the smaller (inner) 'D" tube from the Sliding stop lock mechanism components to control tail end whip of the smaller (inner) 'D" tube section when forces cause flexing of the extended telescopic outrigger during use.

The 'D" stop sleeve has an internal through bore for venting air and water drainage, an end stop cushioning face for contacting a sliding stop lock during the full Retraction of the smaller (inner) 'D" tube section within the larger (outer) 'D' tube section and a 'D' profile that also keeps the Inner and outer 'D' tube profiles always in concentric alignment.

FIG. 29

Shown is a partially sectioned single section of the present invention, with the larger (outer) 'D' tube section, a cam guide locking ring with a Guide seal stop indexed internally and attached to it. Both components have corresponding flat profiles internal faces that align with the (outer) 'D' tubes flat profile thus indexing the cam guide locking ring and guide seal stop in a single plane.

Also shown is an outer tube through hole of the larger (outer) 'D' tube section concentrically aligned with a locking bullet bore of the cam guide locking ring. Both of these are permanently aligned and act together as part of the unlocking and locking mechanism of the telescoping outrigger sections.

A stop face of the guide seal stop is shown extending inwards from the inner wall of the (outer) 'D' tube. The stop face functions to control the stopping position of the internal stop end cap and sliding stop lock components that are attached to the smaller (inner) 'D' tube section that slides within the lager (outer) 'D' tube section when fully extended.

FIG. 30

Shown is a detached but fully retracted telescoping outrigger boom. Excess rigging line is neatly and securely stowed/wound around the rigging caddy and the loose end secured in a clip.

FIG. 31

The present invention of the telescoping outrigger boom is shown fully retracted with the rigging caddy attached. The telescoping outrigger boom is shown detached from a mounting arm that has been fitted with the present inventions security collar.

FIG. 32a

Is a side view of a portion of the bottom outrigger sleeve and lower most end 'D' tube of the present invention placed into a mounting arm and is securely latched to a security collar that has been secured onto the end of a standard and common design mounting arm.

The lever latch grabs the sleeve shoulder on the present invention's lower end 'D' tube thus preventing the telescopic outrigger from sliding out of the mounting arm.

The security collar lever latch operates to release the mounting arm from the boom.

FIG. 32b

Figure 32A:
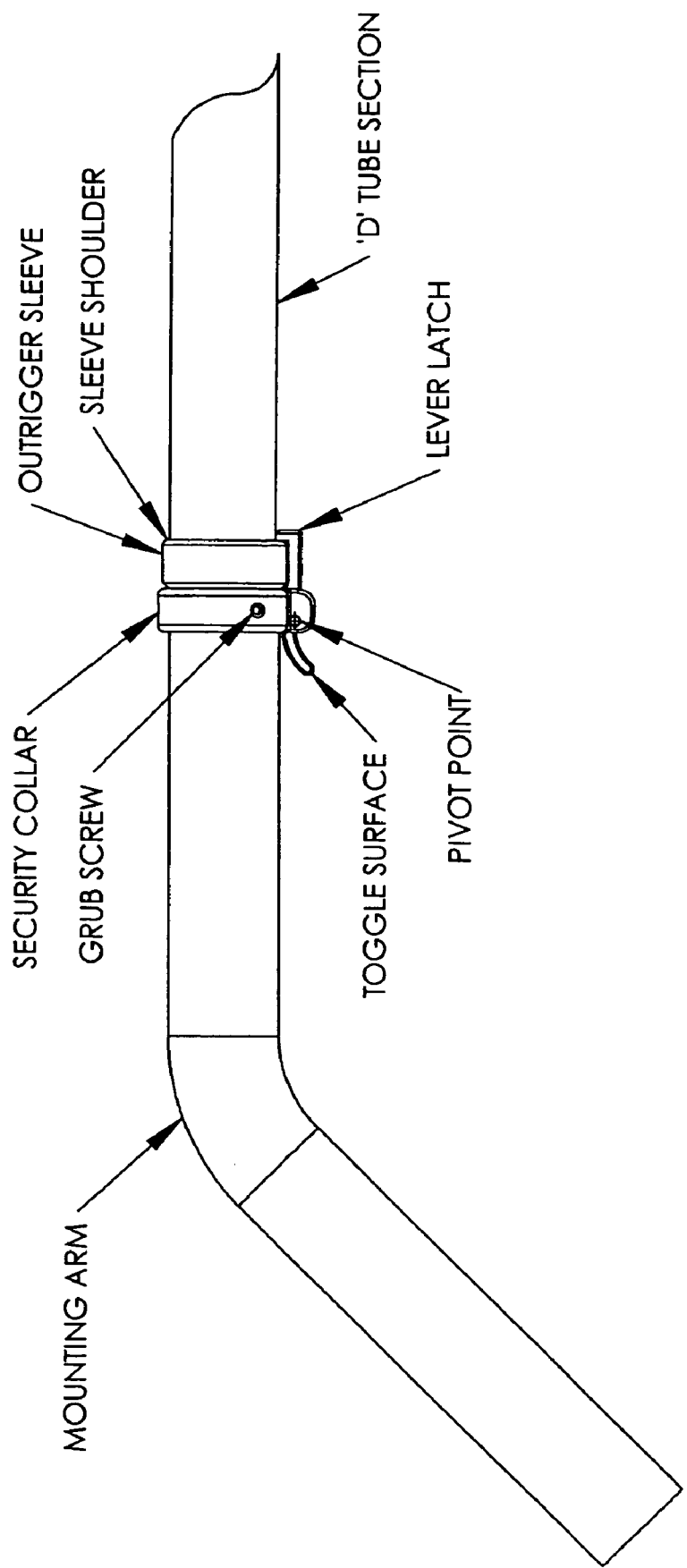
FIG. 32a shows a side elevation view of the attachment of the outrigger boom to a support Mounting arm.
Figure 32B:
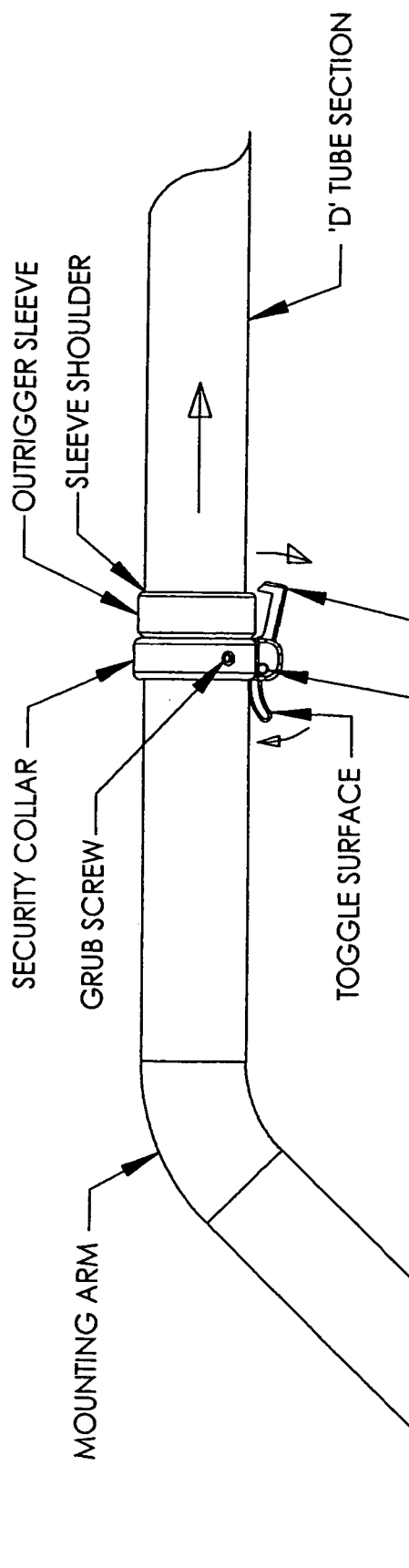
FIG. 32b shows a side elevation view of the unlatching mechanism of the Outrigger Boom from a Mounting arm.
Figures 33A, 33B:
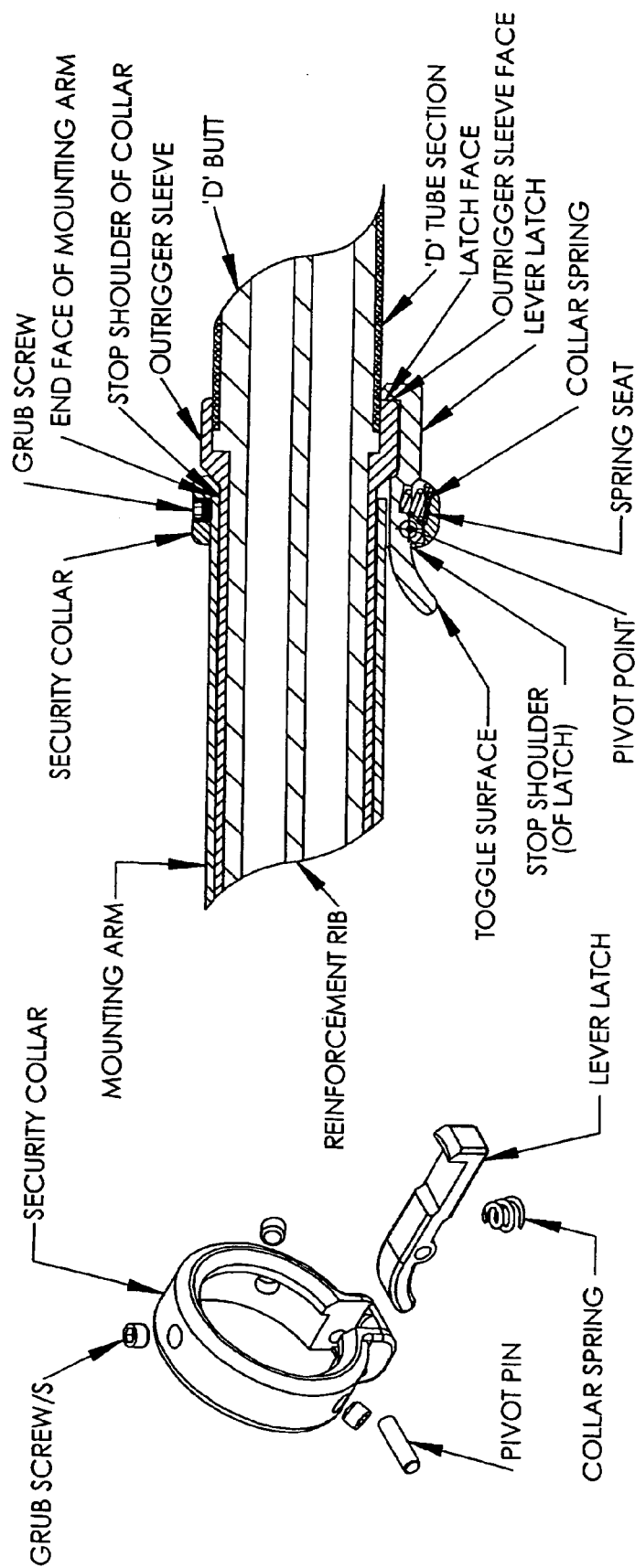
FIG. 33a shows a perspective view exploded of a latching mechanism used to attach the boom to the supporting arm.
FIG. 33b shows the latching mechanism used with the Mount arm to attach the boom thereto in cross section cutaway in a side elevation view.

This is a similar illustration to FIG. 32a but shows that the toggle surface has been pushed and the lever latch has been pivoted away from the sleeve shoulder. This enables the operator to remove the telescopic outrigger from the end of the mounting arm.

FIG. 33a

An exploded view of the security collar components.

An optional version of this security collar can slide along the mounting arm with a single adapter that can prevent accidental injuries from any sharp edges of the lever latch (FIG. 32b) by enabling the lever latch to slide down to the mounting arms top end. However, most mounting applications of this device in conjunction with an outrigger boom is done on top of the vessel away from occupants of the vessel so the adapter would probably not be required

FIG. 33b

This cross sectioned view of components associated with the security collar of the present invention shows a spring loaded and pivoting lever latch that is thumb or finger activated by applying pressure to the toggle surface.

The stop shoulder of the latch next to the pivot point, prevents the lever latch from moving too far so that the outrigger sleeve will engage the lever latch without operator assisted depressing of the toggle surface of the lever latch. This is desired as usually only one hand is free to insert telescopic outrigger boom of the present invention into the mounting arm and security collar. The other operator's hand holds onto the vessel for safety reasons.

A stop shoulder of the collar is shown. It is a reduced inner diameter shoulder of the security collar that contacts the end face of mounting arm. It prevents the security collar from sliding down the mounting arm's tubular profile, which otherwise would prevent correct engagement of the outrigger sleeve.

Also shown is a latch face and outrigger sleeve face that prevent the boom from sliding out of the mounting arm.

At least one grub screw is used for securely attaching/retaining the security collar to the mounting arm.

Note that a collar spring, housed in a spring seat in the main body of the security collar, operates to apply pivoting pressure/force onto the lever latch allowing it to move back into position after operator release.

Figure 34B:
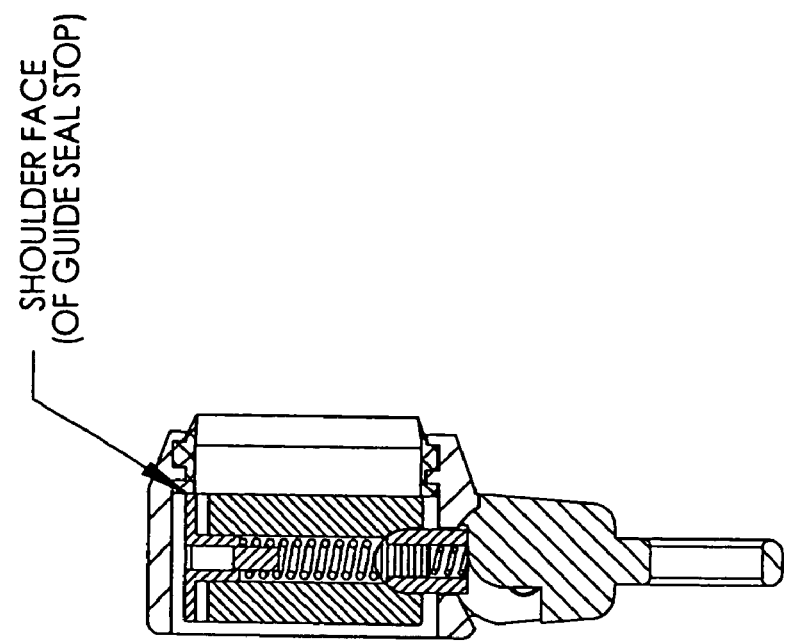
FIG. 34b shows a side elevation view in cross section of the Cam Guide Locking Ring mechanism in accordance with the present invention.
Figure 34A:
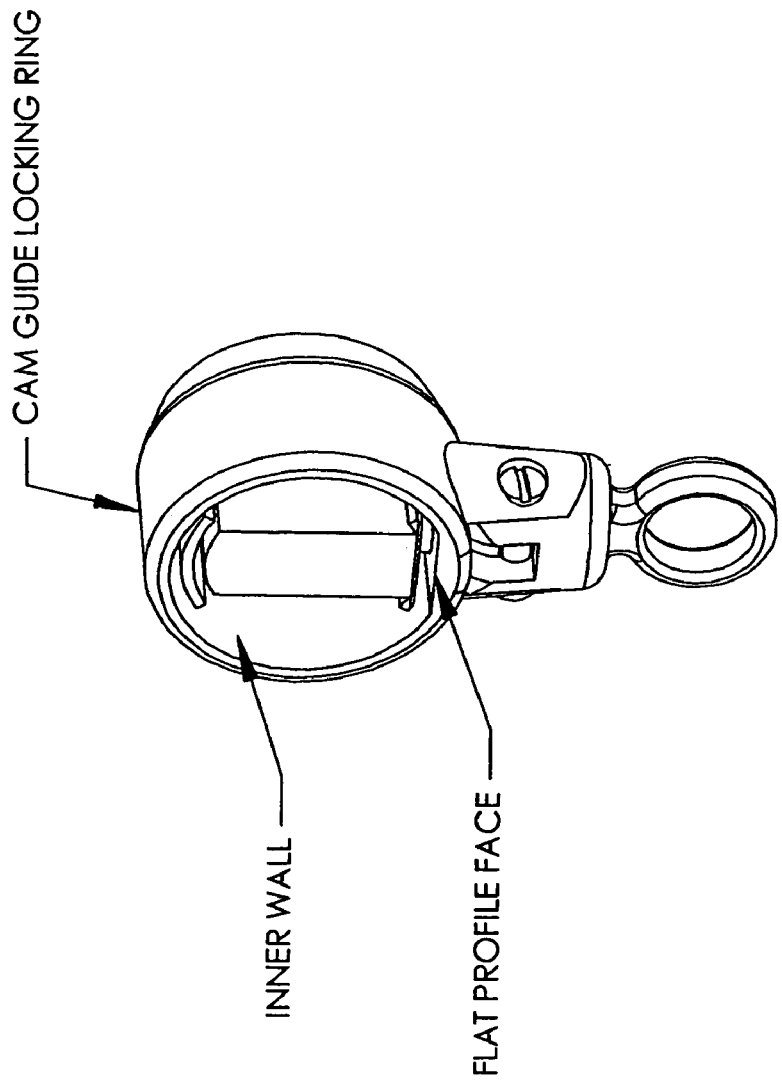
FIG. 34a shows a perspective view of a portion of the Cam guide Ring locking mechanism in accordance with the present invention for a single locking device.
Figure 35:
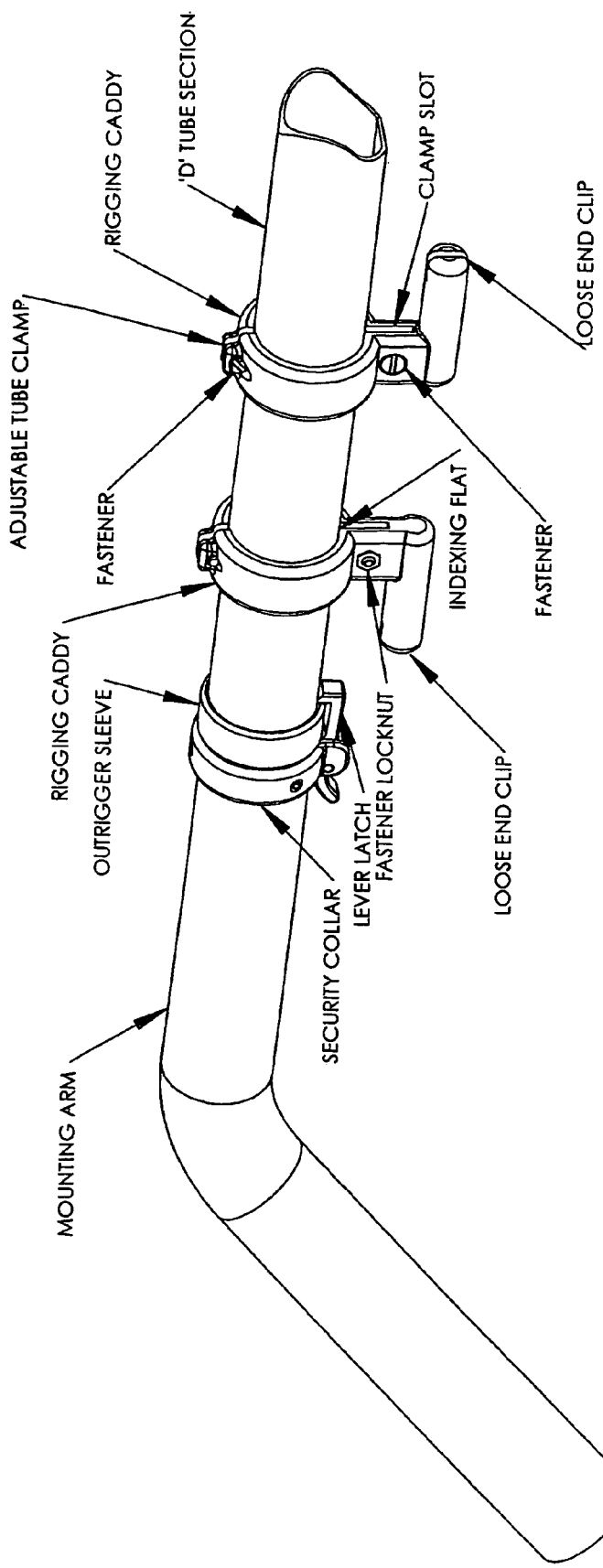
FIG. 35 shows a perspective view partially cutaway of the mounting arm, the Security Collar and the Rigging Caddy used to store the loose rigging line used with the present invention.
Figure 36:
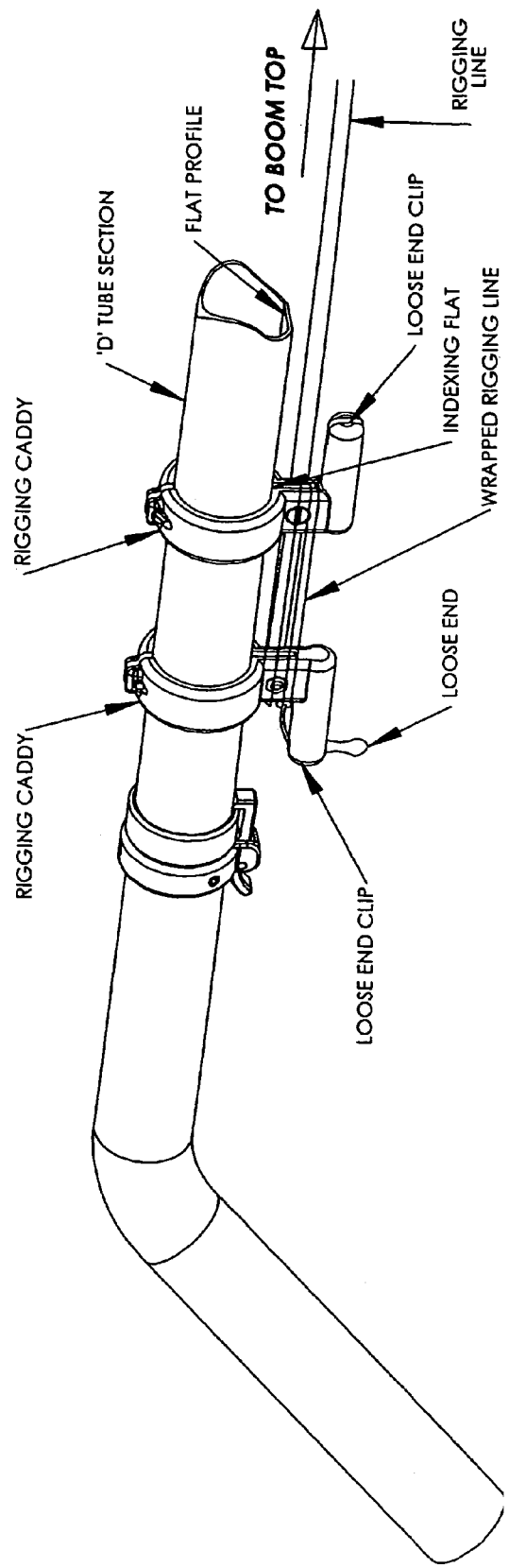
FIG. 36 shows a perspective view partially cutaway of the Rigging Caddy with a line stored thereon in accordance with the present invention.

FIGS. 34a and 34b

Other views of the cam guide locking ring and associated locking components.

Both illustrations (one sectioned) show the device positioned in the locked or fully extended smaller (inner) 'D' tube section's position.

The cam guide locking ring is attached to the top end of a larger (outer) 'D' tube section with the Flat profile face indexed to a flat profile and with the Inner wall of the cam guide locking ring attached to the outside face of the larger (outer) 'D' tube section.

Also shown is a shoulder face of the guide seal stop, that when the cam guide locking ring is permanently attached to the larger (outer) 'D' tube section will be trapped between the one top end of the larger 'D' tube and act as a stopping device for the inner sliding components earlier mentioned that are part of the fully extending and locking mechanisms.

FIG. 35

A view of the Rigging caddy with adjustable tube clamps, designed to fit 'D' tube profiles or round profile tube sections. An adapter (not shown) can reduce the internal diameter of the rigging caddy clamps so as to be adapted to suit much smaller outrigger tube sections.

Shown are clamp slots and fasteners of the rigging caddy that allows the operator to easily install the rigging caddy around fixed or telescoping outrigger tube sections and to adjust the position along an outrigger boom and securely clamp the rigging caddy to the mentioned tubes.

Also shown is an indexing flat that indexes with the 'D' tube section profile and functions to resist turning of the rigging caddy around the booms longer axis so that stored/stowed rigging line remains in the same plane as the Cam lever eyelets. The clamp slot and removable fasteners permit installation of the rigging caddy without dismantling the telescoping or fixed type outrigger booms.

The loose end clip device allows the loose unwrapped ends of the excess rigging line to be trapped in the clip, so the rigging cannot prematurely unwind from the rigging caddy.

FIG. 36

The illustration shows a close up view of the bottom portion of the present invention with the excess rigging line neatly stowed and it's loose end secured.

Either rigging caddy's loose end clip can stow the loose end of the excess rigging line.

Also shown in this illustration is the flat profile of the larger 'D' tube section that is indexed in the same plane as the indexing flat of the rigging caddy.

Dependant on how much excess rigging line is required to be neatly stowed, the rigging caddy can be adjusted along the 'D' tube section to increase the loose rigging line storage capacity of the rigging caddy.

FIGS. 37a and 37b

Shown are other views (one sectioned) of the cam guide locking ring and associated locking, guiding, stopping and anchoring components. Both illustrations show the device/components as would be with the smaller (inner) 'D' tube in the fully extended and locked position in relation to the larger (outer) 'D' tube section.

Shown in FIG. 37a is a partially cross sectioned view of the cam guide locking ring showing a thrust washer in a side recess bore of the cam lever eyelet positioned against an Inner leg wall of the cam guide locking ring. A pivot screw attaches through the thrust washer from the outside face of the cam guide locking ring and into the cam lever eyelet to function as a securing and cam pivot axis point for the locking and unlocking function of the mechanism. A thrust washer and pivot screw are positioned on both sides of the cam lever eyelet and provide sidewards spring pressure on the cam guide locking ring and cam lever eyelet to prevent rattling of the components and prevent any vibrations that may occur when the present invention is in any retracted or fully extended, locked or unlocked position that could cause the cam lever eyelet to prematurely move around the axis pivot point.

FIG. 37a shows an eyelet loop on one end of the cam lever eyelet, where the rigging line is supported and guided in the same plane as the other eyelet loops on each cam lever eyelet installed on the Cam guide locking rings of the telescoping sections.

FIG. 37b is a close up and sectioned view of the cam guide locking ring and associated components that is in the locked position and clearly shows a cam contact ramp that is in full contact with the lower end of the Locking bullet. It shows that the Locking bullet spring is fully compressed within the bore of the locking bullet. The cam pivot axis that the cam lever eyelet pivotally rotates around is shown.

An example of a modification to the second embodiment would be the use of a Cam system similar to the system described above, with replacement of the hollow eyelets with solid levers that operate the bullet lock.

Another modification to the presented embodiments could include one or more punched or drilled holes positioned at alternate locations along the length of the tubing that the shift bullet could occupy. This would allow adjustment of the boom to lengths intermediate between fully extended and fully retracted.

The present invention has been shown and described herein in what is considered to be the most practical and preferred embodiment. It is recognized however, that departures may be made there from within the scope of the invention and that obvious modifications will occur to a person skilled in the art.

What is claimed is:

1. A telescoping tube assembly comprising:
    a plurality of tubes including a first tube and a second tube being slideably disposed in said first tube;
    said first and second tubes having a cross-sectional shape for preventing rotational movement between said first tube and said second tube;
    a second tube block disposed in and securely fixed to said second tube, said second tube block having a hole formed therein;

a first tube ring fixedly disposed on an end of said first tube, said first tube ring having a hole formed in a circumference thereof, a stop face, and a pivot having a pivot axis;

a cam lever having a cam surface disposed on said first tube ring and being pivotable about said pivot axis;

a locking bullet disposed in said hole of said first tube ring and interacting with said cam surface for engaging said hole of said second tube block in a locked position of said cam lever.

2. The telescoping tube assembly according to claim 1, further comprising:

a stop end cap disposed between said first tube and said second tube, said stop end cap abutting said stop face of said first tube ring in an extended position of said plurality of tubes, said stop end cap being forced against an inner wall of said first tube in a locked position of said cam lever, and said stop end cap including a projection for connecting said stop end cap to said hole of said second tube block; and a spring disposed in said hole of said second tube block, said spring forcing said locking bullet out of said hole of said second tube block in a unlocked position of said cam lever.

3. The telescoping tube assembly according to claim 2, further comprising:

a security pin disposed in said stop end cap for securing said stop end cap to said second tube block.

4. The telescoping tube assembly according to claim 2, further comprising:

a stop sleeve disposed on said second tube between said first tube and second tube.

5. The telescoping tube assembly according to claim 2, wherein said first tube ring includes a seal stop forming said stop face.

6. The telescoping tube assembly according to claim 1, wherein said cam lever includes an eyelet for a rigging line.

7. The telescoping tube assembly according to claim 1, further comprising:

a rigging line, said cam lever including an eyelet for said rigging line, said eyelet being substantially perpendicular to said first and second tubes in the locked position of said cam lever.

8. The telescoping tube assembly according to claim 1, wherein said first tube ring includes a clevis having said pivot axis, said cam lever being pivotably attached to said clevis.

9. The telescoping tube assembly according to claim 1, wherein said locking bullet has an axial hole formed therein.

10. The telescoping tube assembly according to claim 9, further comprising a bullet spring disposed in said axial hole of said bullet and interacting with said cam surface, said bullet spring biasing said locking bullet against said first tube in an unlocked position of said cam lever.

11. The telescoping tube assembly according to claim 1, wherein said second tube block projects past an outer wall of said second tube and abuts said stop face of said first tube ring in an extended position of said plurality of tubes.

12. The telescoping tube assembly according to claim 1, wherein said first tube includes a mounting for mounting the tube assembly to a base structure.

13. The telescoping tube assembly according to claim 1, wherein:

said plurality of tubes include at least a third tube being slideably disposed in said second tube;

said third tube having a cross-sectional shape for preventing rotational movement between said second tube and said third tube;

a third tube block disposed in and securely fixed to said third tube, said third tube block having a hole formed therein;

a second tube ring fixedly disposed on an end of said second tube, said second tube ring having a hole formed in a circumference thereof, a stop face, and a pivot having a pivot axis;

an additional cam lever having a cam surface disposed on said second tube ring and being pivotable about said pivot axis of said second tube ring;

an additional locking bullet disposed in said hole of said second tube ring and interacting with said cam surface of said additional cam lever for engaging said hole of said third tube block in a locked position of said additional cam lever.

14. A telescoping tube assembly comprising:

a plurality of tubes including a first tube and a second tube being slideably disposed in said first tube;

said first and second tubes having a cross-sectional shape for preventing rotational movement between said first tube and said second tube;

a second tube block disposed in said second tube, said second tube block having a hole formed therein;

a first tube ring fixedly disposed on an end of said first tube, said first tube ring having a hole formed in a circumference thereof;

a locking bullet disposed in said hole of said first tube ring and interacting with said cam surface for engaging said hole of said second tube block in a locked position of said first tube and said second tube.

* * * * *